(12) United States Patent
Nakajima et al.

(10) Patent No.: US 6,522,803 B1
(45) Date of Patent: Feb. 18, 2003

(54) OPTICAL CROSS-CONNECT EQUIPMENT

(75) Inventors: Ichiro Nakajima, Kawasaki (JP); Isao Tsuyama, Yokohama (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/558,072

(22) Filed: Apr. 26, 2000

(30) Foreign Application Priority Data

May 31, 1999 (JP) ............................................ 11-153065

(51) Int. Cl.$^7$ ................................................. G02B 6/28
(52) U.S. Cl. ......................................... 385/24; 359/109
(58) Field of Search ............................ 385/24; 359/109, 359/115, 127, 128

(56) References Cited

U.S. PATENT DOCUMENTS

| | | | | |
|---|---|---|---|---|
| 4,845,703 A | * | 7/1989 | Suzuki | 359/117 |
| 5,194,977 A | * | 3/1993 | Nishio | 359/128 |
| 5,739,935 A | * | 4/1998 | Sabella | 359/128 |
| 5,754,320 A | * | 5/1998 | Watanabe et al. | 359/117 |
| 5,801,864 A | * | 9/1998 | Takai et al. | 359/125 |
| 5,959,767 A | * | 9/1999 | Fatehi et al. | 359/341 |
| 6,160,931 A | * | 12/2000 | Asakura | 359/124 |
| 6,249,249 B1 | * | 6/2001 | Obayashi et al. | 342/371 |
| 6,320,684 B2 | * | 11/2001 | Uehara | 359/124 |

* cited by examiner

Primary Examiner—Ellen E. Kim
(74) Attorney, Agent, or Firm—Staas & Halsey LLP

(57) ABSTRACT

Optical cross-connect equipment in which the intensity of a signal light input to optical amplifiers is held constant. Optical cross-connect equipment includes an optical preamplifier; a demultiplexer for demultiplexing an input multi-wavelength signal light into wavelength-split lights each having different wavelength; and a routing portion for routing each wavelength-split signal light having different wavelength to a desired output port. The routing portion further includes a control light generator for generating control lights corresponding to the signal lights split by the demultiplexer; a route switch to switch a route for each split signal light having different wavelength to output; an optical amplifier for amplifying each signal light output from the route switch; a control light insertion portion for inserting the control light generated by the control light generator; and a wavelength selector for selecting an output of the control light insertion portion having a wavelength assigned to the wavelength selector to forward to an output port.

20 Claims, 50 Drawing Sheets

FIG. 2

| Optical cross-connect name (201) | Input link No. (202) | Wavelength (203) | Output link No. (204) | Use condition (205) |
|---|---|---|---|---|
| OXC801 |  | λ0 | Output link 1 | OFF |
| OXC801 | Input link 1 | λ1 | Output link 1 |  |
| OXC801 |  | λ2 | Output link 1 | OFF |
| OXC801 | Input link 2 | λ3 | Output link 1 |  |
| OXC801 | Input link 2 | λ0 | Output link 2 |  |
| OXC801 |  | λ1 | Output link 2 | OFF |
| OXC801 | Input link 1 | λ2 | Output link 2 |  |
| OXC801 | Input link 1 | λ3 | Output link 2 |  |
| OXC801 | Input link 3 | λ0 | Output link 3 |  |
| OXC801 |  | λ1 | Output link 3 | OFF |
| OXC801 | Input link 4 | λ2 | Output link 3 |  |
| OXC801 | Input link 3 | λ3 | Output link 3 |  |
| OXC801 |  | λ0 | Output link 4 | OFF |
| OXC801 | Input link 4 | λ1 | Output link 4 |  |
| OXC801 | Input link 4 | λ2 | Output link 4 |  |
| OXC801 | Input link 3 | λ3 | Output link 4 |  |
| OXC802 |  |  |  | OFF |
| OXC802 | Input link 1 | λ1 | Output link 1 |  |
| OXC802 |  |  |  | OFF |
| OXC802 | Input link 1 | λ3 | Output link 1 |  |
| OXC802 | Input link 2 | λ0 | Output link 2 |  |
| OXC802 |  |  |  | OFF |
| ～ | ～ | ～ | ～ | ～ |
| OXC804 | Input link 4 | λ3 | Output link 4 |  |

~200

Cross point type optical switch

PI-LOSS type optical switch

FIG. 44

Routing management table

| Equipment | Input link | Wavelength | Output link |
|---|---|---|---|
| OXC1 | # 0 | $\lambda 1$ | # 2 |
| OXC1 | # 0 | $\lambda 2$ | # 2 |
| OXC1 | # 0 | $\lambda 0$ | # 1 |
| OXC2 | # 0 | $\lambda 3$ | # 1 |
| OXC2 | # 2 | $\lambda 0$ | # 1 |
| OXC3 | # 1 | $\lambda 3$ | # 2 |
| OXC3 | # 1 | $\lambda 0$ | # 0 |
| OXC4 | # 1 | $\lambda 3$ | # 0 |
| OXC4 | # 2 | $\lambda 1$ | # 0 |
| OXC4 | # 2 | $\lambda 2$ | # 0 |

FIG. 45

Routing management table

| Equipment | Input link | Wavelength | Output link |
|---|---|---|---|
| OXC1 | # 0 | $\lambda 1$ | # 1 |
| OXC1 | # 0 | $\lambda 2$ | # 1 |
| OXC1 | # 0 | $\lambda 0$ | # 1 |
| OXC2 | # 0 | $\lambda 3$ | # 1 |
| OXC2 | # 2 | $\lambda 1$ | # 1 |
| OXC2 | # 2 | $\lambda 2$ | # 1 |
| OXC2 | # 2 | $\lambda 0$ | # 1 |
| OXC3 | # 1 | $\lambda 1$ | # 2 |
| OXC3 | # 1 | $\lambda 2$ | # 2 |
| OXC3 | # 1 | $\lambda 3$ | # 2 |
| OXC3 | # 1 | $\lambda 0$ | # 0 |
| OXC4 | # 1 | $\lambda 3$ | # 0 |
| OXC4 | # 1 | $\lambda 1$ | # 0 |
| OXC4 | # 1 | $\lambda 2$ | # 0 |

OPTICAL CROSS-CONNECT EQUIPMENT

FIELD OF THE INVENTION

This invention relates to optical cross-connect equipment using optical amplifiers.

BACKGROUND OF THE INVENTION

An optical amplifier consists of a single mode fiber having a diameter of several $\mu$m to several hundreds of $\mu$m, with a small quantity of erbium (the symbol of element: Er) etc. belonging to rare earth elements added into core part of the fiber.

By supplying a pumping light source, the optical amplifier can amplify tens of thousand times an optical signal input to this optical fiber.

The optical amplifier is called EDFA (Erbium doped fiber amplifier). The following description explains a case where an EDFA is used as an optical amplifier. An optical amplifier is generally classified into the following: an optical pre-amplifier having characteristic of low-noise amplification by improving responsivity, and an optical post-amplifier having high output and high saturation output property which enables long-haul transmission by further amplifying optical signals output to an optical transmission link, and so on.

In a backbone network, a wavelength multiplexing method in which a plurality of optical wavelengths are multiplexed has been in use. In such a network, optical cross-connect equipment (OXC) is used for switching optical transmission links at the unit of wavelength.

In case of either addition or removal of an optical transmission link, the number of multiplexed wavelengths in use in optical cross-connect equipment varies, which produces fluctuation in optical signal intensity (full light power) received in optical amplifiers.

When such fluctuation of optical signal intensity brings about optical surge in an optical amplifier or exceeds dynamic ranges in an optical amplifier or a receiver, transmission quality is deteriorated because of reduced S/N (signal to noise ratio) or increased error rate.

Namely, when an optical signal is not input because of a transmission link failure etc., an EDFA (optical amplifier) stores energy as an excited condition and emits a part of energy as an amplified spontaneous emission (ASE) i.e. emission of optical noise. If the transmission link is restored to produce abrupt input restoration of an optical signal, a pulse is generated with extremely high peak level.

This pulse is further amplified in an amplifier provided at a following stage, possibly to produce a damage to an optical signal reception device. Therefore, there is required a transmission system in which the intensity of optical signals to be input to an optical amplifier remains constant.

As mentioned above, while an optical amplifier is required for compensating loss in optical cross-connect equipment, noise is generated during optical amplification. To eliminate this, a wavelength selection means is introduced for selecting wavelengths respectively centered at each wavelength of a signal. Such optical amplifier generally provides a feedback control function such as ALC (automatic level control) to maintain output level constant for stabilizing optical output level. When an input light breaks, ALC is removed to produce a shutdown.

When the input light is restored, this shutdown is removed to resume ALC. It takes time however until light output is stabilized, because an output must gradually be changed to suppress generation of a surge.

A wavelength selection means normally supervises output light to perform feedback control for obtaining optimum wavelength positions. However, when a break occurs in input light, this feedback control is suspended until the input light is restored. This requires time until stabilized output light is restored.

SUMMARY OF THE INVENTION

It is an object of the present invention to provide optical cross-connect equipment using control light sources, enabling high-speed path switchover without producing an optical surge or decreasing transmission quality.

In conventional optical cross-connect equipment, the intensity of optical signals routed thereby varies in case of either a switchover of an optical transmission link caused by a failure etc., or installation or removal of a link. Such variation of intensity produces undesirable effect to transmission quality. In order to solve the above-mentioned problem, there is provided optical cross-connect equipment according to the invention, in which the following configuration is presented.

According to one aspect of the present invention, optical cross-connect equipment includes; an optical pre-amplifier; a routing portion for routing a signal light input through the pre-amplifier to a desired output port; a control light generator for generating a control light corresponding to the signal light; a selector for selecting either the input signal light received from the routing portion or the input control light to output; and a post-amplifier for amplifying the signal light or control light received from the selector.

Preferably, as an embodiment of the present invention, the signal light input through the pre-amplifier is a multi-wavelength signal light. The optical cross-connect equipment further includes a demultiplexer for splitting the multi-wavelength signal light. The routing portion routes the split signal light to a desired port. The split signal light is input to a selector. The control light input to the selector has a wavelength identical to the split signal light.

According to another aspect of the present invention, optical cross-connect equipment includes; an optical pre-amplifier; a demultiplexer which receives a multi-wavelength signal light for splitting into signal lights respectively having each plurality of wavelengths; and a routing portion for routing each signal light having each plurality of wavelengths split by the demultiplexer to a desired output port. The routing portion includes; a control light generator for generating control lights each corresponding to the signal light; a route switching means for switching signal lights having a plurality of wavelengths split by the demultiplexer to output; an optical amplification means for amplifying each signal light having each plurality of wavelengths output from the route switching means; a control light insertion portion for inserting the control light generated by the control light generator into an output of the optical amplification means; and a wavelength selection means for selecting an output of the control light insertion portion having a wavelength assigned to the wavelength selection means to output.

According to another aspect of the invention, preferably the control light insertion portion supplies, in advance to the route switching by said route switching means, a control light having a wavelength for use after a switchover to the wavelength selection means.

According to still another aspect of the invention, optical cross-connect equipment includes; an optical pre-amplifier; a demultiplexer which receives multi-wavelength signal light to output split-wavelength signal lights having each plurality of wavelengths; and a routing portion which routes each signal light having each plurality of wavelength split by the demultiplexer to each desired output port. The routing portion further includes; a control light generator for generating control lights corresponding to the respective signal lights; a route switching means for routing signal lights each having each plurality of wavelengths split by the demultiplexer for switching route to output; a control light insertion portion for inserting the control lights generated by the control light generator into the signal lights having a plurality of wavelength output from the route switching means; an optical amplifier for amplifying the output from the control light insertion portion; and a wavelength selection means for selecting an output of the optical amplification means having a wavelength assigned to the wavelength selection means to output.

According to a still further aspect of the invention, preferably the routing portion includes; a control light generator for generating control lights respectively corresponding to the signal lights; a route switching means for switching a route of the signal light having a plurality of wavelengths each split by the demultiplexer; a control light insertion portion connected at the preceding stage of the route switching means for inserting the control light generated by the control light generator into the signal light having a plurality of wavelengths; an optical amplification means for amplifying an output of the route switching means; a wavelength selection means for selecting an output of the optical amplification means having a wavelength assigned to the wavelength selection means to output.

Any further features of the present invention will become more apparent by the description on the embodiments referring to the accompanied charts and drawings.

BRIEF DESCRIPTION OF THE DRAWINGS

FIG. 2 is a diagram illustrating a routing management table.

FIG. 44 is a routing management table provided in an operation system.

FIG. 45 is a routing management table for illustrating an operation in the case shown in FIG. 43.

DETAILED DESCRIPTION OF THE INVENTION

The embodiments of the present invention will be described hereinafter referring to the accompanied charts and drawings, wherein like numerals or symbols refer to like parts.

Before explaining the embodiments of the invention, however, conventional technologies are explained in detail for better understanding of the present invention.

Figure 42:
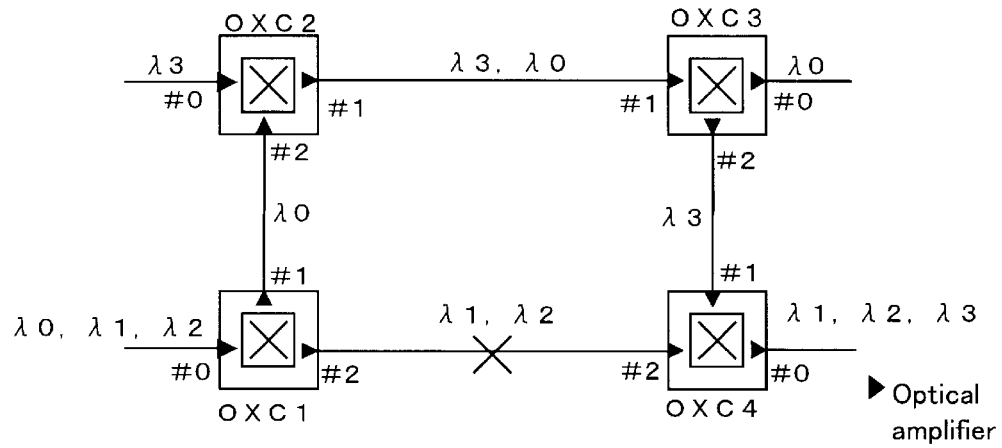
FIG. 42 is a network system including optical cross-connect equipment, showing a state before a switchover of optical transmission links is performed on occurrence of a failure.
Figure 43:
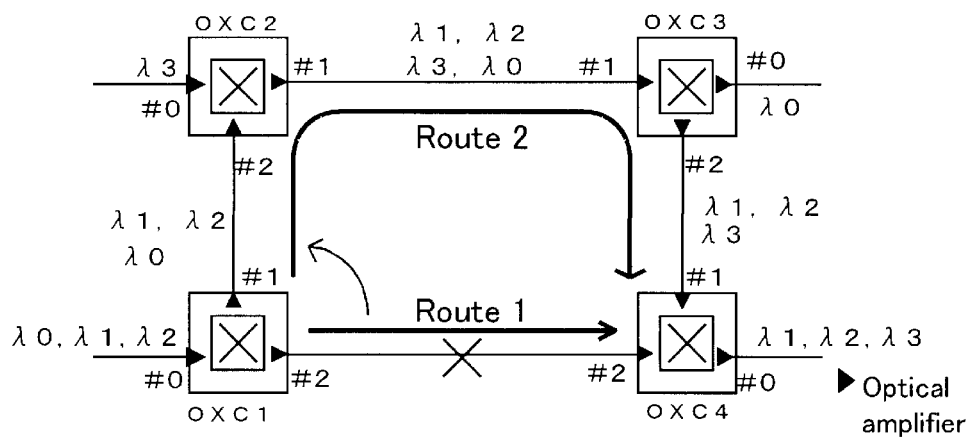
FIG. 43 is a network system, in comparison with the configuration shown in FIG. 42, showing a state after a transmission link switchover is performed.

In FIGS. 42 and 43, there is shown an example of a network system where conventional optical cross-connect equipment is applied. More particularly, FIG. 42 illustrates a network system including the optical cross-connect equipment before a switchover of an optical transmission link is carried out in the event of a failure.

In FIG. 42, the network system includes optical cross-connect equipment OXC1, OXC2, OXC3 and OXC4 connected through optical transmission links.

In addition, the system includes an operation system (not shown) to control optical cross-connect equipment OXC1–OXC4 and optical amplifiers provided at input and output terminals of optical cross-connect equipment OXC1–OXC4.

For managing each optical transmission link, there is provided a routing management table in the operation system as shown in FIG. 44. According to a command issued by the operation system, each optical cross-connect equipment OXC1–OXC4 switches input and output links at the unit of wavelength.

Accordingly, network system resources such as input links (#0–#2), wavelengths ($\lambda 0$–$\lambda 3$) and output links (#0–#2) are managed by the routing management table.

Hereafter, a study is given to wavelengths $\lambda 1$ and $\lambda 2$ used for the transmission between optical cross-connect equipment OXC1 and OXC2 shown in FIG. 42.

In FIG. 43, a state of the network system after a switchover is illustrated against a previous state shown in FIG. 42. In FIG. 42, transmission is carried out using wavelengths $\lambda 1$ and $\lambda 2$ through a link between optical cross-connect equipment OXC1 and OXC4. On occurrence of failure (at the point marked X) which causes the link unusable, a transmission link using wavelengths $\lambda 1$ and $\lambda 2$ is switched to a diversion transmission link from OXC1 through OXC2, OXC3 and OXC4 using standby wavelengths, as shown in FIG. 43.

Accordingly, a usable path similar to that shown in FIG. 42 can be maintained. To explain more concretely, on occurrence of the failure, the operation system switches an output link of optical cross-connect equipment OXC1, i.e. from #2 to #1 in regard to $\lambda 1$ according to the routing management table as shown in FIG. 45. At optical cross-connect equipment OXC2, link #2 is newly established as an input link and also link #1 is established as an output link.

Also link #1 is established as an input link of optical cross-connect equipment OXC3, and link #2 is established as an output link. Link #2 as an input link of optical cross-connect equipment OXC4 is switched to link #1.

Similar switchover is carried out for wavelength $\lambda 2$: an output link of optical cross-connect equipment OXC1 is switched from #2 to #1. At optical cross-connect equipment OXC2, link #2 is newly established as an input link and also link #1 is established as an output link.

Also at optical cross-connect equipment OXC3, link #1 and link #2 are newly established as an input link and an output link, respectively. At optical cross-connect equipment OXC4, an input link is switched from link #2 to link #1.

Through the above mentioned switchover, path setting and releasing to compose a diversion transmission link, wavelengths $\lambda 1$, $\lambda 2$ are newly added in the transmission of optical signals between optical cross-connect equipment OXC1 and OXC2, optical cross-connect equipment OXC2 and OXC3, and optical cross-connect equipment OXC3 and OXC 4.

As a result, there arises variation in the signal intensity on optical signals input into pre-amplifiers and output from post-amplifiers in optical cross-connect equipment OXC2, OXC3 and OXC4. Such variation produces an optical surge in optical amplifiers, deterioration of S/N (signal to noise ratio) or increased error rate, which result in reduced transmission quality.

The present invention, therefore, aims to provide a transmission system having the constant optical signal intensity input to optical amplifiers, as mentioned above.

Figure 46:
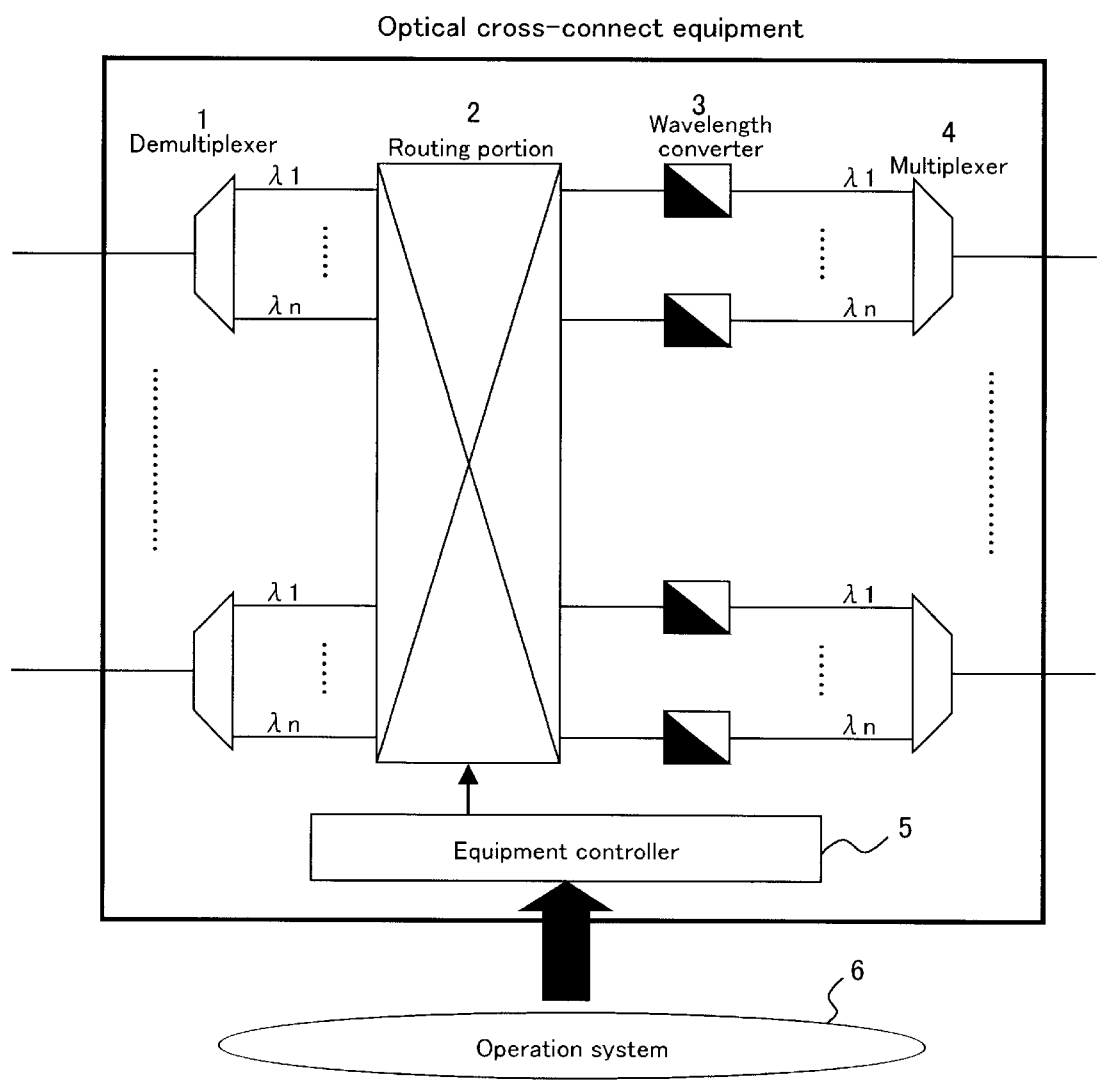
FIG. 46 is a general configuration example of optical cross-connect equipment.

Now, a configuration of the above optical cross-connect equipment is explained hereafter. In FIG. 46, a configuration example of typical optical cross-connect equipment is shown. The equipment includes; a demultiplexer 1 for demultiplexing multiplexed optical signals received from input transmission link; a routing portion 2 for routing a signal light to a desired output port; a wavelength converter 3 for converting a wavelength of the input signal light to a desired wavelength; and a multiplexer 4 for multiplexing the wavelength converted signal light.

A plurality of demultiplexers 1 are provided, each corresponding to a multiplexed link to demultiplex wavelengths λ1–λn included in each multiplexed link. Routing portion 2 is controlled by operation system 6 to switch over transmission links through an equipment controller 5.

Wavelength converter 3 converts wavelengths of optical signals received from routing portion 2 into predetermined wavelengths (λ1, . . . λn) to send to multiplexer4. In multiplexer 4, optical signals having a different plurality of input wavelengths are multiplexed to output.

Figure 47:
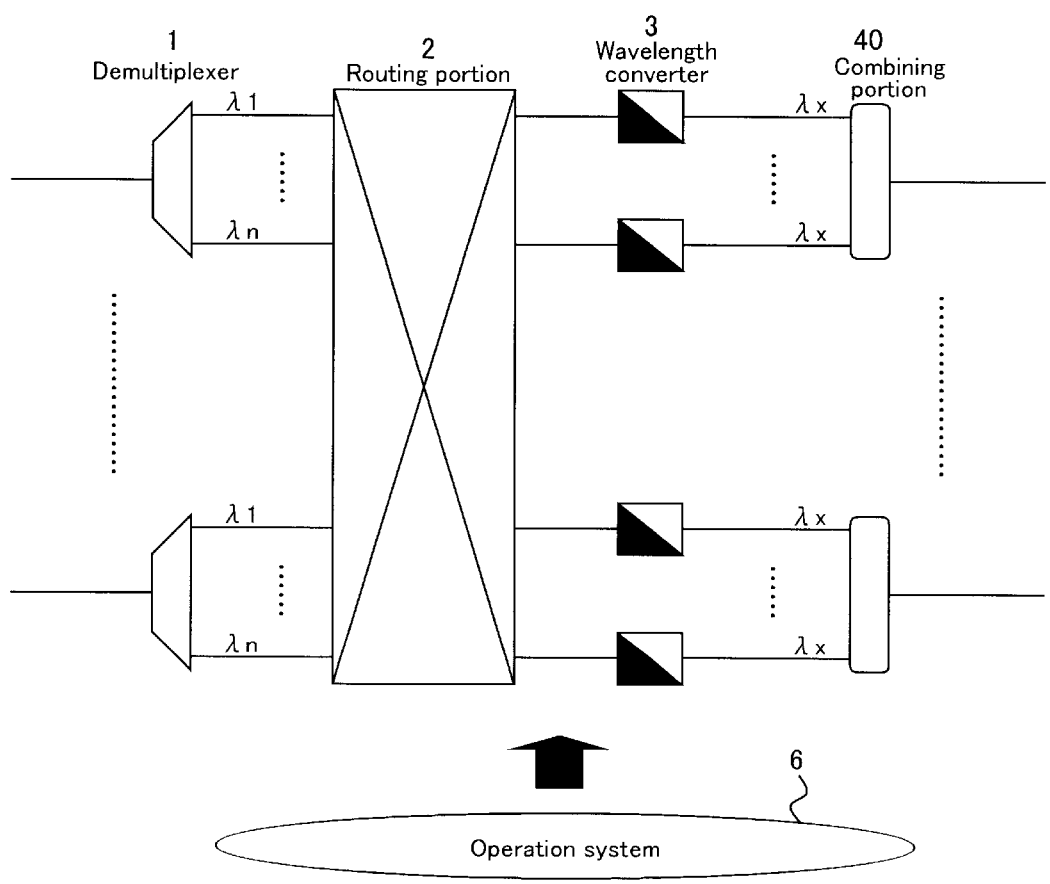
FIG. 47 is a configuration example in which an output wavelength of wavelength converter 3 has an arbitrary value instead of a fixed value.

In FIG. 47, a configuration example is shown in which output wavelengths from wavelength converter 3 have arbitrary values, instead of fixed values. Therefore, instead of multiplexer 4 shown in FIG. 46, combining portion 40 is provided in the configuration in FIG. 47.

For simplification, equipment controller 5 shown in FIG. 46 is omitted in FIG. 47, as well as in the following drawings illustrating conventional examples. In FIG. 47, λx denotes an arbitrary wavelength.

Figure 48:
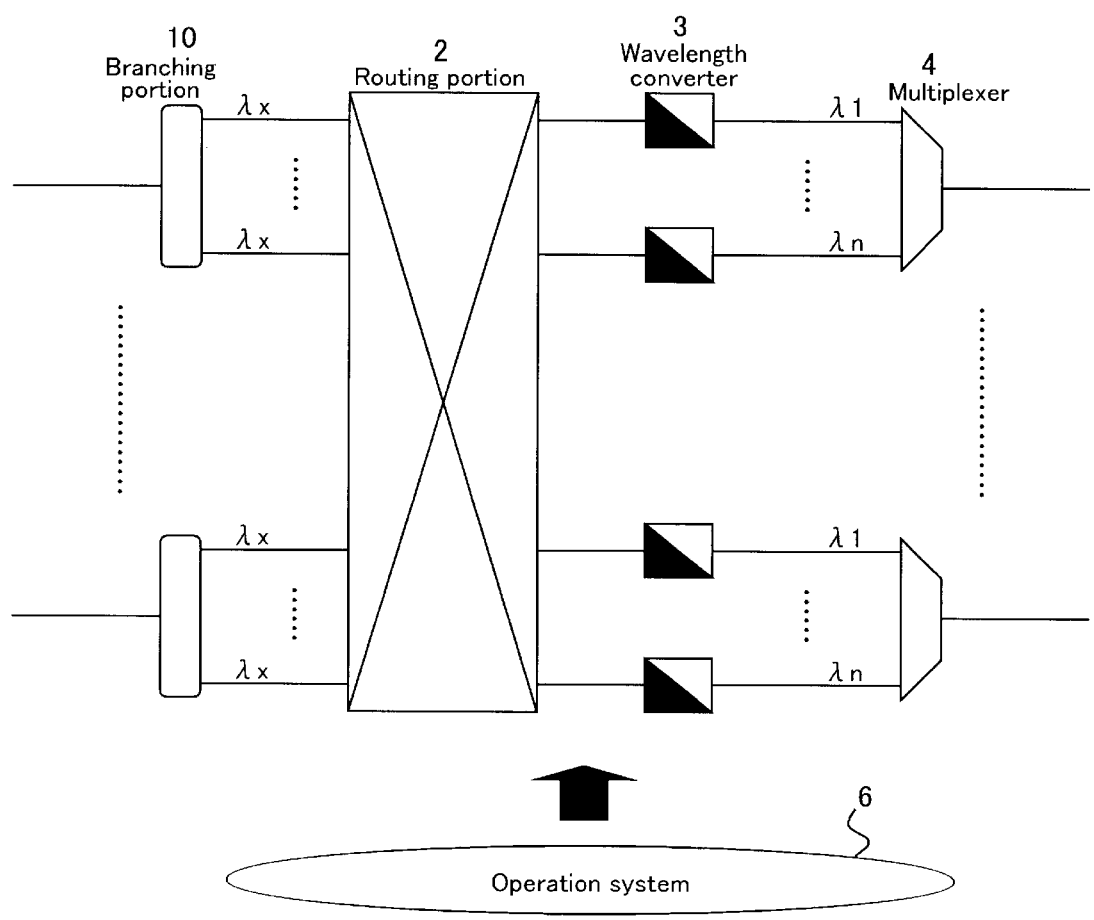
FIG. 48 is a conventional configuration example in which an output of a wavelength converter has a fixed wavelength; instead of demultiplexing a multi-wavelength signal.

FIG. 48 shows another example of a conventional configuration. Instead of demultiplexing input multi-wavelength signals, a branching portion 10 is provided for branching received signals to a plurality of inputs of routing portion 2, whereby a desired wavelength is selected to convert to a predetermined wavelength in wavelength converter 3. In multiplexer 4, optical signals having different plurality of wavelengths are output in the form of multi-wavelength signals.

Figure 49:
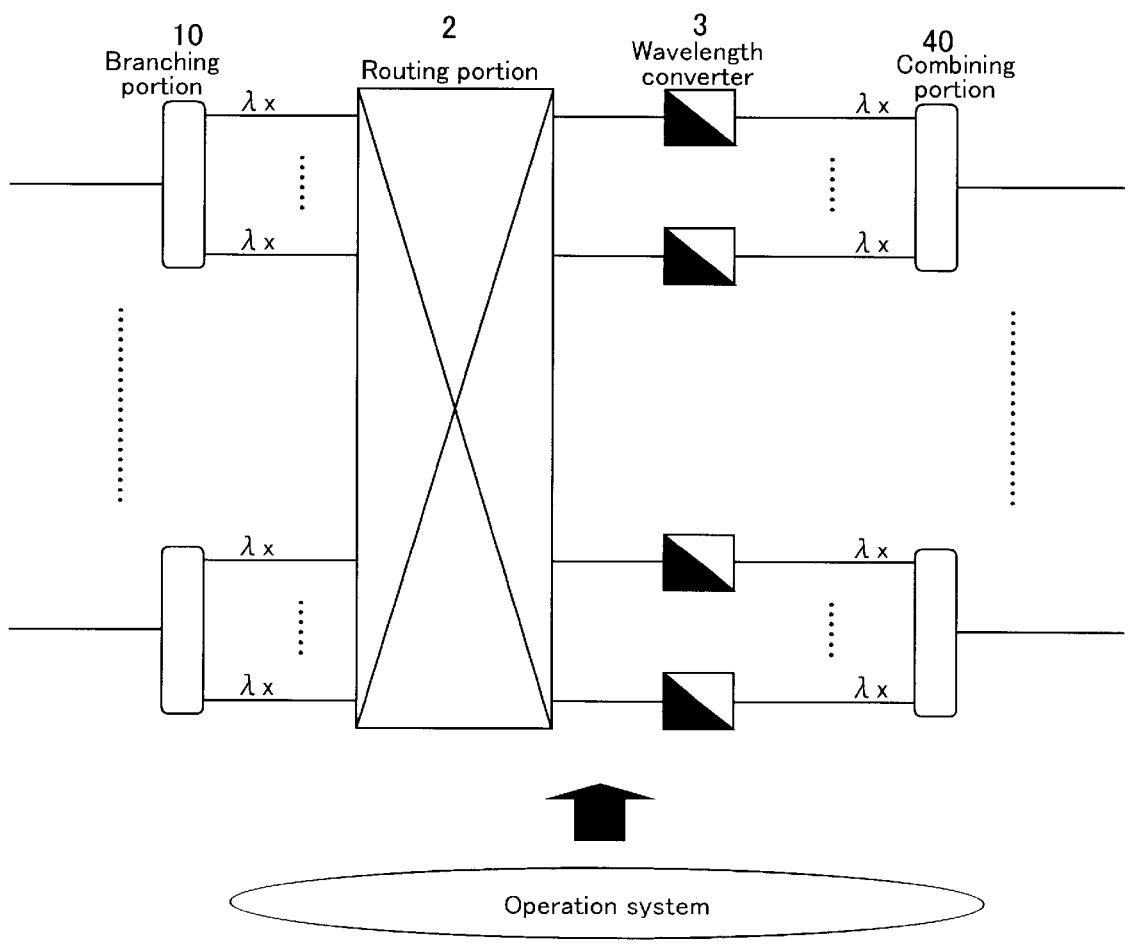
FIG. 49 is a conventional configuration in which configurations shown in FIG. 47 and FIG. 48 are combined.

In FIG. 49, there is shown a combined configuration of those shown in FIG. 47 and FIG. 48. Input multi-wavelength signals are not demultiplexed, but are branched to a plurality outputs by a branching portion 10. A desired wavelength signal is selected in routing portion 2 to convert to arbitrary wavelength signal output by wavelength converter 3. Therefore, outputs of wavelength converter 3 are combined to forward to a transmission link.

In addition to the four examples explained above, there is Ad considered another conventional optical cross-connect equipment without wavelength conversion. In this example, wavelength converter 3 is not necessary. As wavelength converter 3, there has been used either an optical conversion (i.e. without converting to electric signal) using a semiconductor optical amplifier or a combination of an opto-electric converter and an electro-optical converter.

Also, as demultiplexer 1 or multiplexer 4, an element using arrayed-waveguide grating or dielectric multilayered film, etc. can be used. Combining portion 40 and branching portion 10 comprises optical fiber couplers.

As mentioned above, optical cross-connect equipment accommodates a plurality of input/output optical transmission links to receive multi-wavelength optical signals and performs routing function to forward each optical signal to a desired transmission link at the unit of wavelength. Operation system 6 supervises and controls the optical cross-connect equipment performing such function as path setting in routing portion 2.

Compared with conventional electrically processed equipment, a larger amount of traffic can be handled in such optical network having optical cross-connect equipment connected by transmission links.

In the event of failure in a transmission link or equipment, it is important to switch with high speed the transmission link or equipment to a standby link, equipment or an alternative route. The present invention presents a configuration of optical cross-connect equipment, particularly a new routing portion, in an optical network to realize a fast switchover of an optical path.

A feature of the routing portion according to the present invention is explained in this description in comparison with conventional examples.

Figure 1:
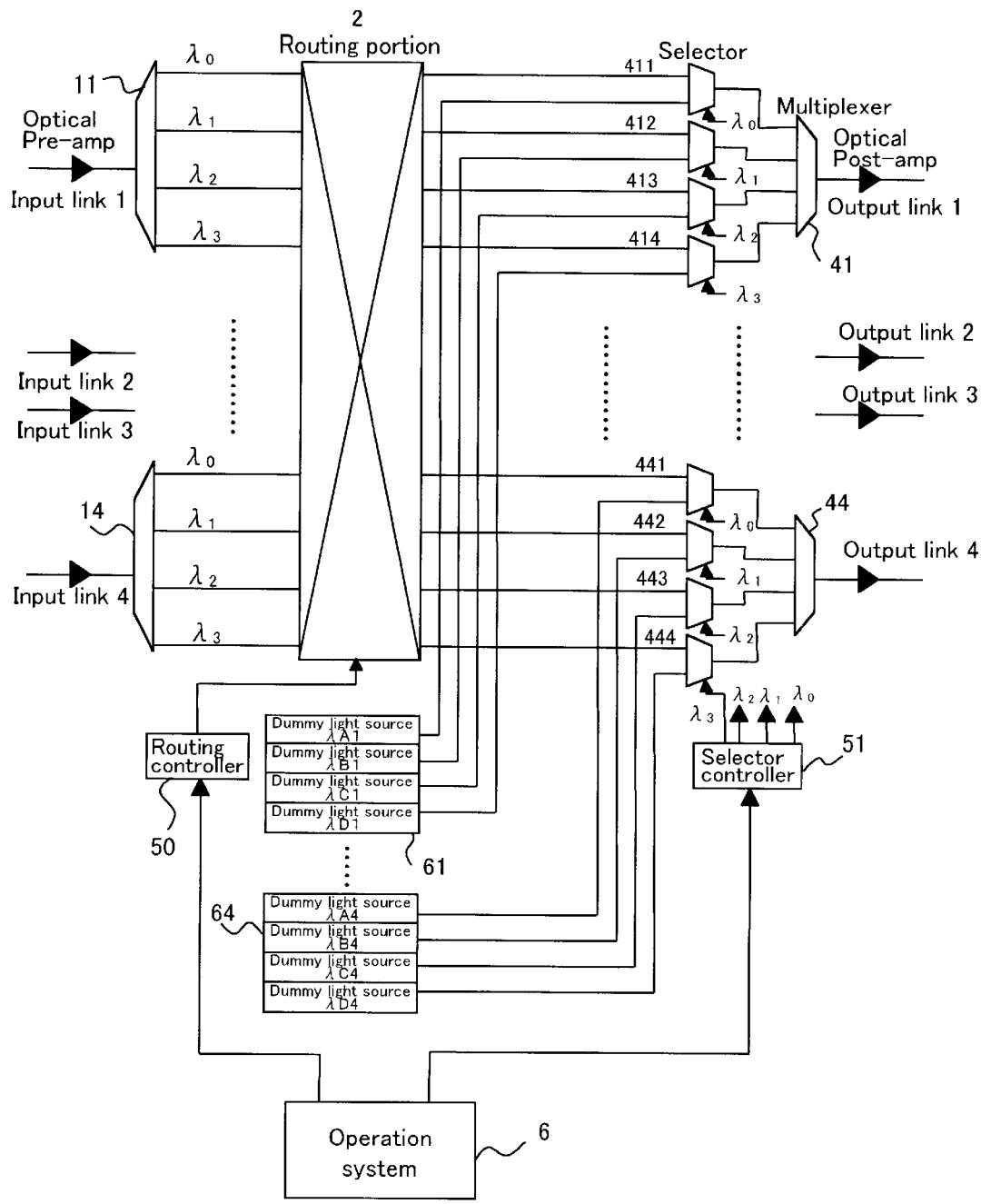
FIG. 1 is a block diagram illustrating the first embodiment of optical cross-connect equipment according to the present invention.

In FIG. 1, there is shown a block diagram of the first embodiment of optical cross-connect equipment according to the present invention. The following explanation relates to an operation of the embodiment shown in FIG. 1. The description of operation is applicable to independent optical cross-connect equipment OXC1 to OXC4. However, note that the optical cross-connect equipment according to the present invention is not restricted to the embodiments described here.

In FIG. 1, from input links 1–4, optical signals having four wavelengths (λ0, λ1, λ2, λ3) multiplexed link by link are input through optical pre-amplifiers. The optical signals are split into four (4) wavelengths by corresponding demultiplexers 11–14 to input to routing portion 2 (demultiplexers 12 and 13 are not shown in FIG. 1).

As an example of a routing table is shown in FIG. 2, there is set and managed information such that wavelength λ1 received from input link 1 is forwarded to output link 1, and that the current use condition of λ1 is ON.

Operation system 6 determines connection states to be switched between input links 1–4 and output links 1–3, respectively connected to optical cross-connect equipment OXC1, OXC2, OXC3 and OXC4 at the unit of wavelength the connection, according to the routing management table shown in FIG. 2.

A description on wavelength λ1 is presented in the following among the four wavelengths input into routing portion 2. In addition it is supposed that optical cross-connect equipment OXC1 in FIG. 42 has a configuration shown in FIG. 1. An optical signal of λ1 received from input link 1 and demultiplexed by demultiplexer 11 is input to routing portion 2.

In the routing table shown in FIG. 2, it is currently indicated that wavelength λ1 received from input link 1 is forwarded to output link 1, and that a current use state 205 of wavelength λ2 is ON.

Therefore, λ1 is routed by routing portion 2 to selector 412 connected to an input of multiplexer 41 located on output link 1 side. Operation system 6 orders a selector controller 51 that selectors 411–414 connected to output link 1 select optical signals from routing portion 2. Thus selector controller 51 completes to set selector 411–414 connected to output link 1 so that output from routing portion 2 is selected.

On the other hand, in use state 205 in the routing management table shown in FIG. 2, wavelength λ0 of output link 1 connected to optical cross-connect equipment OXC1 is currently shown OFF. Accordingly, by the control of selector controller 51, selector 411 selects an optical signal of wavelength λ A1 from dummy light source 61 which corresponds to wavelength λ0 to output to multiplexer 41.

Each multiplexer 41–44 multiplexes optical signals having wavelengths output from respective selectors 411–414, 421–424, 431–434 and 441–444, to forward to corresponding optical post-amplifier. Then the post-amplifier amplifies multi-wavelength optical signals to output to an optical transmission link. Here, to simplify the drawing, multiplexers 42, 43 and selectors 421–424 and 431–434 are not shown in FIG. 1.

Accordingly, multiplexers 41–44 can feed to optical post-amplifiers optical signals with the constant intensity in which four (4) wavelengths are multiplexed at any time. In an optical network using optical cross-connect equipment of the present invention, the intensity of optical signals input to optical pre-amplifiers and post-amplifiers is maintained constant even in the event of a optical transmission link failure.

As easily understood from the above explanation, wavelengths ($\lambda An$, $\lambda Bn$, $\lambda Cn$, $\lambda Dn$ where n=1, 2, 3, 4) used in dummy light sources 61–64 respectively correspond to four wavelengths ($\lambda 0, \lambda 1, \lambda 2, \lambda 3$) of outputs from demultiplexers 11–14. As optical signals of dummy light sources 61–64, either modulated or non-modulated optical signals can be used.

Figure 3:
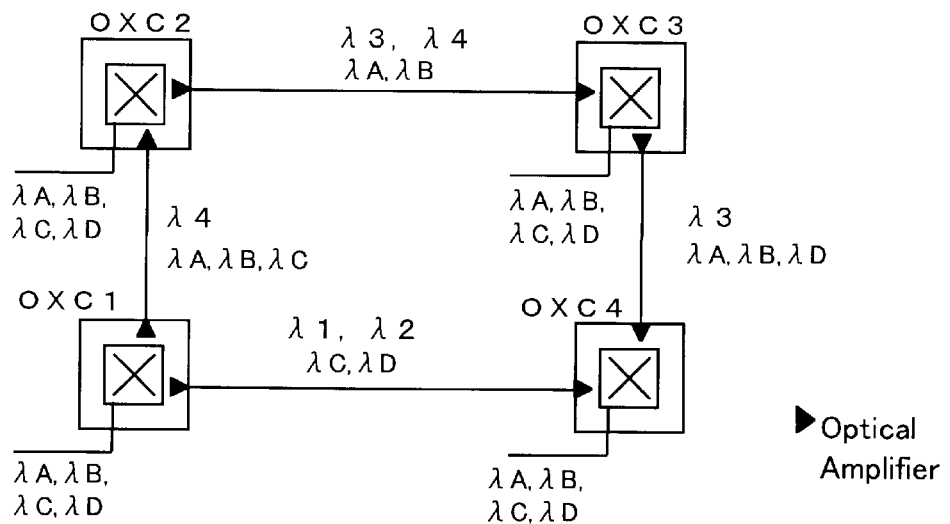
FIG. 3 is a general diagram of the configuration shown in FIG. 1 illustrating a situation of communication being carried out among four (4) units of optical cross-connect equipment.
Figure 4:
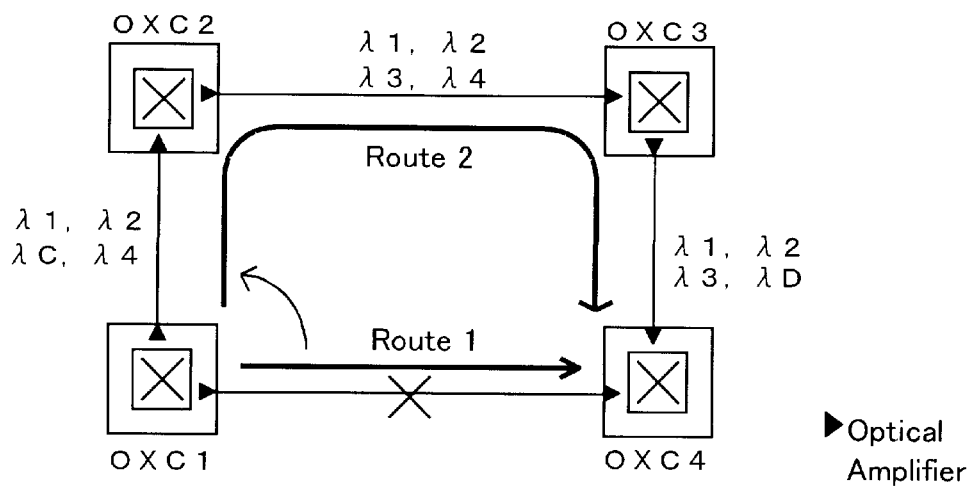
FIG. 4 is a general diagram of the configuration shown in FIG. 1 illustrating a situation of transmission through a diversion transmission link.

Now, the configuration shown in FIG. 1 is explained in general using FIGS. 3 and 4. In FIG. 3, communication is carried out between optical cross-connect equipment OXC1, OXC2, OXC3 and OXC4.

More concretely, communication from OXC1 to OXC2 is carried out using multi-wavelengths $\lambda A$, $\lambda B$, $\lambda C$ and $\lambda 4$. Similarly, communication from OXC2 to OXC3 is carried out using multi-wavelengths $\lambda A$, $\lambda B$, $\lambda 3$ and $\lambda 4$, communication from OXC3 to OXC4 using multi-wavelengths $\lambda A$, $\lambda B$, $\lambda 3$ and $\lambda D$, and communication from OXC1 to OXC4 is carried out using multi-wavelengths $\lambda 1$, $\lambda 2$, $\lambda C$ and $\lambda D$.

Here, $\lambda A$, $\lambda B$, $\lambda C$ and $\lambda D$ are dummy lights generated from dummy light sources 61–64 having the same optical power as signal lights, to be used in place of wavelength(s) which is not currently used.

Now, it is supposed that a failure occurs in a transmission link between optical cross-connect equipment OXC1 and OXC4. As shown in FIG. 4, optical cross-connect equipment OXCI, upon detecting this failure, switches signals of wavelengths $\lambda 1$ and $\lambda 2$ from route 1 to route 2. At this time, it is possible to maintain optical input level unchanged between a post-amplifier of optical cross-connect equipment OXC1 and a pre-amplifier of optical cross-connect equipment OXC2 (transmission with four waves to use four waves). As a result, it is possible to perform transmission without reducing S/N ratio as well as without increasing error rate. More strictly, when a switchover is carried out between main signals and dummy lights in selectors 411–414, 421–424, 431–434 and 441–444, deviation of optical output level occurs during the selector switchover time.

If a sequential switchover is controlled to execute one wave by one by the control of selector controller 51, then at the post-amplifier of optical cross-connect equipment OXC1, the number of waves in use changes such as 4→3→4→3→4. Therefore, variation of optical power can be limited within the power for one wave.

Figure 5A:
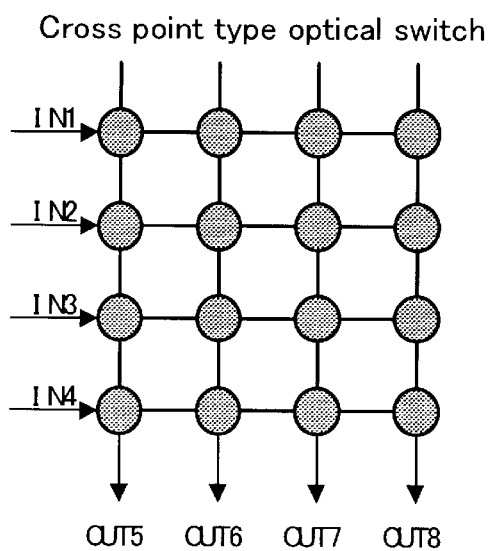
FIGS. 5A and 5B are configuration examples of routing portion 2 having a 4×4 optical switch.
Figure 5B:
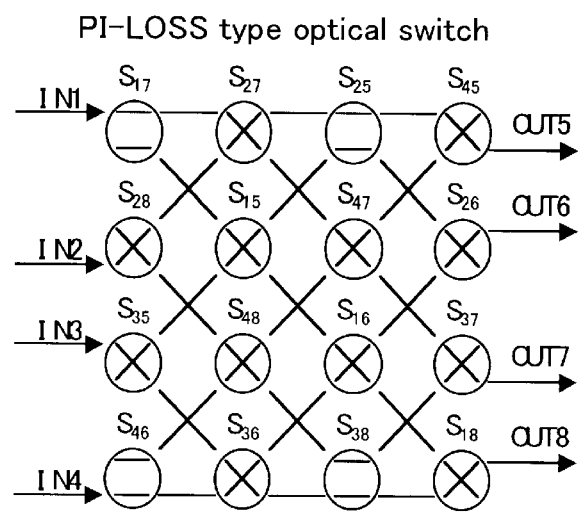

In FIG. 5, a configuration example of above-mentioned routing portion 2 having a 4×4 optical switch is shown. Optical signals input into a cross point switch shown in FIG. 5A or a PI-LOSS optical switch are respectively routed to output to desired routes as shown in FIG. 5B.

Located at respective 16 cross points on which INn (n=1 to 4) and OUTn (n=5 to 8) cross, an optical switch element of Mach-Zehnder interferometer type is applicable.

Figure 6B:
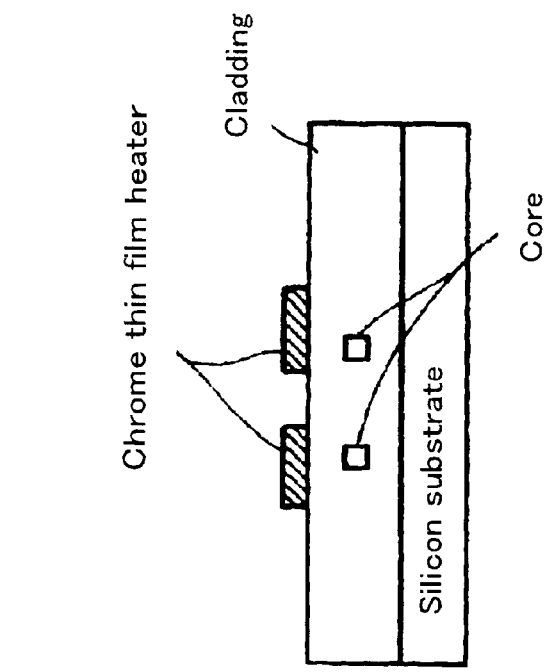
FIGS. 6A and 6B are diagrams illustrating a switch element of Mach-Zehnder interferometer type.
Figure 6A:
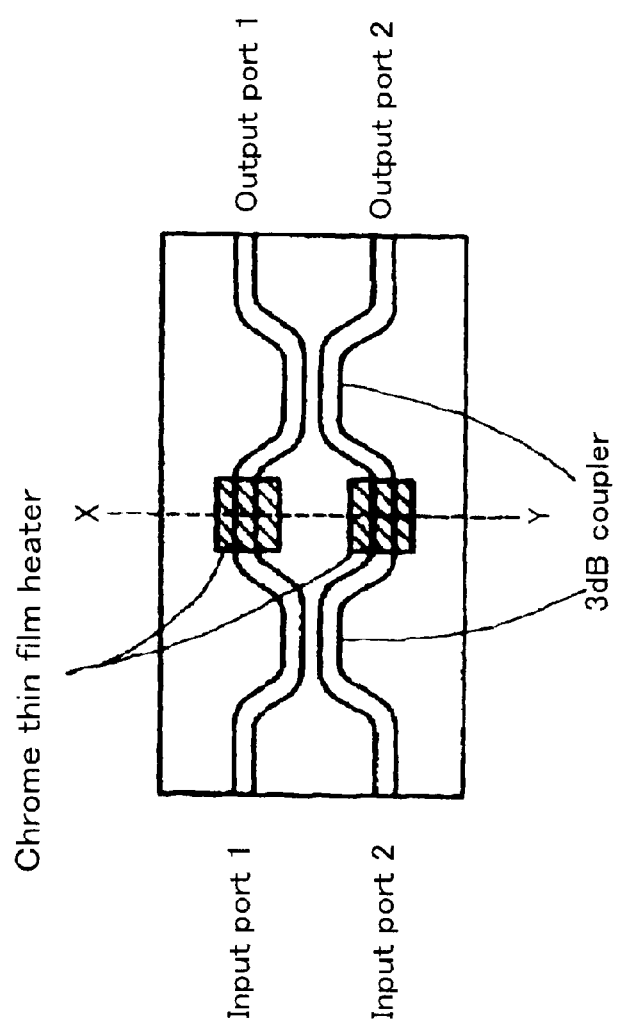

In FIGS. 6A and 6B, the optical switch element of Mach-Zehnder interferometer type is illustrated. FIG. 6A shows a top-view, and FIG. 6B shows an X-Y cross-sectional view. Two optical waveguides made of quartz glass on a silicon substrate are provided in an optical switch element which has two input ports. Optical signals input therefrom are branched by a 3 dB coupler.

In each optical waveguide after branching, a chrome thin film heater is provided to produce thermal change. A refractive index of the optical waveguide is changed by the thermal change. By controlling this change of the refractive index, an optical signal input from input port 1 can be output either of output port 1 or 2. Similarly, an optical signal input from input port 2 can also be output either output port 1 or output port 2. In addition, when optical signals are simultaneously input from input ports 1 and 2, these signals can respectively be switched to output either output port 1 or output port 2.

Figure 7:
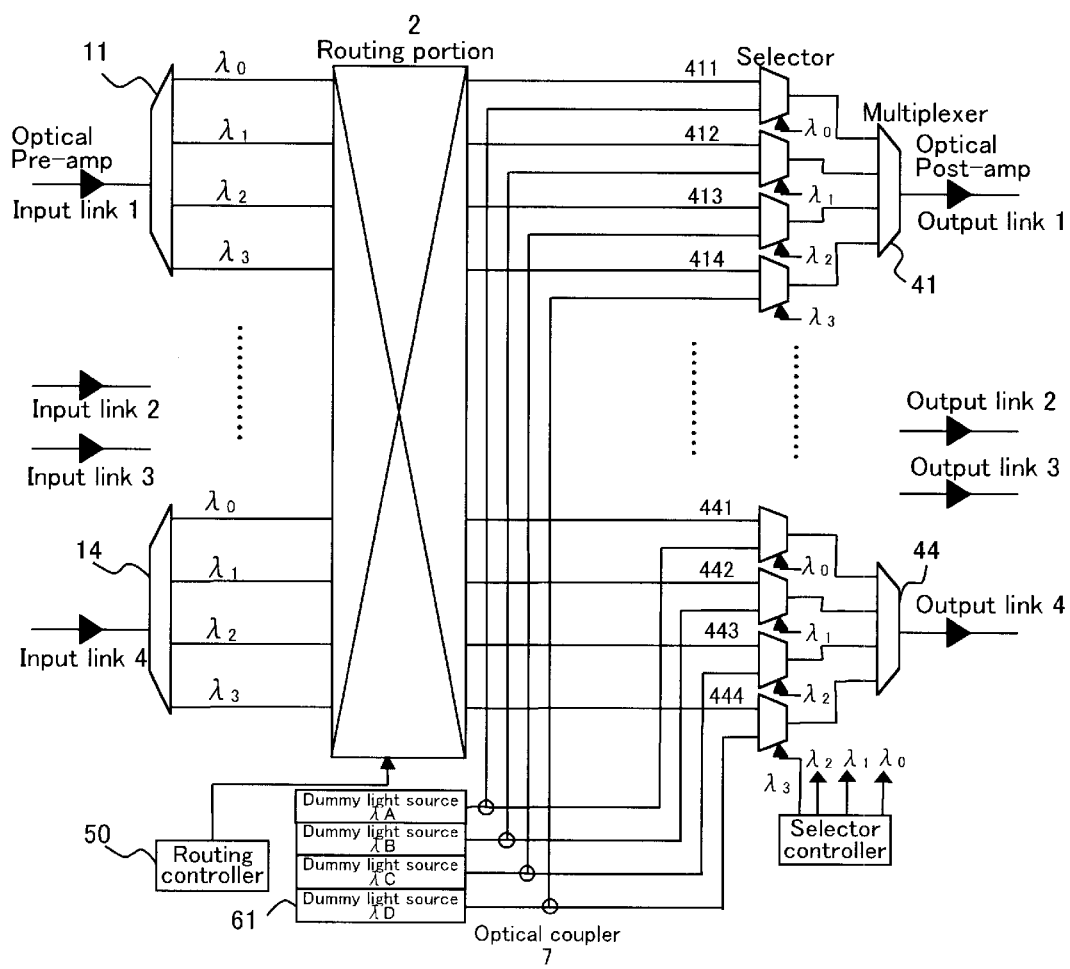
FIG. 7 is a block diagram illustrating the second embodiment of the present invention.

In FIG. 7, the second embodiment of the present invention is shown. In the aforementioned first embodiment of the invention as shown in FIG. 1, light sources produced by dummy light sources 61–64 are used to select in place of wavelengths not in use for transmission, to maintain the intensity of optical signals input to optical post-amplifiers. A set of light sources 61–64 is therefore required as dummy sources, corresponding to respective four links 1–4.

In the second embodiment of the invention, on the other hand, only one dummy light source is provided for a dummy light source for common use, which can produce large power. Using an optical coupler, an optical signal from dummy light source 61 is distributed to links 1–4. Here, each wavelength ($\lambda A$, $\lambda B$, $\lambda C$, $\lambda D$) generated by dummy light source 61 corresponds to wavelengths ($\lambda 0$, $\lambda 1$, $\lambda 2$, $\lambda 3$) which equal to wavelengths output from demultiplexer 11–14, respectively.

Other configuration and operation are similar to those shown in FIG. 1, therefore repeated descriptions are omitted.

Figure 8:
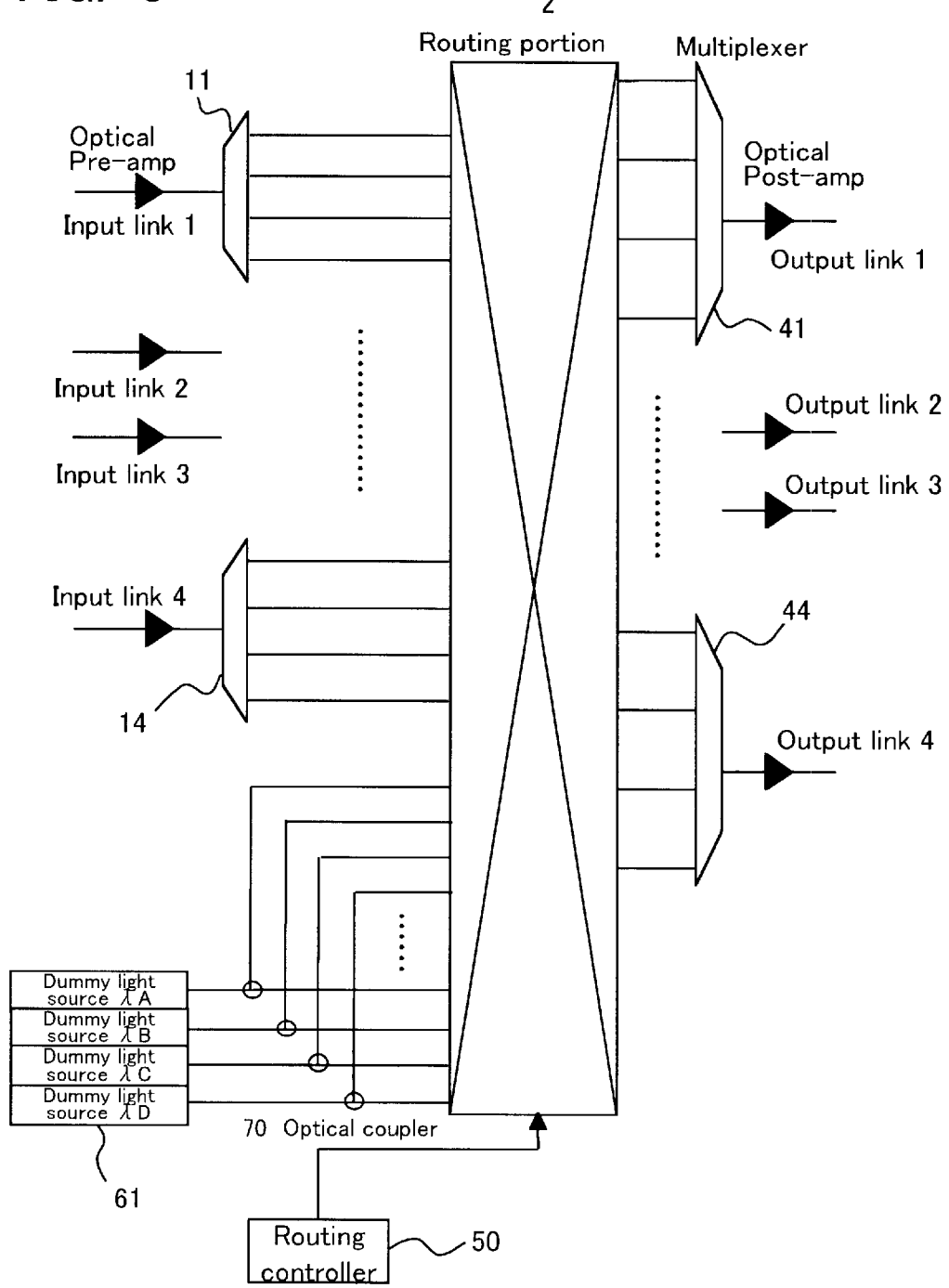
FIG. 8 is a block diagram illustrating the third embodiment of the present invention.

In FIG. 8, the third embodiment of the present invention is illustrated. In the first and second embodiments described above, optical signals from dummy light sources 61–64 are input into latter stages of routing portion 2. Also, selectors 411–414, 421–424, 431–434 and 441–444 respectively select optical signals either from routing portion 2 or from dummy light source 61–64.

On the other hand, in the third embodiment of the invention, a signal from dummy light source 61 is dispatched by optical coupler 70 to input to routing portion 2. Here, dummy light source 61 produces wavelengths having the identical number to the total number of multiple-wavelength included in links 1–4 (i.e. 4 wavelengths×4 links).

In FIG. 8, with regard to wavelengths of an optical signal which are not in use for transmission, routing controller 50 controls routing portion 2 to route an optical signal from dummy light source 61 to output according to an order from an operation system (not shown). Thus the intensity of optical signals input to optical post-amplifiers through multiplexers 41–44 remains constant.

Namely, with regard to a wavelength of an output link of which use state is set OFF in a routing management table shown in FIG. 2, routing portion 2 routes to the output link an optical signal from dummy light source 61 having the corresponding wavelength.

It is also possible to output a dummy light to an output link of which signal light is currently OFF, irrespective of a state stored in a routing management table. This case is explained in the following.

Figure 9:
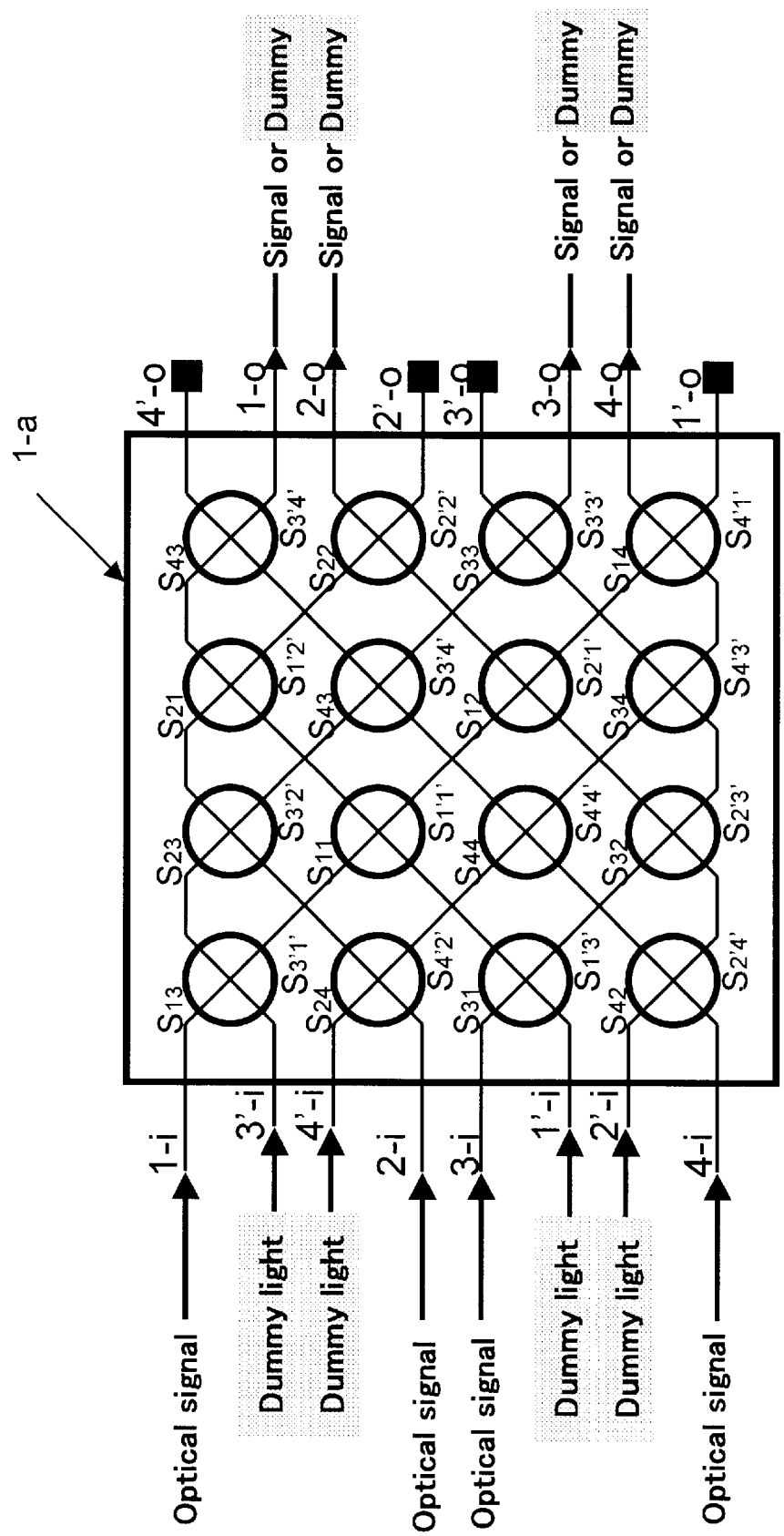
FIG. 9 is a concrete configuration example using 4x4 PI-LOSS optical matrix switch 1-a in routing portion 2.

In FIG. 9, there is shown a concrete example using a 4×4 PI-LOSS optical matrix switch in routing portion 2. Optical signal from each input link is connected to input ports 1-i to 4-i of PI-LOSS optical matrix switch 1-a. Dummy light source 61 is dispatched by optical coupler 70 to connect to input ports 1'-i to 4'-i of PI-LOSS optical matrix switch 1-a. Optical signal is then output to each link from each output port 1-o to 4-o of PI-LOSS optical matrix switch 1-a. Output ports 1'-o to 4'-o of PI-LOSS optical matrix switch 1-a are optically terminated.

Figure 10A:
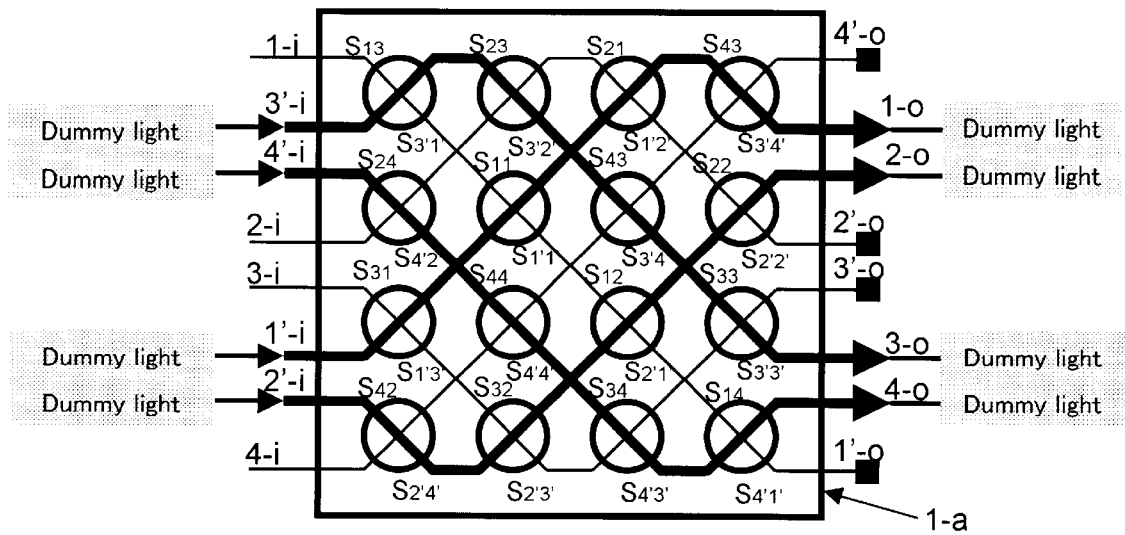
FIGS. 10A and 10B are concrete operation examples of routing portion 2 using 4×4 PI-LOSS optical matrix switch 1-a.
Figure 10B:
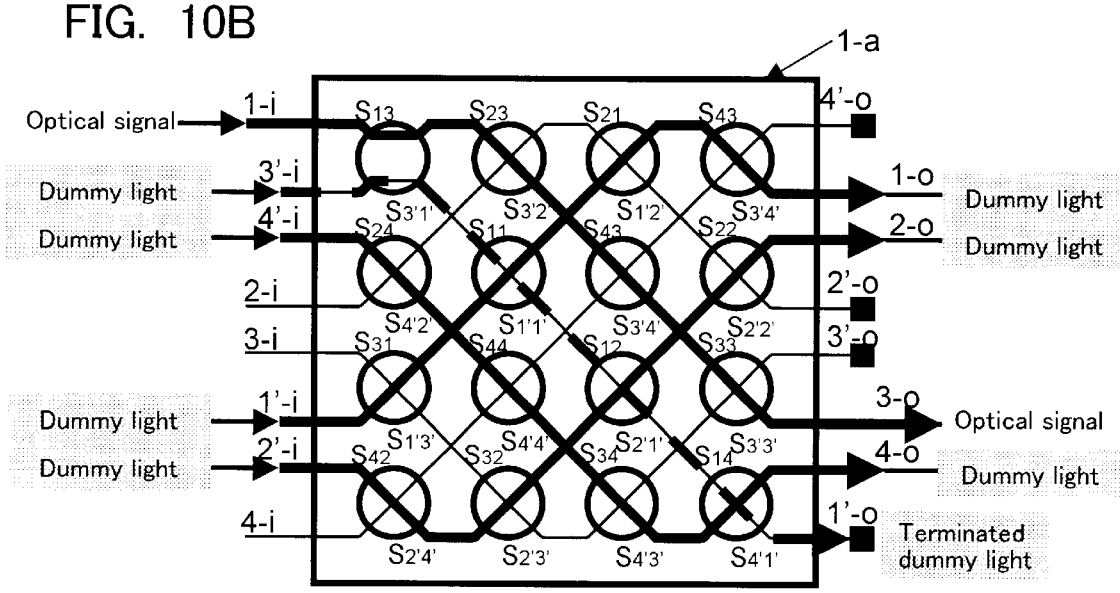

In FIGS. 10A and 10B, a concrete operation example when using 4×4 PI-LOSS optical matrix switch 1-a in routing portion 2 is illustrated. In FIG. 10A, there is shown a case that no optical signal is being transmitted on any of the input links. In this case, optical signals from dummy light sources 61 are controlled to route to each output port. In FIG. 10B, another example is shown that an optical signal is input from a link to input port 1-i of PI-LOSS optical matrix switch 1-a, and that no optical signal is input from links to other input ports 2-i to 4-i.

In this case, optical signal from the optical link connected to input port 1-i is routed to output port 3-o. On the other hand, optical signals from dummy light sources 61 are routed to other output ports 1-o, 2-o and 4-o each having no optical signal transmitted from other optical links. Accordingly, by controlling to select optical signals to each output port either from the input links or from dummy light sources 61, the intensity of optical signals input to optical post-amplifiers remains constant.

Figure 11:
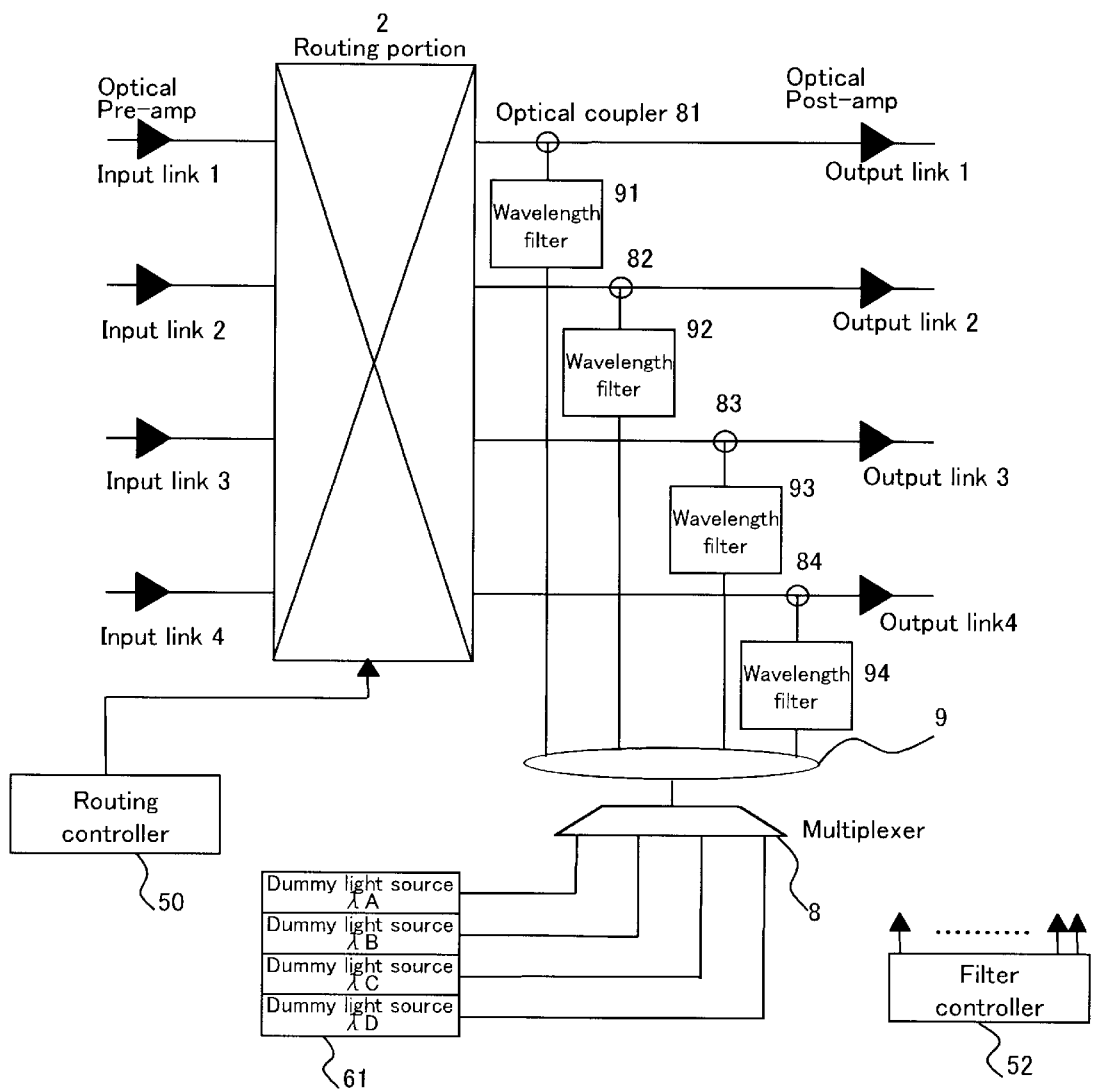
FIG. 11 is a block diagram illustrating the fourth embodiment of the present invention.

In FIG. 11, the fourth embodiment of the present invention is shown. In this embodiment, multi-wavelength optical signals from input links 1–4 are respectively input to routing portion 2 without wavelength splitting. In routing portion 2, input optical signals are split into each wavelength to route to respective desired output ports. The routing is carried out as follows: an operation system (not shown) issues an order based on analyzing results of a routing management table shown in FIG. 2. Then routing controller 50 performs routing function according to the order received from the operation system.

In more detail, multi-wavelength signal having wavelengths $\lambda 1$, $\lambda 2$ and $\lambda 3$ is input to input link 1 to demultiplex at the unit of wavelength in routing portion 2. Wavelengths $\lambda 1$ and $\lambda 3$ are respectively routed to desired output ports to forwarded to output links. In this explanation, wavelengths $\lambda 1$ and $\lambda 3$ are respectively output to output link 1.

Filter controller 52 controls wavelength filters 91–94 to select wavelengths of dummy light from dummy light sources 61. Namely, wavelength filter 91 which corresponds to output link 1 selects only wavelengths $\lambda 0$ and $\lambda 2$ which are not output to output link 1, from optical signals of multiplexed wavelengths $\lambda A$–$\lambda D$ each corresponding to wavelengths $\lambda 0$, $\lambda 1$, $\lambda 2$ and $\lambda 3$ generated from dummy light sources 61.

Thus, dummy light from dummy light sources 61, which is selected by wavelength filter 91 corresponding to output link 1 to pass through, is multiplexed into optical signals having wavelengths $\lambda 1$ and $\lambda 3$ to be output from routing portion 2 to output link 1 by optical coupler 81. As a result, multi-wavelength optical signals having wavelengths $\lambda 0$–$\lambda 3$ are input into optical post-amplifier on link 1 to amplify.

Optical signal outputs having wavelengths $\lambda 0$, $\lambda 1$, $\lambda 2$ and $\lambda 3$ from dummy light sources 61 are multiplexed by multiplexer 8 to be branched by optical coupler 9 to respective wavelength filters 91–94. Here each of wavelength filters 91–94 is a variable wavelength filter to select one or more wavelengths at a time using, for example, an AOTF (acoustic optical tunable filter).

Figure 12:
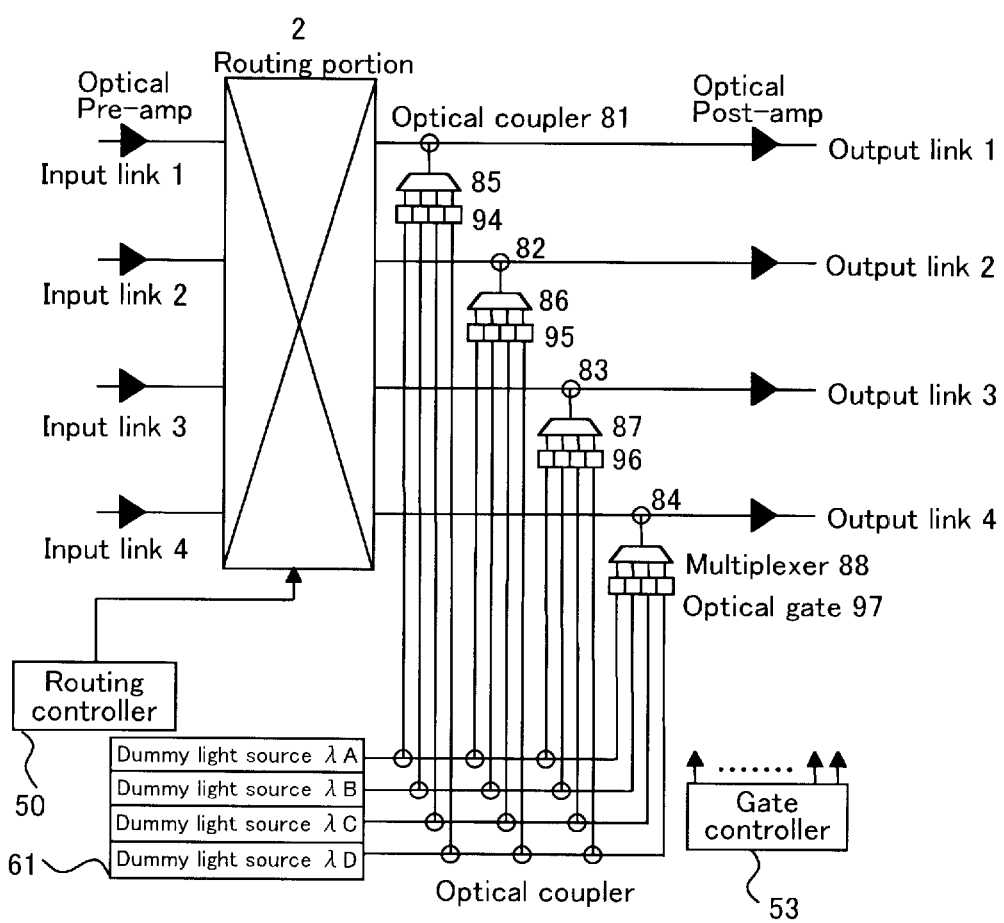
FIG. 12 is a block diagram illustrating the fifth embodiment of the present invention.

In FIG. 12, the fifth embodiment of the present invention is shown. In this embodiment, similar to the embodiment shown in FIG. 11, multi-wavelength optical signals from input links 1–4 are forwarded, without wavelength splitting, to routing portion 2.

In routing portion 2, after the optical signal is split in the unit of wavelength, routing is carried out with this unit. This routing processing is similar to that in the fourth embodiment shown in above FIG. 11. It is assumed that signals having wavelengths $\lambda 1$ and $\lambda 3$ are in transmission and routed by routing portion 2, then signals having $\lambda 1$ and $\lambda 3$ are forwarded to output link 3.

The operation system (not shown) conveys an order to control gates of optical gates 94 to gate controller 53 based on a routing management table 200 shown in FIG. 2. According to the above order, gate controller 53 enables wavelengths $\lambda 0$ and $\lambda 2$ which have not been output to output link 1 to pass through out of wavelengths $\lambda 0$, $\lambda 1$, $\lambda 2$ and $\lambda 3$ from dummy light sources 61 using optical gate 94.

Then, multiplexer 84 multiplexes wavelengths $\lambda 0$ and $\lambda 2$ received from optical gate 94, which further multiplexes wavelengths $\lambda 1$ and $\lambda 3$ output from routing portion 2 by optical coupler 81 to output to link 1. As a result wavelengths $\lambda 0$–$\lambda 3$ are output.

Figure 13:
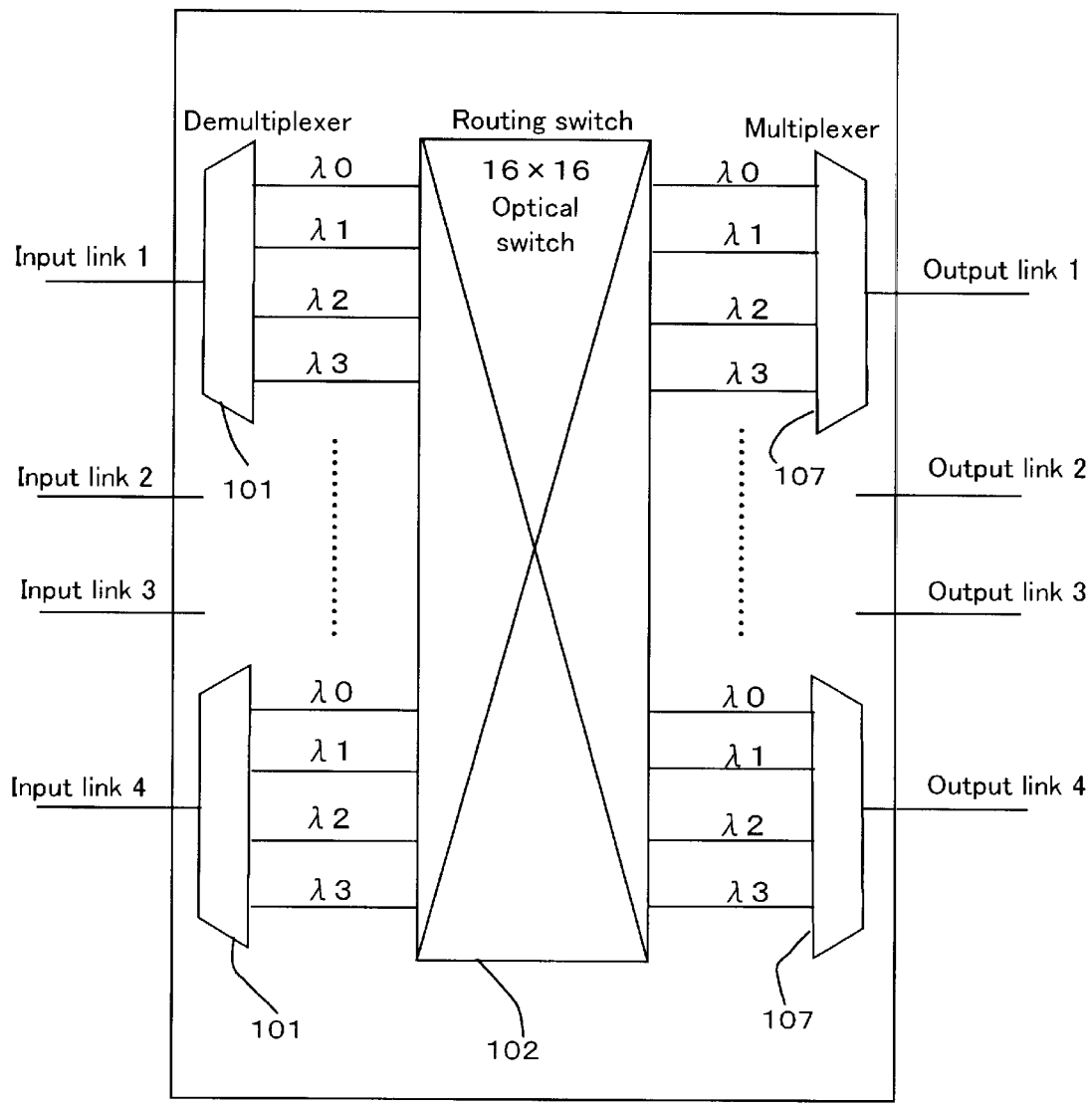
FIG. 13 is a configuration example of routing portion 2 in the embodiments shown in FIGS. 11 and 12.

Dummy light sources 61 output dummy optical signals having wavelengths $\lambda 0$, $\lambda 1$, $\lambda 2$ and $\lambda 3$ to be dispatched through optical coupler 10 to respective optical gates 94–97. In FIG. 13, a configuration of routing portion 2 used in the embodiments shown in FIGS. 11 and 12. Routing portion 2 includes demultiplexers 101, a routing switch 102 (a 16×16 optical switch is used in this embodiment) and multiplexers 107.

An optical signal received from input links 1–4, having four (4) multiplexed wavelengths mutually different, is split into wavelengths by demultiplexer 102 to input to routing switch 102. Routing switch 102 routes each input wavelength to a desired output port.

Each wavelength output from routing switch 102 is multiplexed by multiplexer 107 to output to links 1–4.

Figure 14:
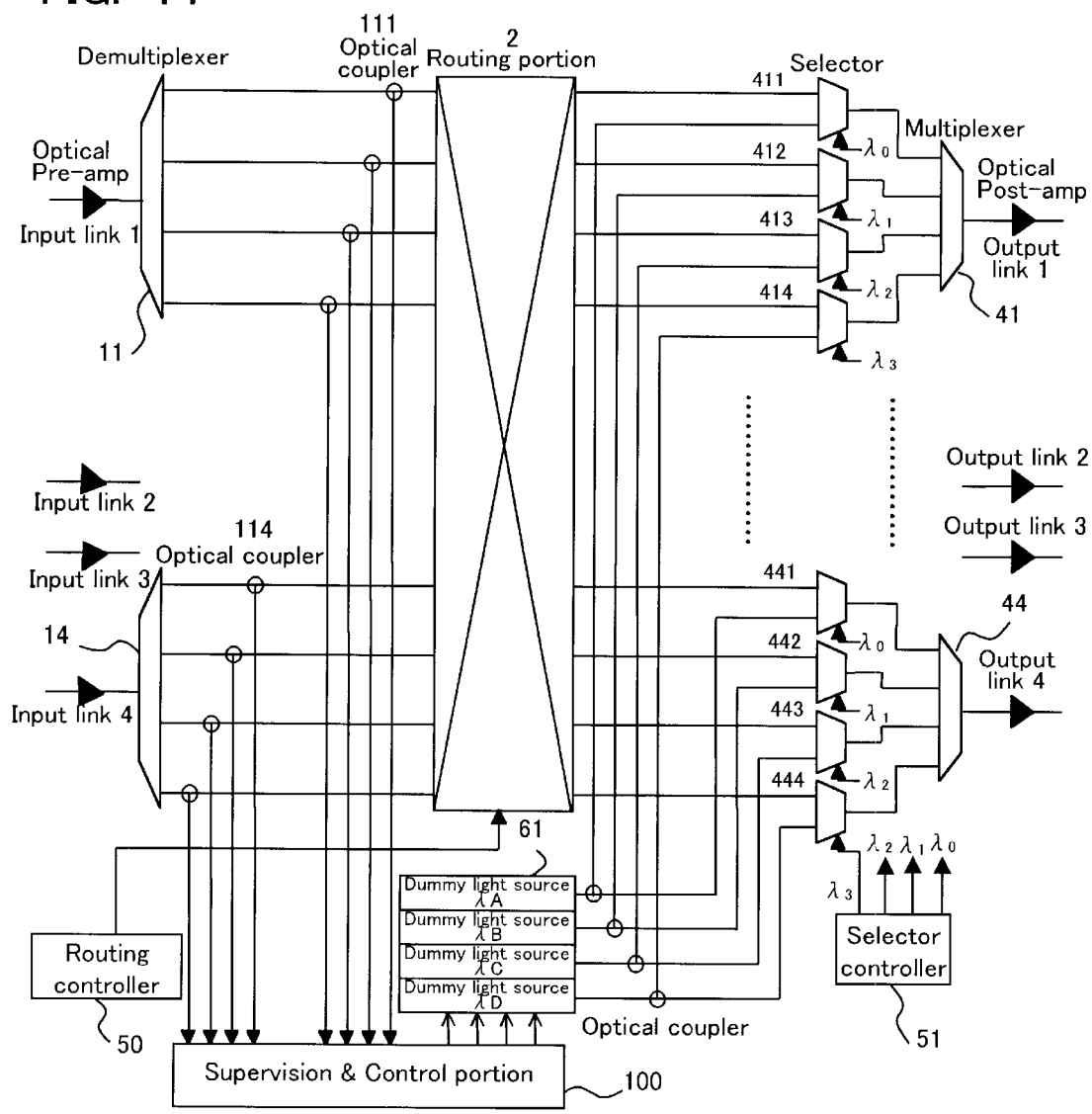
FIG. 14 is a block diagram illustrating the sixth embodiment of the present invention.

In FIG. 14, the sixth embodiment of the present invention is shown. A feature of the embodiment shown in FIG. 14 is that, in addition to the configuration of the second embodiment of the invention shown in FIG. 7, a supervision & control portion 100 is provided. Supervision & control portion 100 is used for supervising and controlling dummy light between optical cross-connect equipment OXCs. Other operation and function are similar to those shown in FIG. 7.

Figure 15:
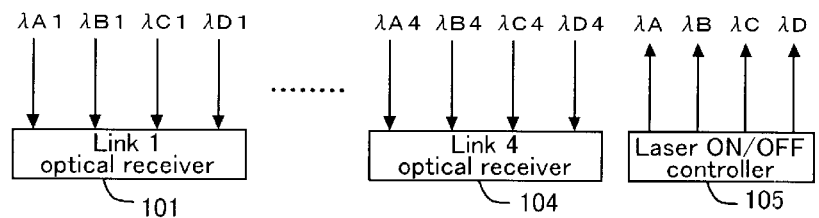
FIG. 15 is a configuration example of supervision & control portion 100.

In FIG. 15, a configuration example of supervision & control portion 100 is shown. At a transmission node, for example, DC light is directly forwarded to transmission links without modulating. At a receiving node, optical signals which are amplified in optical pre-amplifiers and are demultiplexed by demultiplexers 11–14 are branched by optical couplers 111–114 to receive in supervision & control portion 100.

Supervision & control portion 100 shown in FIG. 15 provides link optical receivers 101–104 respectively corresponding to demultiplexers 11–14. Accordingly, the level of received dummy light is supervised to monitor failures on transmission links or transit equipment.

A laser ON/OFF controller 105 controls ON/OFF of laser emission for generating dummy light from dummy light sources 61, which is required for a link switchover caused by a failure detected through failure supervision by link optical receivers 101–104.

Figure 16:
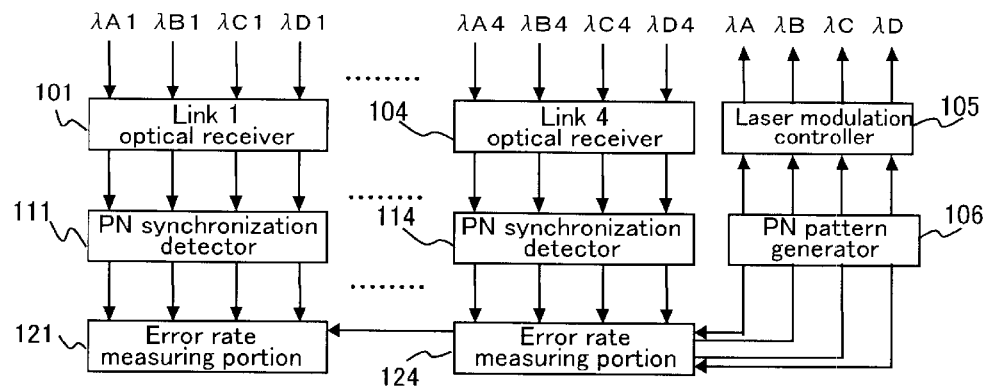
FIG. 16 is another configuration example of supervision & control portion 100.

In FIG. 16, another embodiment of supervision & control portion 100 is shown. In this configuration, instead of DC light to be used for a dummy light transmitted from a transmission node, there is provided a dummy light which is modulated with pseudo random noise signal (PN pattern) at the same speed as a signal light. For this purpose, PN pattern generator 106 is provided for generating PN patterns used for modulation signals.

In link optical receivers 101–104, PN synchronization detectors 111–114 and error rate measuring portions 121–124 are provided. At a receiving node, using this configuration, optical signals which are amplified in pre-amplifiers and are demultiplexed in demultiplexers 11–14 are branched in optical couplers 111–114 to receive in corresponding respective link optical receivers 101–104 in supervision & control portion 100.

The optical signals received by link optical receivers 101–104 are converted to electric signals. Then PN synchronization is conducted by PN synchronization detectors 111–114 to measure error rate in error rate measuring portions 121–124.

Namely, in error rate measuring detectors 121–124, PN pattern signals are received to compare with the received electric signals having been synchronized in PN synchronization detectors 111–114. Then error rate is derived from the rate of mismatched patterns.

Based on the obtained error rate, necessary control is performed such as switching over to a predetermined transmission link. Further explanation is omitted here because it does not directly relate to the present invention.

Figure 17:
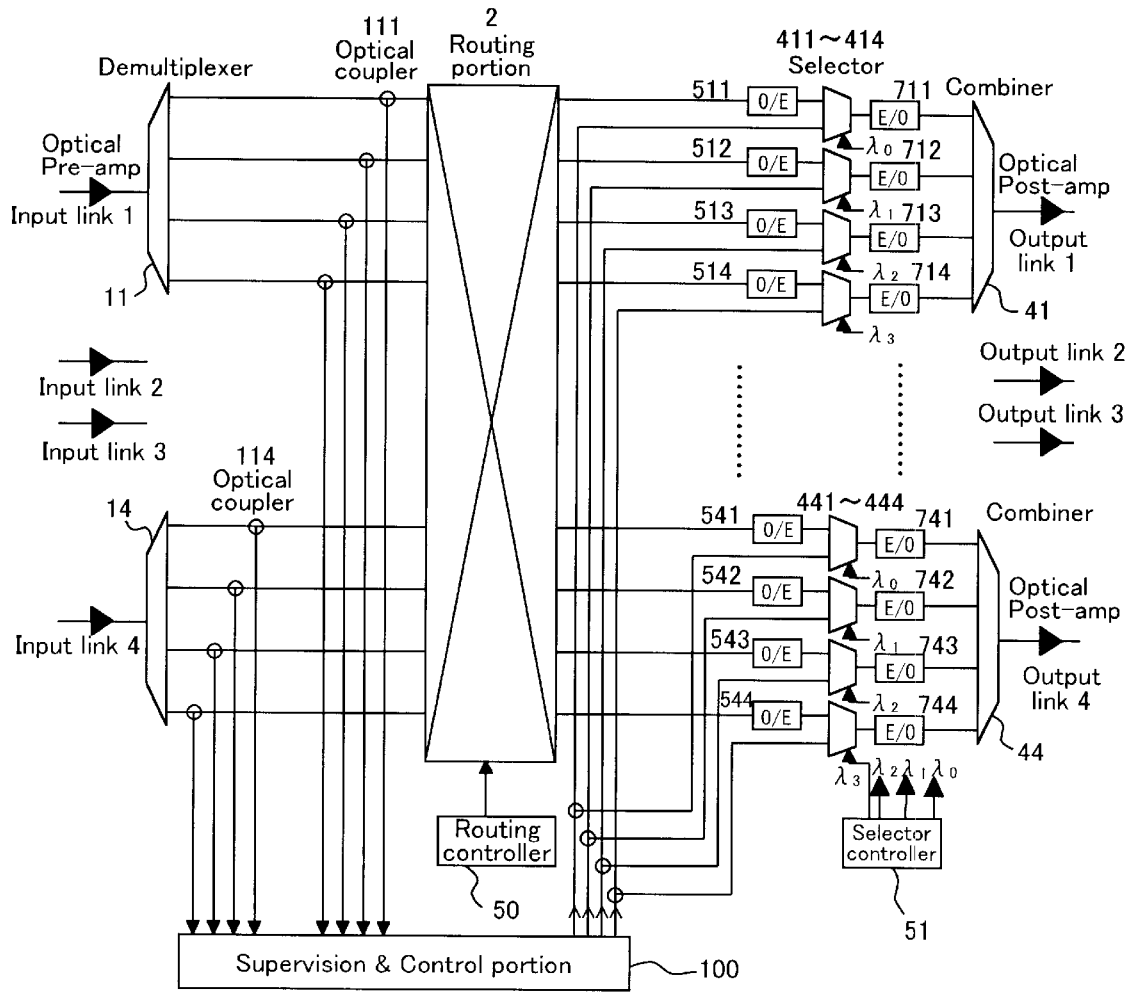
FIG. 17 is a block diagram illustrating the seventh embodiment of the present invention.

In FIG. 17, the seventh embodiment of the present invention is shown. In the aforementioned example from the first to the sixth embodiments, optical signals are directly controlled without regenerating signals. On the other hand, in this seventh embodiment, signal regeneration is introduced, in which optical signals received from input links 1–4 are once converted to electric signals, to forward to output links after the optical signals are modulated using the electric signals.

Optical signals received from input links 1–4 are split into four wavelengths (λ0, λ1, λ2, λ3) by demultiplexers 101 to forward to routing portion 2. The input four wavelengths are routed to each desired output port according to an order from routing controller 50, as described in the preceding embodiments. Wavelengths output from routing portion 2 are respectively converted to electric signals by opto-electric converters 511–514, 521–524, 531–534 and 541–544 corresponding to respective output links 1–4.

On the other hand, from supervision & control portion 100 explained in the embodiments shown in FIG. 14 to FIG. 16, DC signals or PN pattern signals are output. Selector controller 51 controls selectors 411–414, 421–424, 431–434 and 441–444 to select the above-mentioned DC signal or PN pattern signal as an output for each wavelength which is not forwarded from routing portion 2.

Accordingly, corresponding to selected wavelengths of optical signals output from routing portion 2, electric signals and either DC signals or PN pattern signals are converted into optical signals by electro-optical converters 711–714, 721–724, 731–734 and 741–744, enabling wavelength multiplexing by optical combiners 41–44 to forward to output links 1–4.

As shown above, there is provided in this embodiment an optical signal regeneration portion which includes opto-electric converters (O/E) and electro-optical converters (E/O) at the latter stage of routing portion 2, prior to forwarding to transmission links.

Thus dummy light sources are not necessary in this embodiment because electro-optical converters 711–714, 721–724, 731–734 and 741–744 substitute for dummy light sources. Selectors 411–414, 421–424, 431–434 and 441–444 is controlled to select main signals from opto-electric converters 511–514, 521–524, 531–534 and 541–544 when allocated wavelengths are in use. On the other hand, when each allocated wavelength is not in use, a DC signal or PN pattern signal from supervision & control portion 100 is selected.

Figure 18:
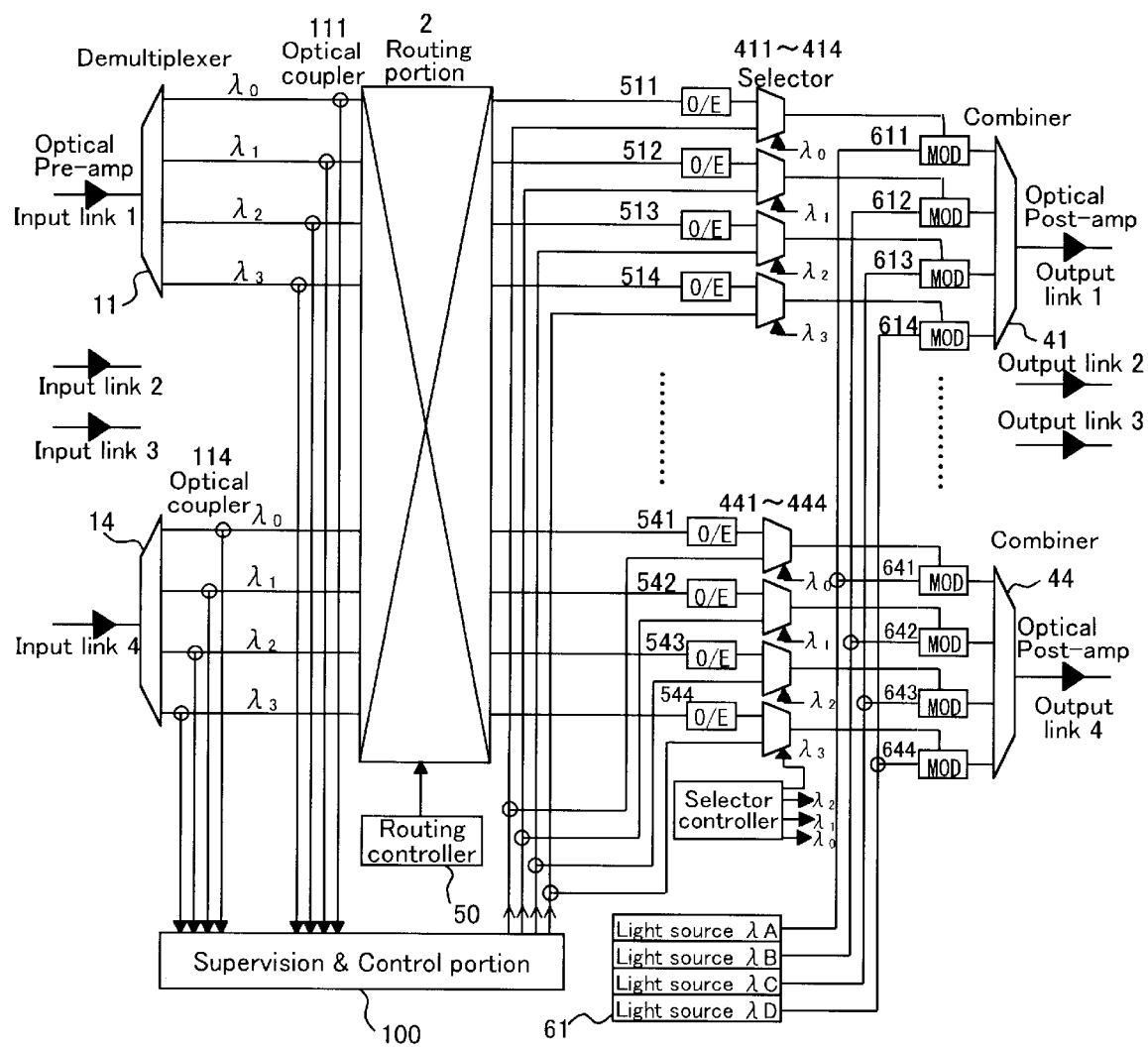
FIG. 18 is a block diagram illustrating the eighth embodiment of the present invention.

In FIG. 18, the eighth embodiment of the present invention is shown. In this configuration, optical modulators 611–614, 621–624, 631–634 and 641–644 are provided instead of electro-optical converters 711–714, 721–724, 731–734 and 741–744 in FIG. 17

Optical modulator can generate modulated light by inputting optical and electric modulated signals from outside. As explained in the embodiment in FIG. 17, selectors 411–414, 421–424, 431–434 and 441–444 select main signals from opto-electric converters 511–514, 521–524, 531–534 and 541–544 when allocated wavelengths are in use, but select a signal(s) from supervision & control portion 100 when the allocated wavelength(s) is not in use.

In this embodiment, optical modulation is carried out against dummy light from dummy light sources 61 using either outputs of routing portion 2 via selectors 411–414, 421–424, 431–434 and 441–444, or DC signals or PN pattern signals from supervision & control portion 100.

Each embodiment having been described above has a configuration that dummy lights are inserted either at an input side or an output side of routing portion 2. However, it may also be possible to insert dummy signals inside routing portion 2.

Figure 50:
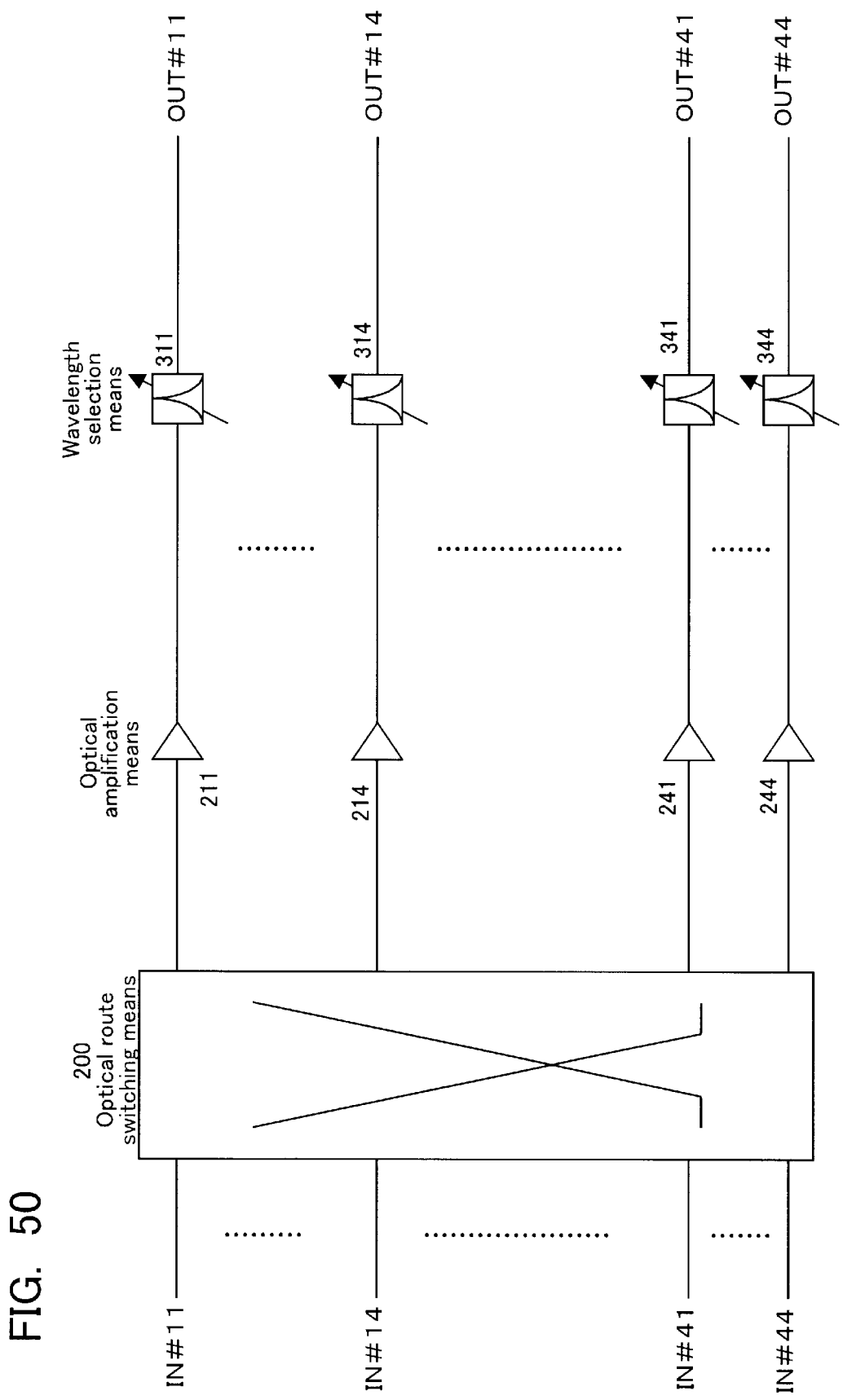
FIG. 50 is a conventional configuration of a routing portion in which a path switchover is carried out in routing portion 2.

In FIG. 50, there is shown a conventional configuration of a routing portion such that a path switchover is carried out inside routing portion 2, which is an overall configuration example of the routing portion in case of 4 wavelengths×4 links.

Optical route switching means 200 has a function to enable input ports #11–14 to #41–44 to output to output ports #11–14 to #41–44. As a component thereof, waveguide-type switch utilizing thermo-optical effect, mechanical switch using a motor, etc. can be used.

Figure 51C:
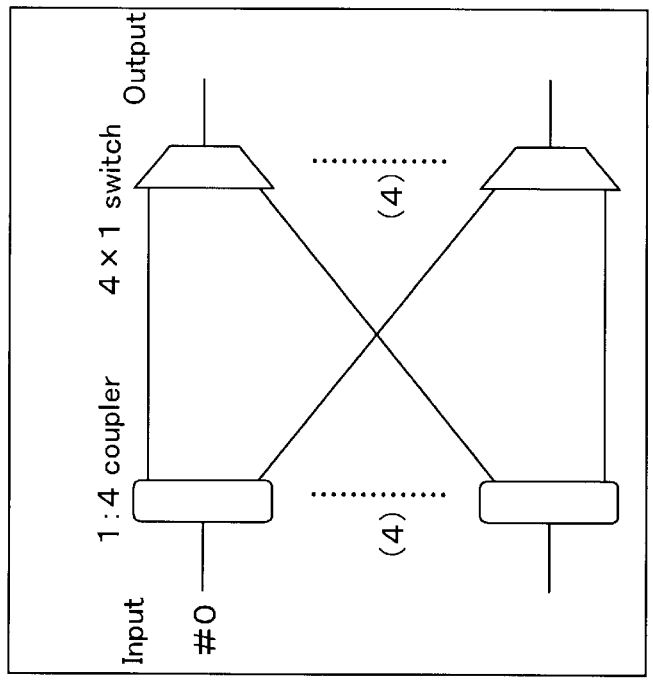
FIGS. 51A to 51C are configuration examples of optical route switching means 200 shown in FIG. 50.
Figure 51A:
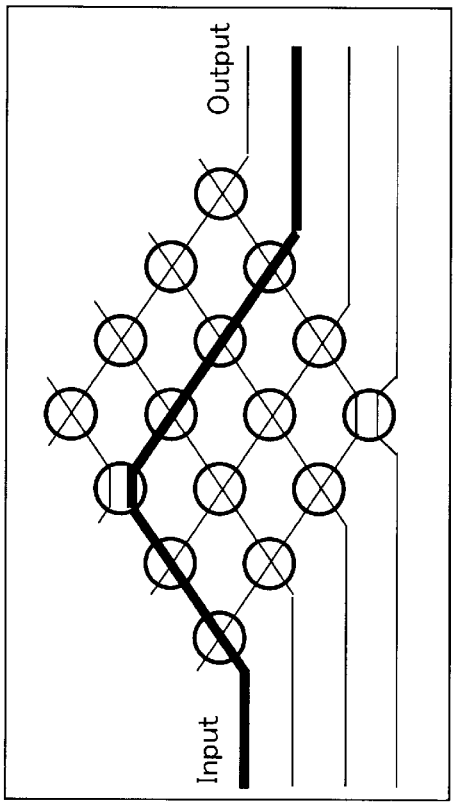
Figure 51B:
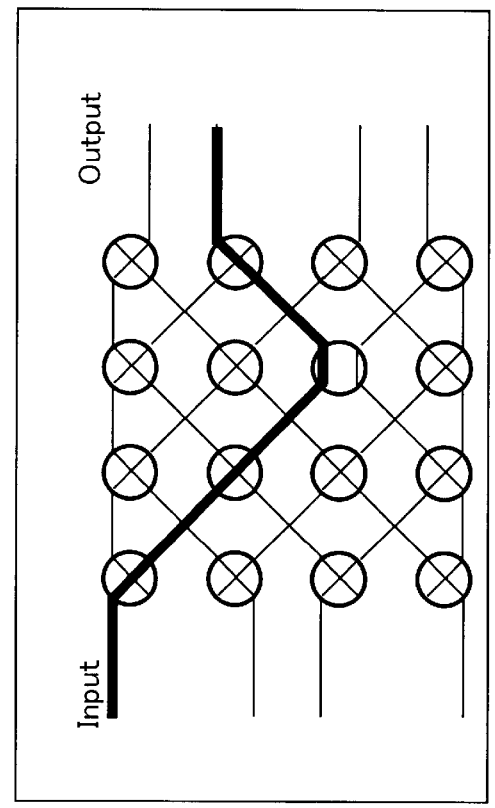

In addition, it is possible to constitute the number of inputs and outputs having a ratio of 1:N as well as 1:1. Configurations of optical route switching means 200 are shown in FIGS. 51A, 51B and 51C. Both configuration of FIG. 51A and configuration of FIG. 51B are examples having input-to-output ratio of 1:1. Here each configuration includes 16 switch elements in case of 4 inputs and 4 outputs. Each switch element is composed of Mach-Zehnder interferometer etc., which is controlled ON and OFF for controlling the connection between input ports and output ports.

On the other hand, a configuration of FIG. 51C is an example for 1:N connection, by which an optical signal from a single input port #0, for example, is forwarded to all output ports. To compensate losses produced in a routing portion, four (4) pairs of optical amplification means 211–214 to 241–244 are provided for amplifying each input optical signal to a desired optical level. These optical amplification means comprise optical amplifiers, more concretely, optical fiber amplifiers (FA), semiconductor optical amplifiers (SOA), etc.

Each four (4) pairs of wavelength selection means 311–314 to 341–344 enables to pass through an optical signal having a desired wavelength only, to eliminate noise produced in optical amplifier means etc. For example, dielectric multilayered film filters or acoustic optical tunable filters (AOTF) are used therefor.

Figure 52:
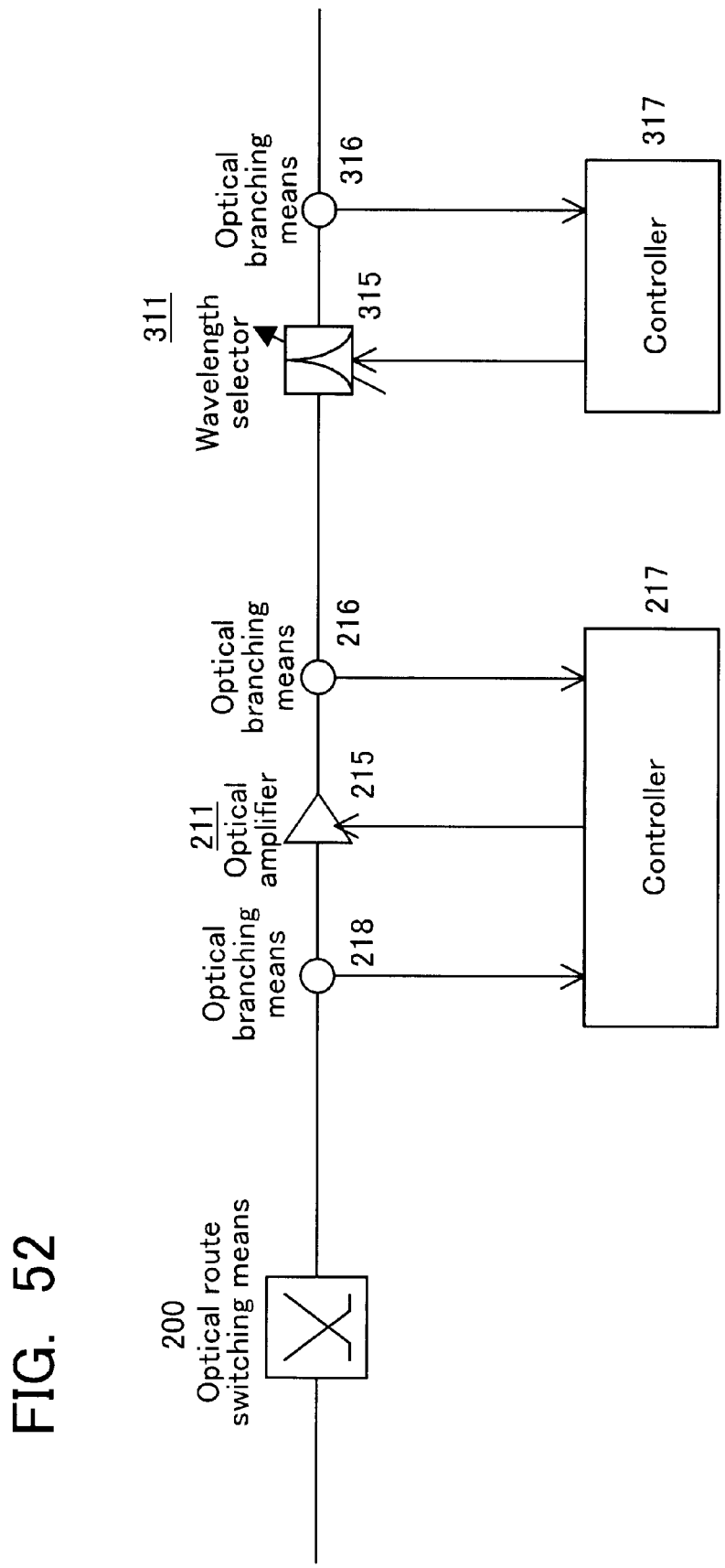
FIG. 52 is a detailed configuration example of a single port in routing portion 2.

In FIG. 52, a detailed configuration example of each port of routing portion 2 is shown. In optical amplification means 211, a feedback control (automatic level control: hereinafter referred to as ALC) is normally applied to maintain output level constant for stabilizing optical output level. More concretely, an optical level is supervised in controller 217 against a signal light branched by optical branching means 216 at the latter stage of optical amplifiers 215, to maintain constant output by controlling each output of, for example, pumping lasers corresponding to an optical amplifier 215.

When a break occurs in an input light branched by optical branching means 218, ALC is inactivated to shut down (i.e. to inhibit to amplify an input light by switching off the pumping laser) in order to suppress surge when the input light is restored.

When the input light is restored, the shutdown is restored to resume ALC. However it takes substantial time until an output light becomes stabilized, because the output must be varied gradually to suppress surge or to prevent amplifier 215 from getting oscillated.

Wavelength selection means 311 in normal cases supervises optical signals branched by optical branching means 316 in controller 317 to perform feedback control (automatic frequency control: hereafter referred to as AFC) of transmitted wavelength in wavelength selector 315 to an optimum wavelength position.

In the case the input light temporarily breaks, this feedback control cannot be sustained until the input light is restored. Therefore, time is also required until stable output light is restored.

Figure 53:
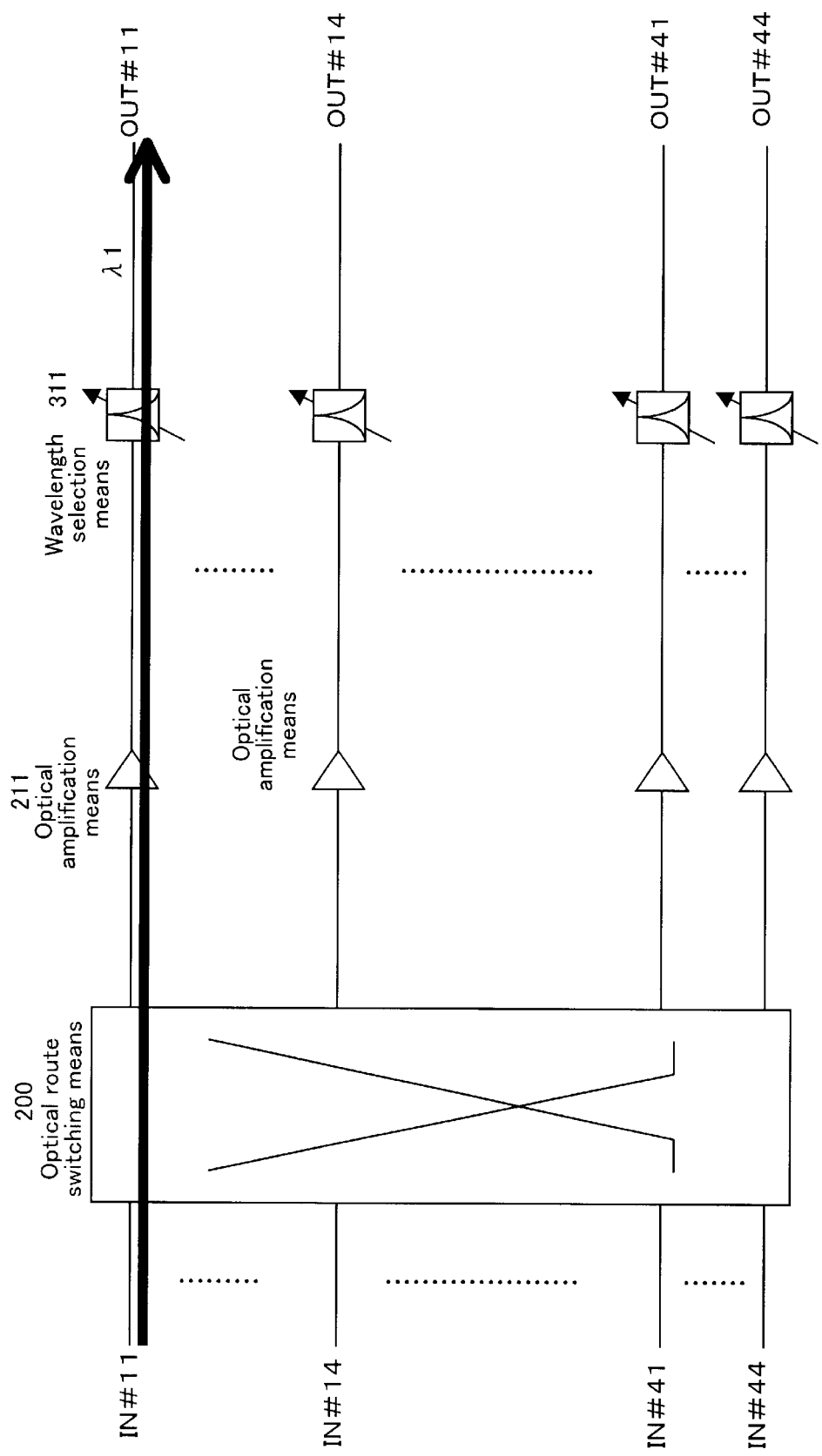
FIG. 53 is an example of a path switchover, in which a signal light having wavelength $\lambda 1$ is routed from input IN#11 to output OUT#11.
Figure 54:
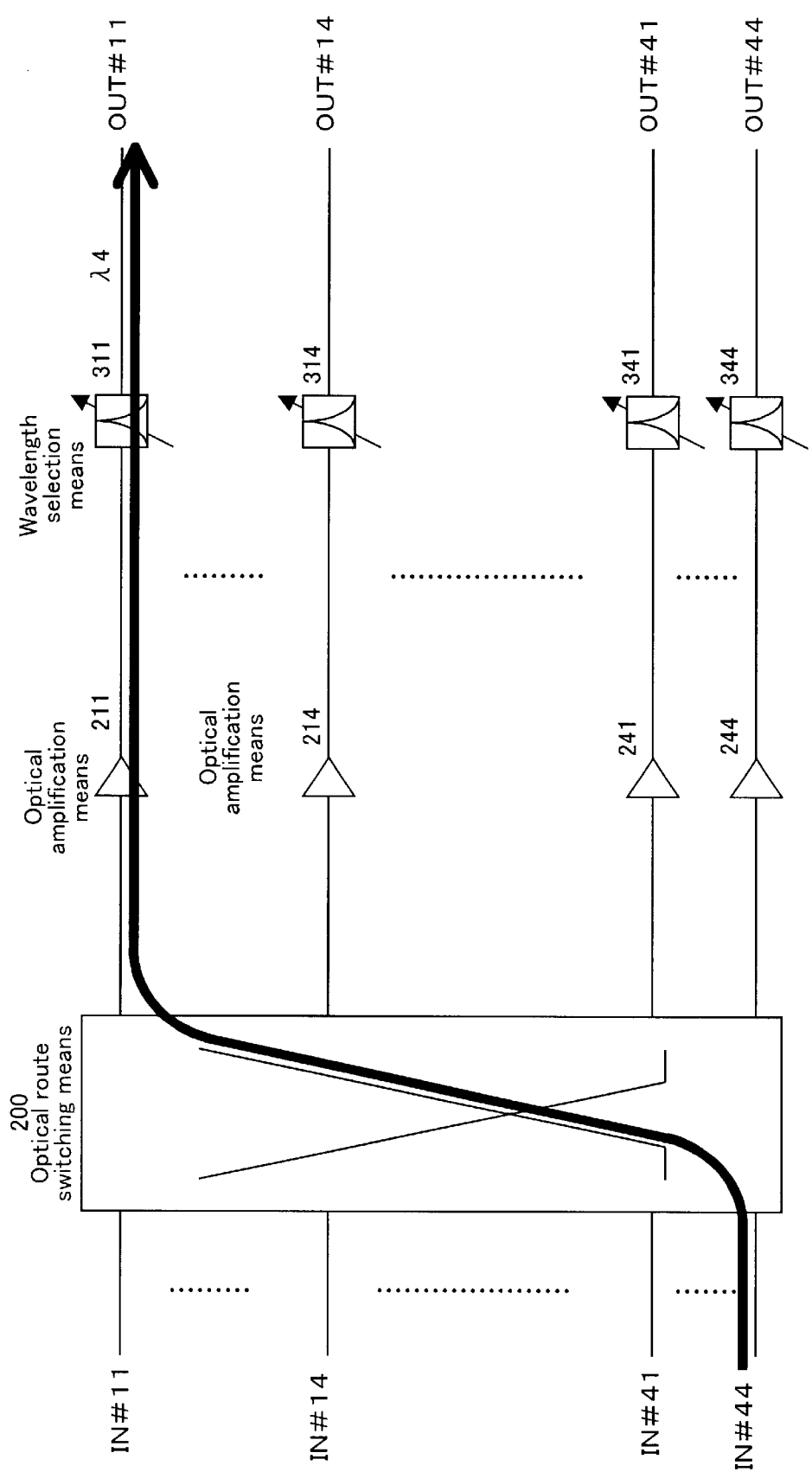
FIG. 54 is an example of a path switchover, in which a signal light having wavelength $\lambda 4$ is routed from input #IN44 to output OUT#11.

In FIGS. 53 and 54, an example of path switchover is shown. In FIG. 53, a signal light having wavelength $\lambda 1$ input from IN#11 is routed to output OUT#11. In this case also, ALC is carried out in optical amplificationmeans 311 to stabilize output light. In wavelength selection means 311, transmitted wavelength is set to $\lambda 1$, of which output is supervised for performing AFC to stabilize output light.

In an example shown in FIG. 54, a signal light having wavelength $\lambda 4$ input from IN#44 is routed to output OUT#11.

Now, a case is considered that a path is switched over from a state shown in FIG. 53 to the other state shown in FIG. 54. First, by switching a route by optical route switching means 200, input optical level forwarded to optical amplification means 211 temporarily breaks (or in more detail, drops below a certain threshold value). Then optical amplification means 211 removes ALC to produce a shutdown. Also, light $\lambda 1$ is not supplied to wavelength selection means 311, which causes to remove AFC. Then, when a signal light having wavelength $\lambda 4$ is input from input IN#44 to optical amplification means 211, optical amplification means 211 removes the shutdown to restore ALC. Also in this case, however, time is required until the output light becomes stabilized.

Therefore, when the output light from optical amplification means 211 is stabilized, AFC becomes possible by setting $\lambda 4$ as a transparency wavelength in wavelength selection means 311.

As explained above, a path switchover is carried out in routing means 2. In optical cross-connect equipment which handles a large capacity of traffic, high speed switchover of a wavelength path is desired on occurrence of a failure. Once a break occurs in optical signals at the time of the path switchover, it takes time until optical amplification means or wavelength selection means in equipment restore stable operation even after the arrival of new optical signals.

Therefore, the embodiments of the present invention apply the aforementioned method of the insertion of dummy light performed in routing means 2.

Figure 19:
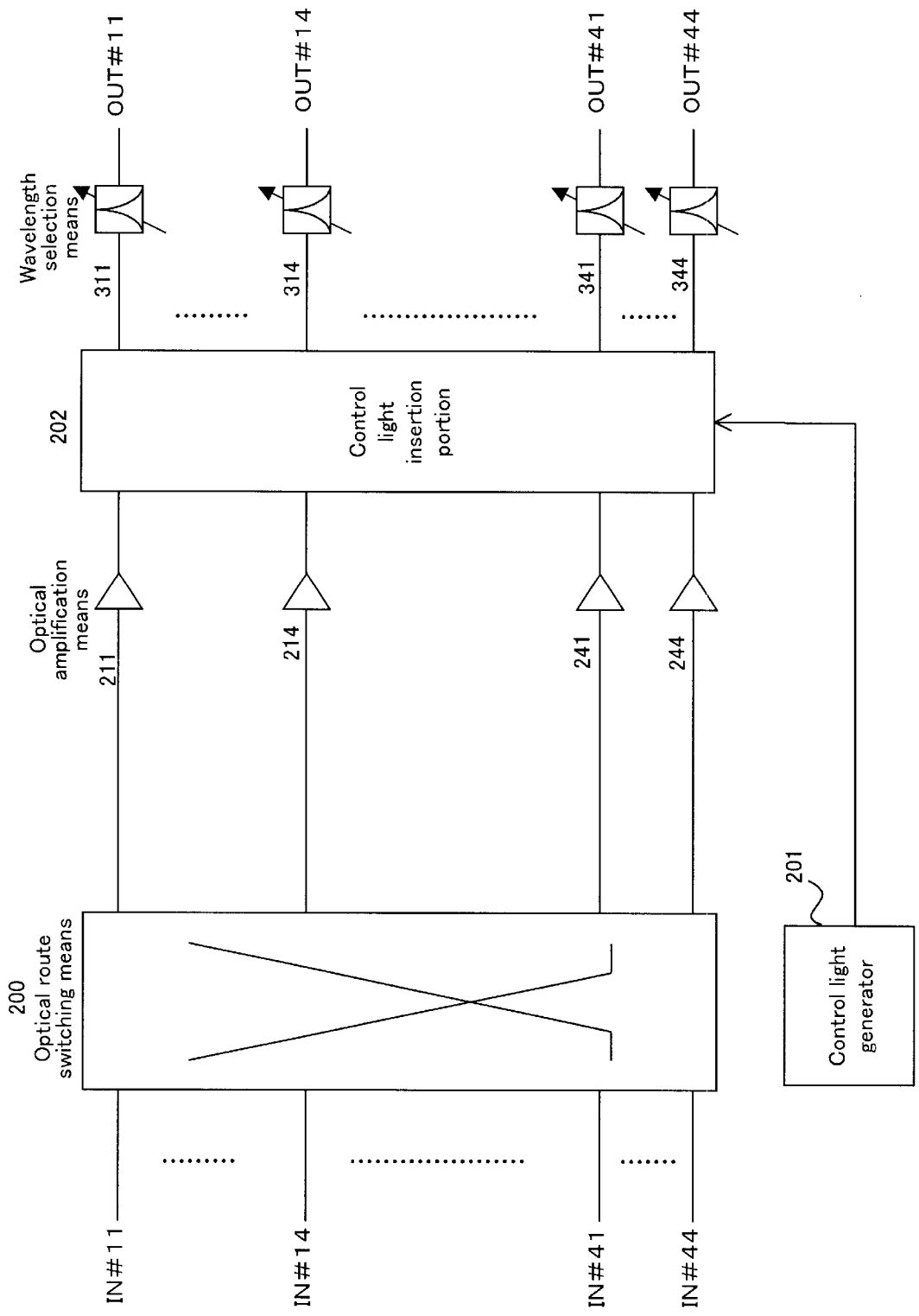
FIG. 19 is a configuration example of a routing portion having a control light insertion portion according to the present invention.

In FIG. 19, there is shown an embodiment of the routing portion in accordance with the present invention, which includes a control light generator for generating a control light normally to supply light to wavelength selection means, and a control light inserter for supplying a control light to wavelength selection means.

In the following description, it is assumed that, in optical cross-connect equipment handles 4 wavelengths and 4 links, and a signal light having wavelength $\lambda 2$ is forwarded to output OUT#11.

In FIG. 19, compared with the configuration shown in FIG. 50, there are provided in routing portion 2 control light generator 201 to generate a control light (dummy light) for supplying light constantly to wavelength selection means 311–314 to 341–344, and control light insertion portion 202 for supplying the control light to the wavelength selection means.

For example, assuming that a signal light having wavelength $\lambda 2$ is output to OUT#11, a control light having $\lambda 2$ is generated in control light generator 201 to be supplied to wavelength selection means 311 via control light insertion portion 202, prior to the occurrence of a path switchover.

Figure 20:
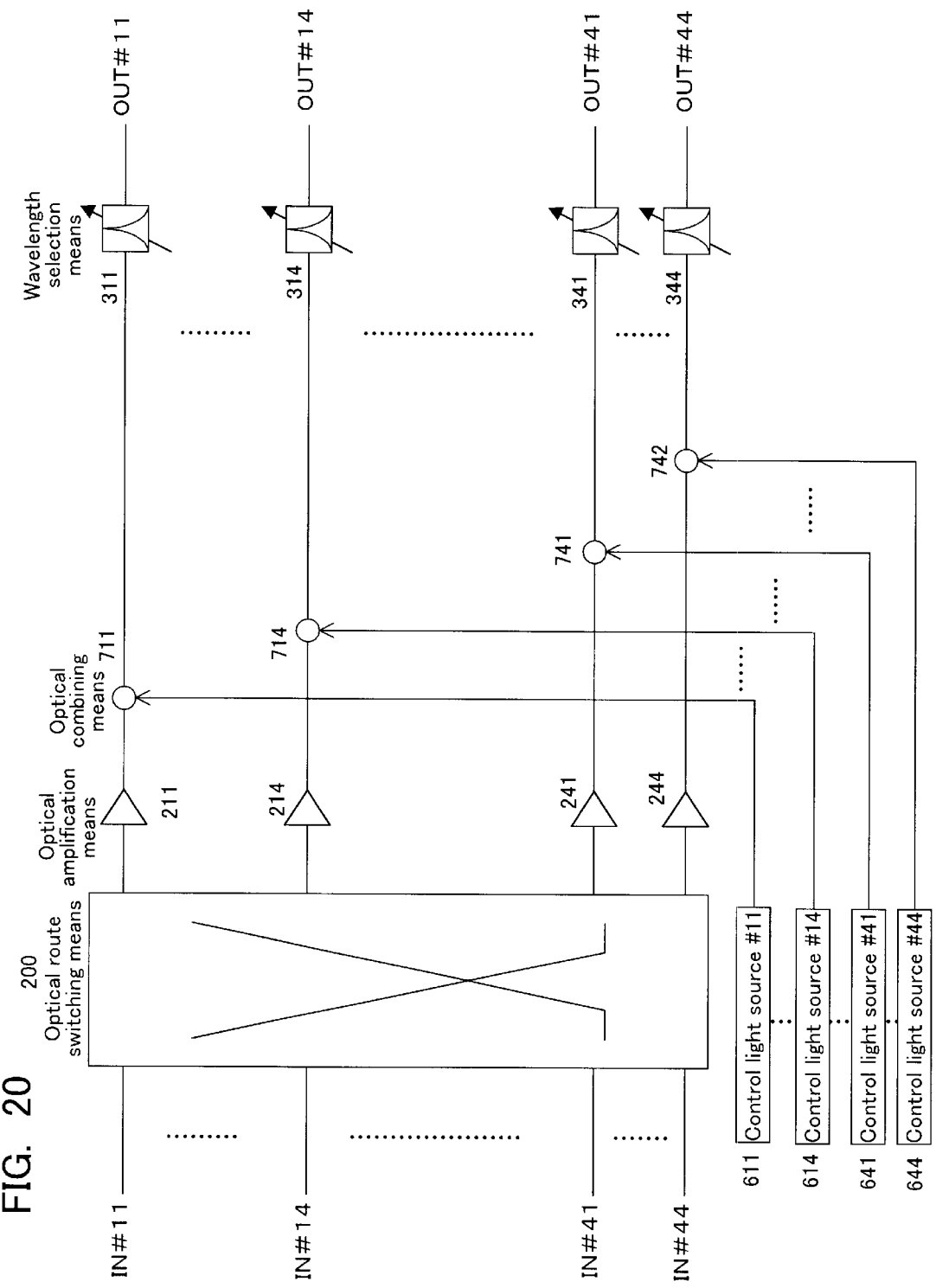
FIG. 20 is a configuration example of routing portion 2 corresponding to FIG. 19, including detailed configurations of control light generator 201 and control light insertion portion 202.

In FIG. 20, there is shown an embodiment of routing portion 2 corresponding to FIG. 19, including details of control light generator 201 and control light insertion portion 202. Control light generator 201 provides control light sources 611–614 to 641–644, each of which emits a control light having a wavelength corresponding to each output port.

In FIG. 20, a control light is supplied to wavelength selection means 311–314 to 341–344 through optical combining means 711–714 to 741–744 which constitute control light insertion portion 202 positioned in the preceding stage of wavelength selection means.

Figure 21:
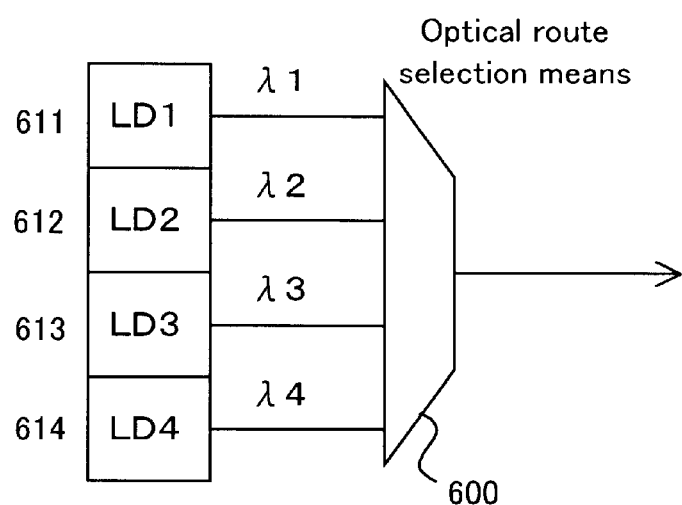
FIG. 21 is a configuration example of control light sources 611–614 to 641–644 shown in FIG. 20.

In FIG. 21, a configuration example of control light sources 611–614 to 641–644 is shown. Each control light source includes four (4) fixed-wavelength lasers 611–614 which generate four wavelengths $\lambda 1$ to $\lambda 4$, and optical route selection means 600. In a normal state, each laser to emit control lights 611–614 to 641–644 is set OFF in which no light output is generated.

Figure 22:
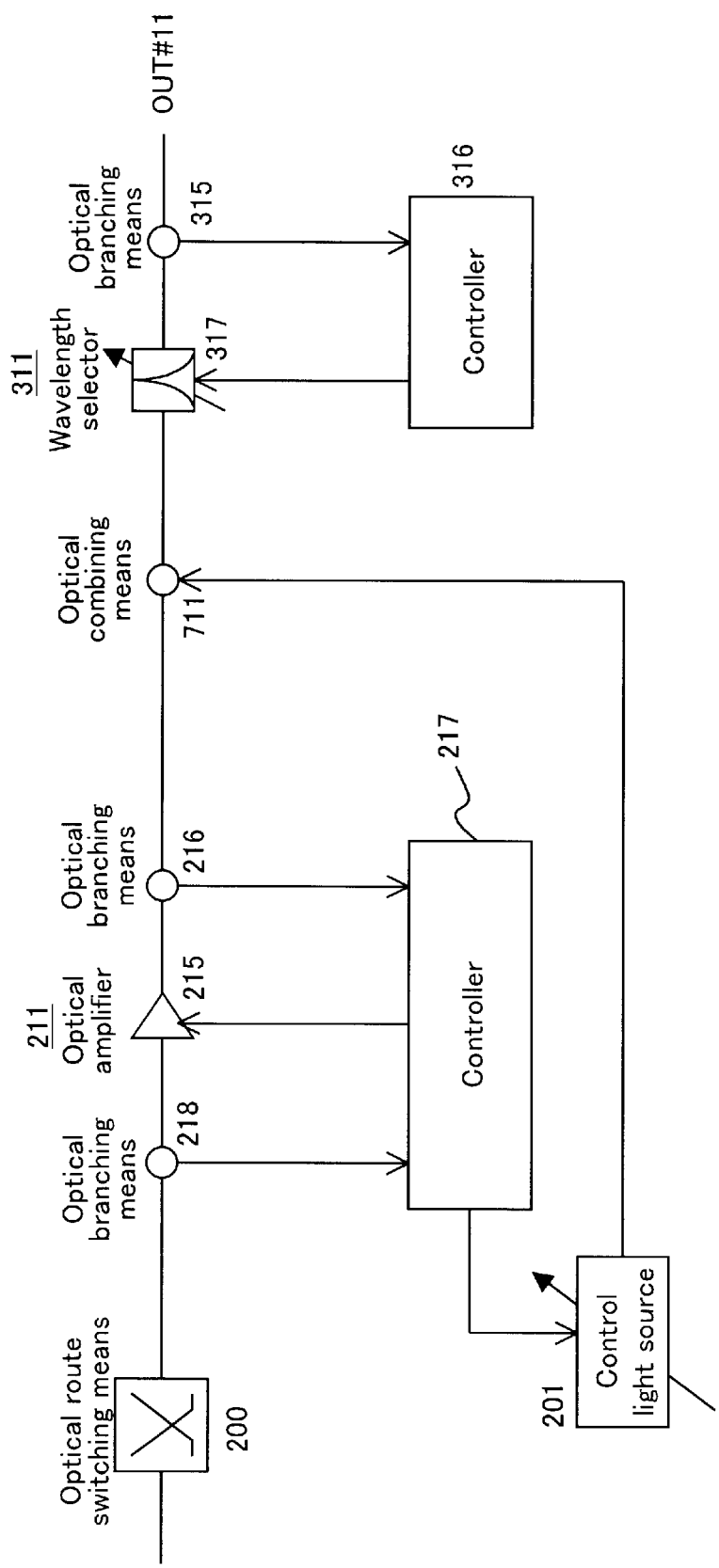
FIG. 22 is a detailed configuration example corresponding to a single port in routing portion 2 shown in FIG. 20.

In FIG. 22, a detailed configuration diagram for a single port of routing portion 2 shown in FIG. 120 is illustrated, which is similar to FIG. 52. In FIG. 22, it is assumed a break occurs in a light to input into optical amplifier means 215 (or in a light output from optical amplifier 215), then the break is detected in optical branching means 218. Controller 217 drives control light source (#1: LD2) in control source generator 201 having a variable wavelength. By selecting $\lambda 2$ in optical route selection means 600, a control light having $\lambda 2$ is supplied to wavelength selector 317 in wavelength selection means 311, through optical combining means 711.

Then, when optical branching means 216 detects the restoration of output light of optical amplifier 215, controller 217 controls control light generator 201 to stop driving control light source (#11: LD2) 611.

Figure 23:
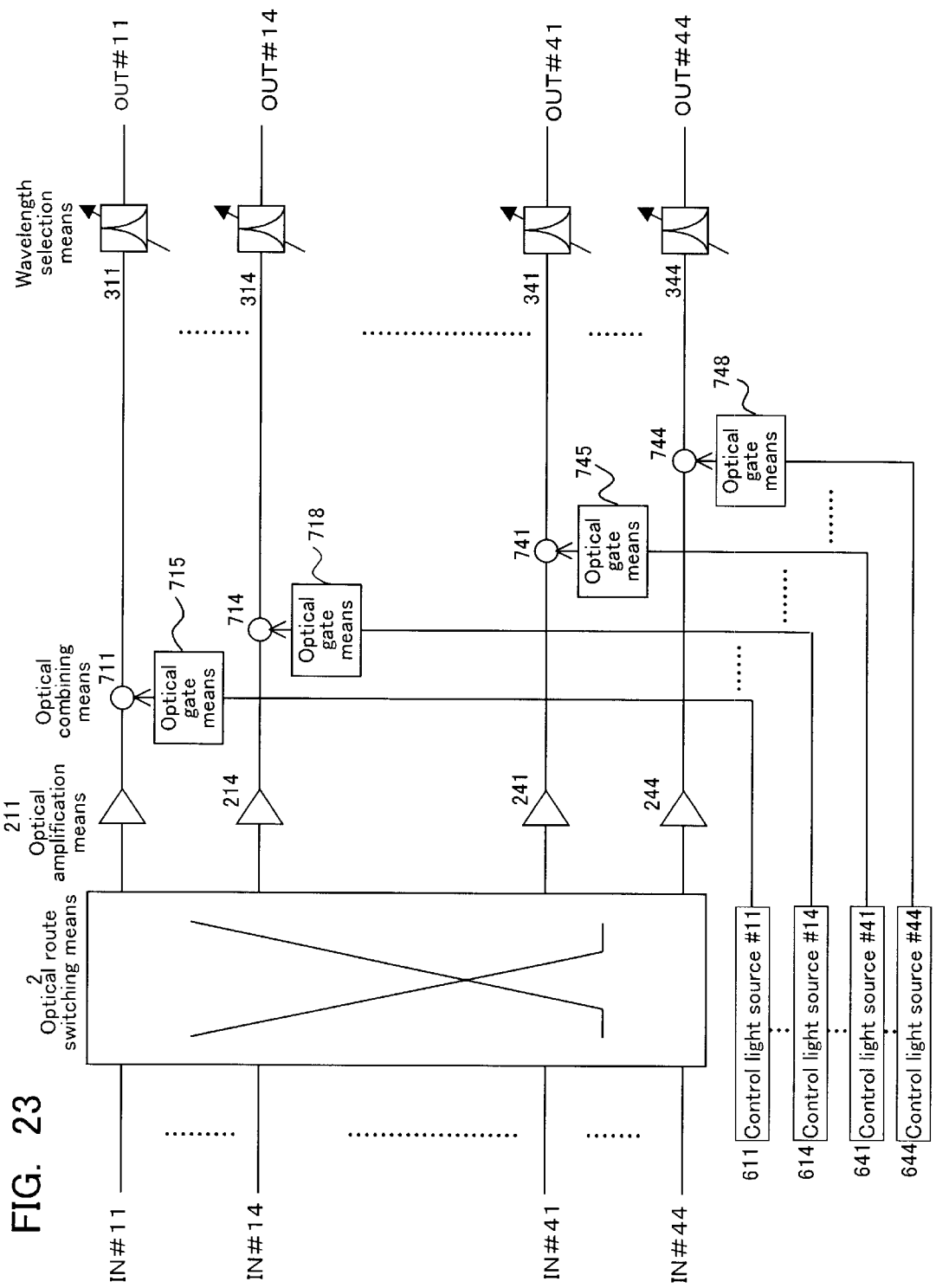
FIG. 23 is an overall configuration of the second embodiment of routing portion 2.
Figure 24:
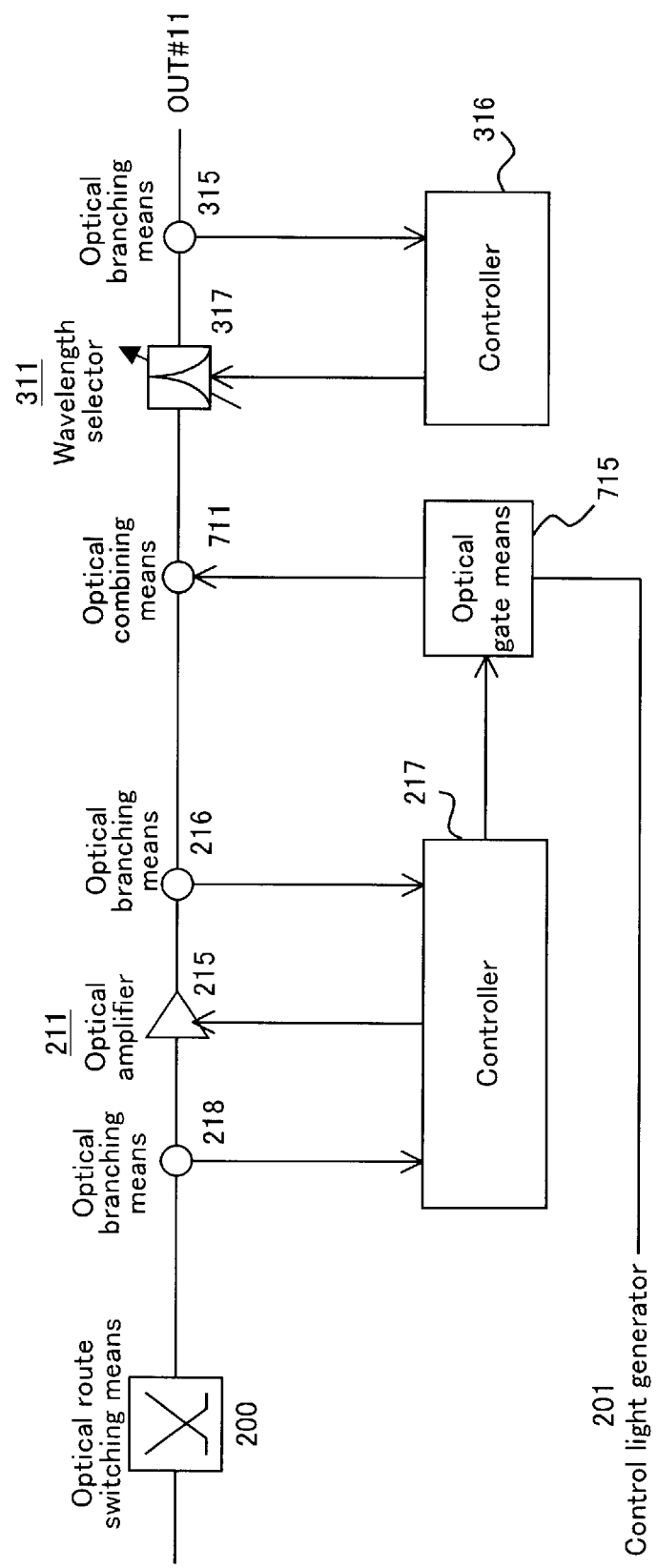
FIG. 24 is a detailed configuration of a single port in the overall configuration shown in FIG. 23.

In FIGS. 23 and 24, there are shown an overall configuration of the second embodiment in relate to routing portion 2, and a detailed configuration of a single port therein. Control light generator 201 includes, as shown in the embodiment in FIG. 20, variable-wavelength light sources 611–614 to 641–644 each corresponding to an output port.

At the preceding stage of wavelength selection means 311–314 to 341–344, respective control lights are supplied to wavelength selection means 311–314 to 341–344 through optical gate means 715–718 to 745–748 and optical combining means 711–714 to 741–744.

Each laser of control light sources 611–614 to 641–644 is normally ON for emitting a light. When a break in a light input to optical amplifier 215 is detected by optical branching means 218, $\lambda 2$ is selected by optical route selection means 600 (refer to FIG. 21) to switch optical gate means 715 ON. Thus a control light having $\lambda 2$ to wavelength selection means 311 is supplied through optical combining means 711.

When the restoration of output light in optical amplifier 215 is detected in optical branching means 216, optical gate means 715 is switched OFF to forward signal light $\lambda 2$ from optical route selection means 2 to wavelength selection means 311.

Figure 25:
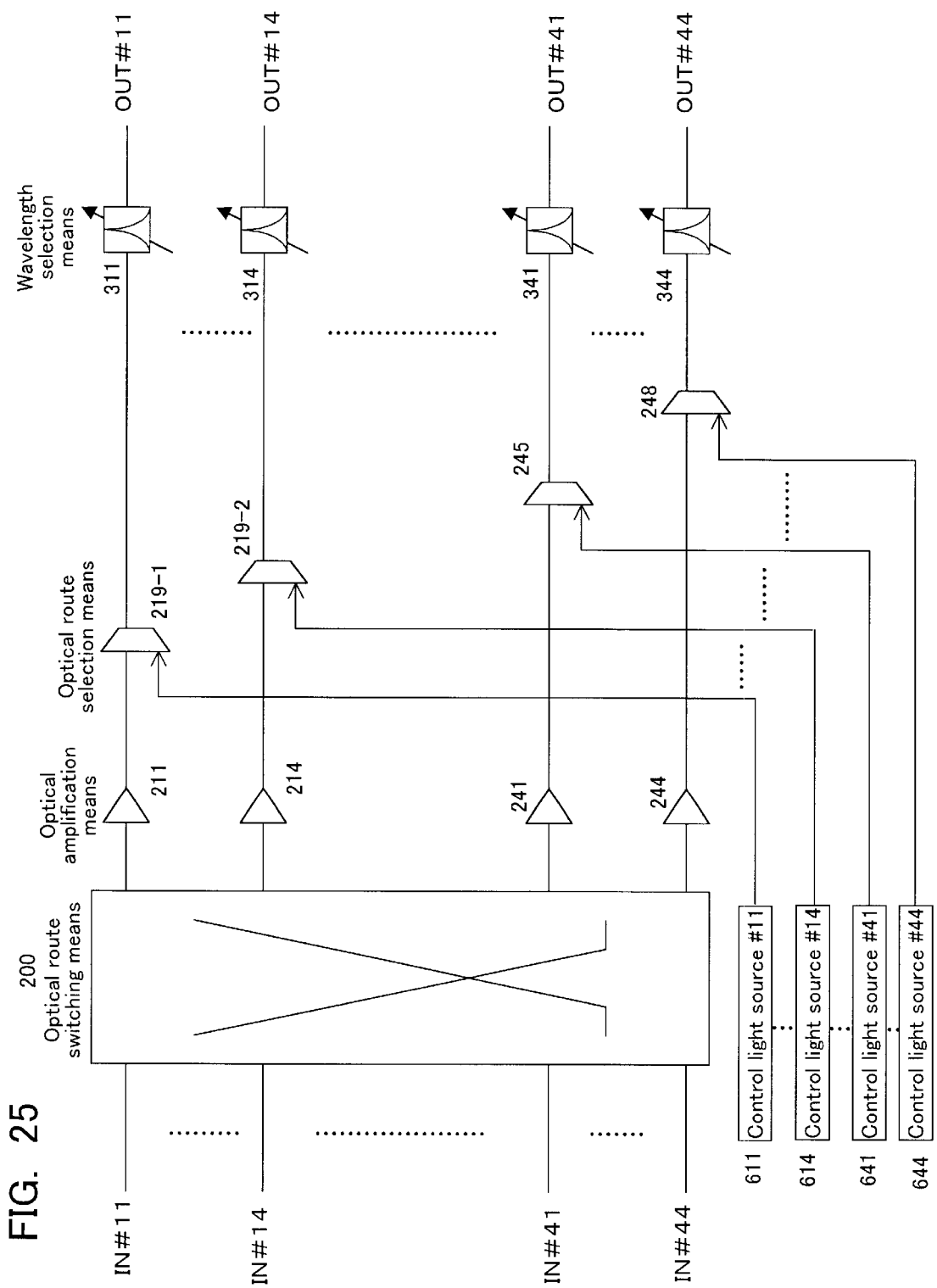
FIG. 25 is an overall configuration of the third embodiment of routing portion 2.
Figure 26:
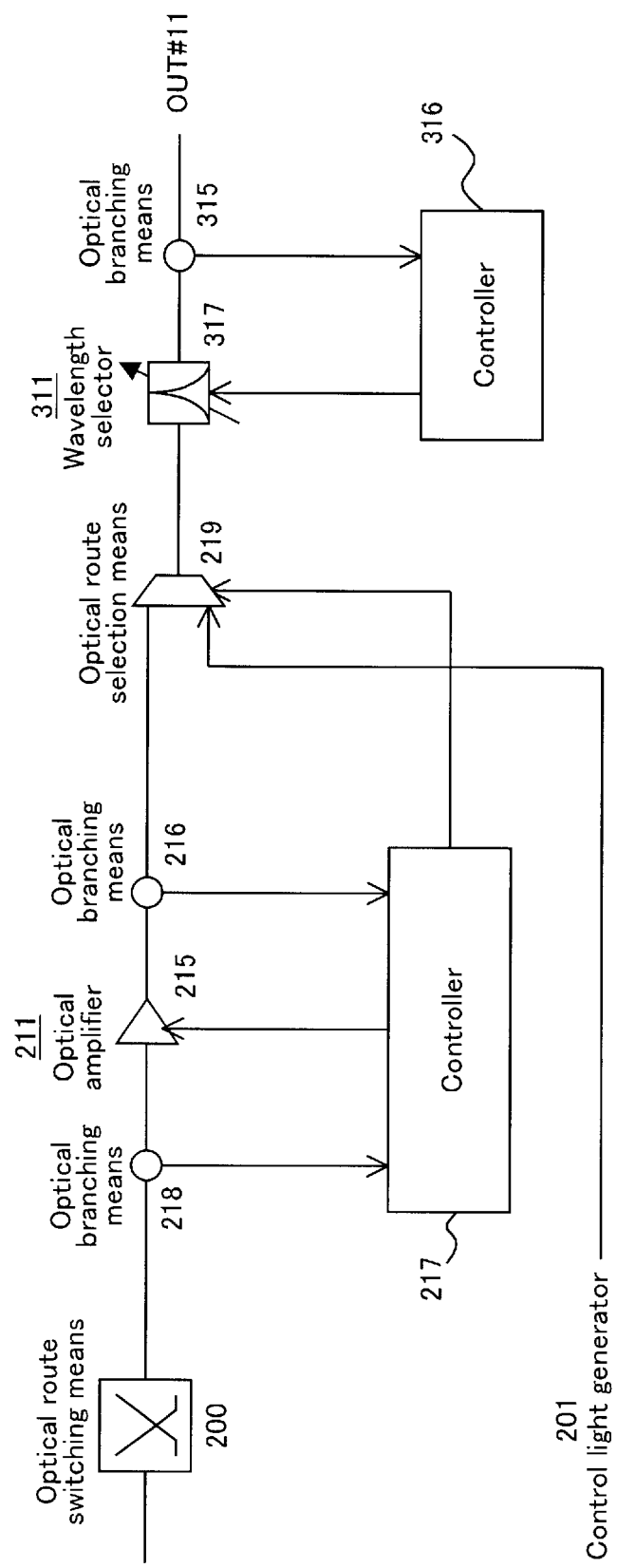
FIG. 26 is a detailed configuration of a single port in the overall configuration of the third embodiment of routing portion 2.

In FIGS. 25 and 26, an overall configuration of the third embodiment of routing portion 2 and a detailed configuration of a single port thereof are shown.

Instead of optical combining means 711–714 to 741–744 and optical gate means 715–718 to 745–748 in the embodiment shown in FIG. 23, there are provided optical route selection means 219-1–219-2 to 245–248.

Control light generator 201 includes control light sources 611–614 to 641–644 respectively corresponding to output ports, for providing control lights to wavelength selection means 311–314 to 341–344 using optical route selection means 1 which selects an output from control light sources 611–614 to 641–644.

Now, a study is given on output port OUT#11 shown in FIG. 26. Each laser in control light sources 611–614 to 641–644 of control light generator 201 is normally kept ON to continue outputting lights. When a break occurs in an input light to optical amplifier 215 and is detected by optical branching means 218, control light $\lambda 2$ selected by optical route selection means 219 is supplied to wavelength selection means 317.

Then, when the restoration of output light in optical amplifier 215 is detected by optical branching means 216, a signal light (i.e. output of optical amplifier 215) is selected by optical route selection means 219. Compared with the embodiment shown in FIG. 23, the embodiment in FIG. 25 provides optical route selection means instead of both optical combining means and optical gate means. This produces a simplified configuration.

Figure 27:
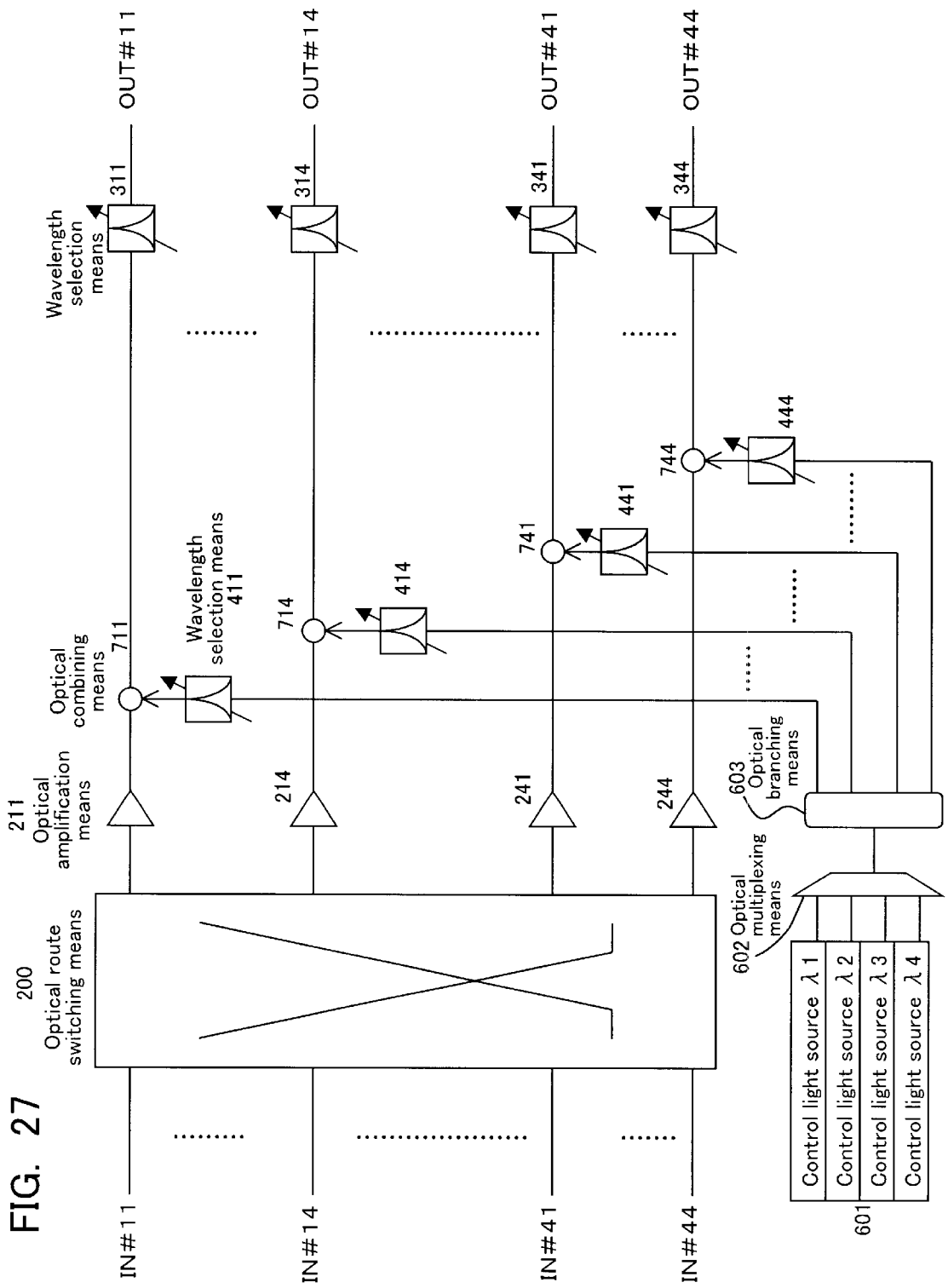
FIG. 27 is an overall configuration of the fourth embodiment of routing portion 2.
Figure 28:
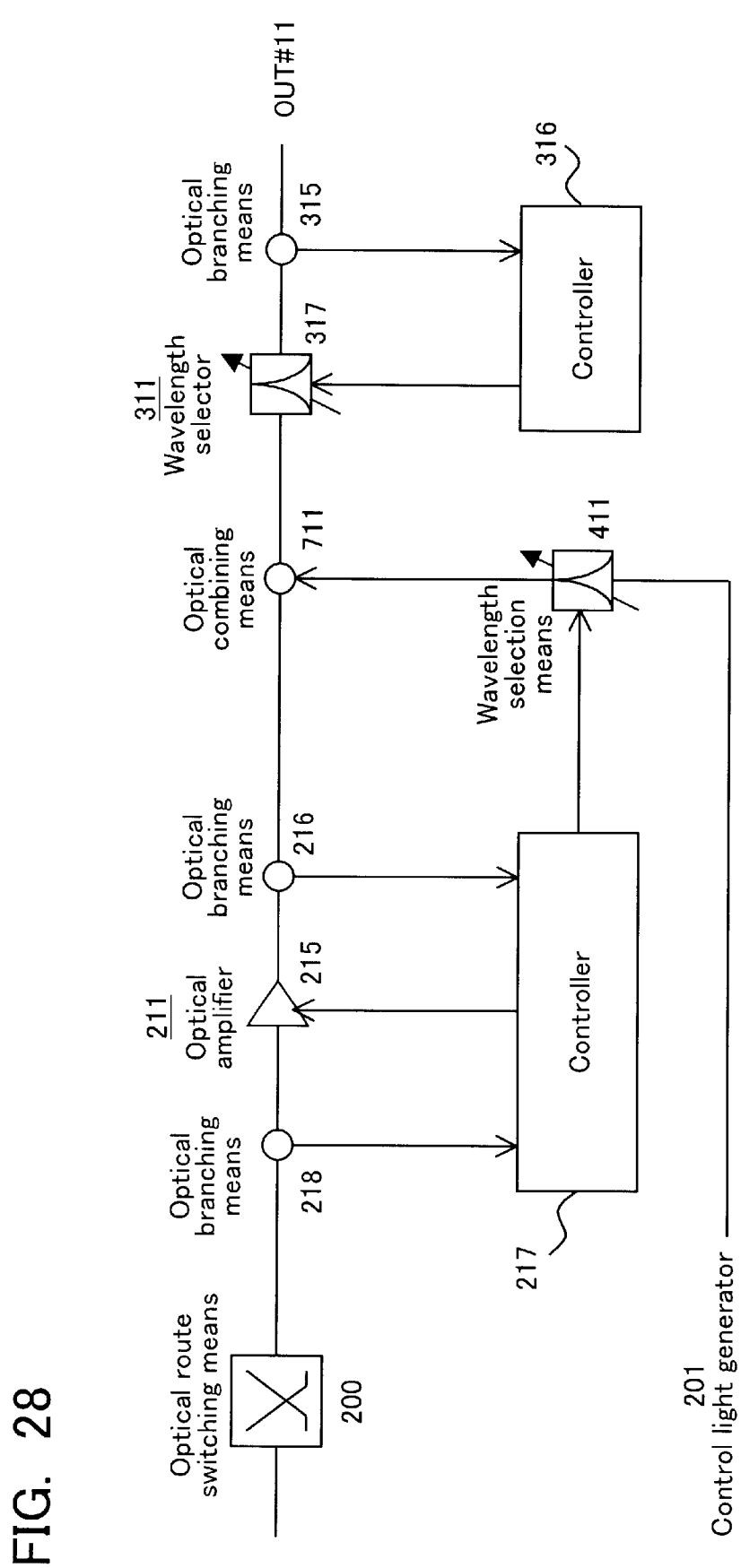
FIG. 28 is a detailed configuration of a single port in the overall configuration of the fourth embodiment of routing portion 2.

In FIGS. 27 and 28, an overall configuration of the fourth embodiment for routing portion 2 and a detailed configuration of a single port thereof are shown.

Control light generator 201 includes optical multiplexing means 602 to multiplex four (4) fixed-wavelength lasers 601 with $\lambda 1$ to $\lambda 4$, and optical branching means 603 to dispatch multiplexed control lights to respective ports.

Among control lights having multiple wavelengths $\lambda 1$ to $\lambda 4$ supplied through optical branching means 603, arbitrary one wave is selected by wavelength selection means 411–414 to 441–444, and is supplied to another wavelength selection means 311–314 to 341–344 through optical combining means 711–714 to 741–744.

Each of four fixed-wavelength lasers 601 in control light generator 201 is normally ON to output light. Here, the following study is given on a single port going to OUT#1. As shown in FIG. 28, when a break occurs in a light input to optical amplifier 215, and is detected by optical branching means 218, wavelength selection means 411 selects $\lambda 2$ to provide control light $\lambda 2$ for wavelength selector 317 through optical combining means 711.

Then, when the restoration of output light from optical amplifier 215 is detected by optical branching means 216, transmitted wavelength $\lambda 2$ (or either $\lambda 1$, $\lambda 3$, $\lambda 4$) in wavelength selection means 411 is forcibly shifted so that a control light is not supplied any more to optical combining means 711.

Figure 29:
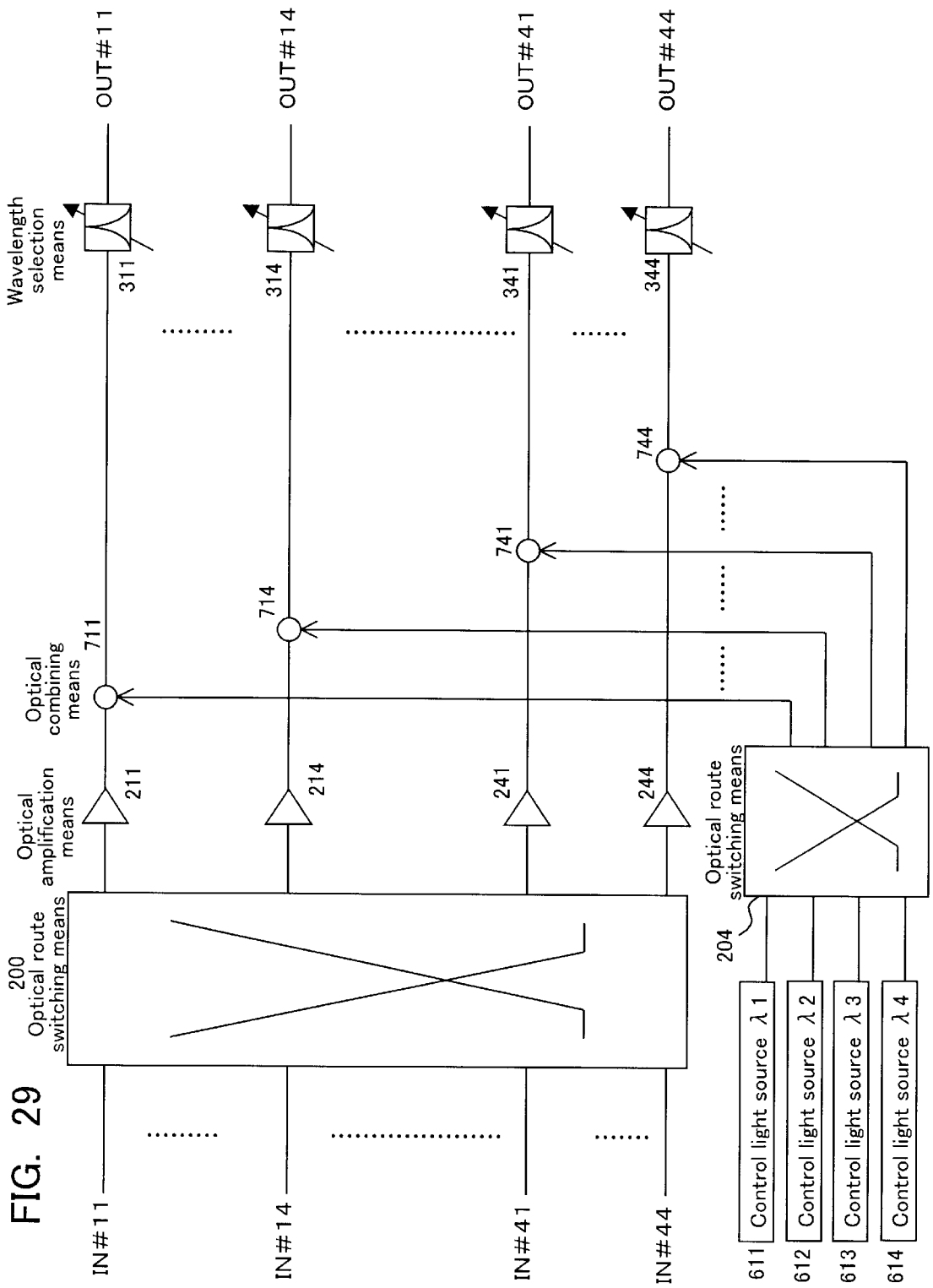
FIG. 29 is an overall configuration of the fifth embodiment of routing portion 2.
Figure 30:
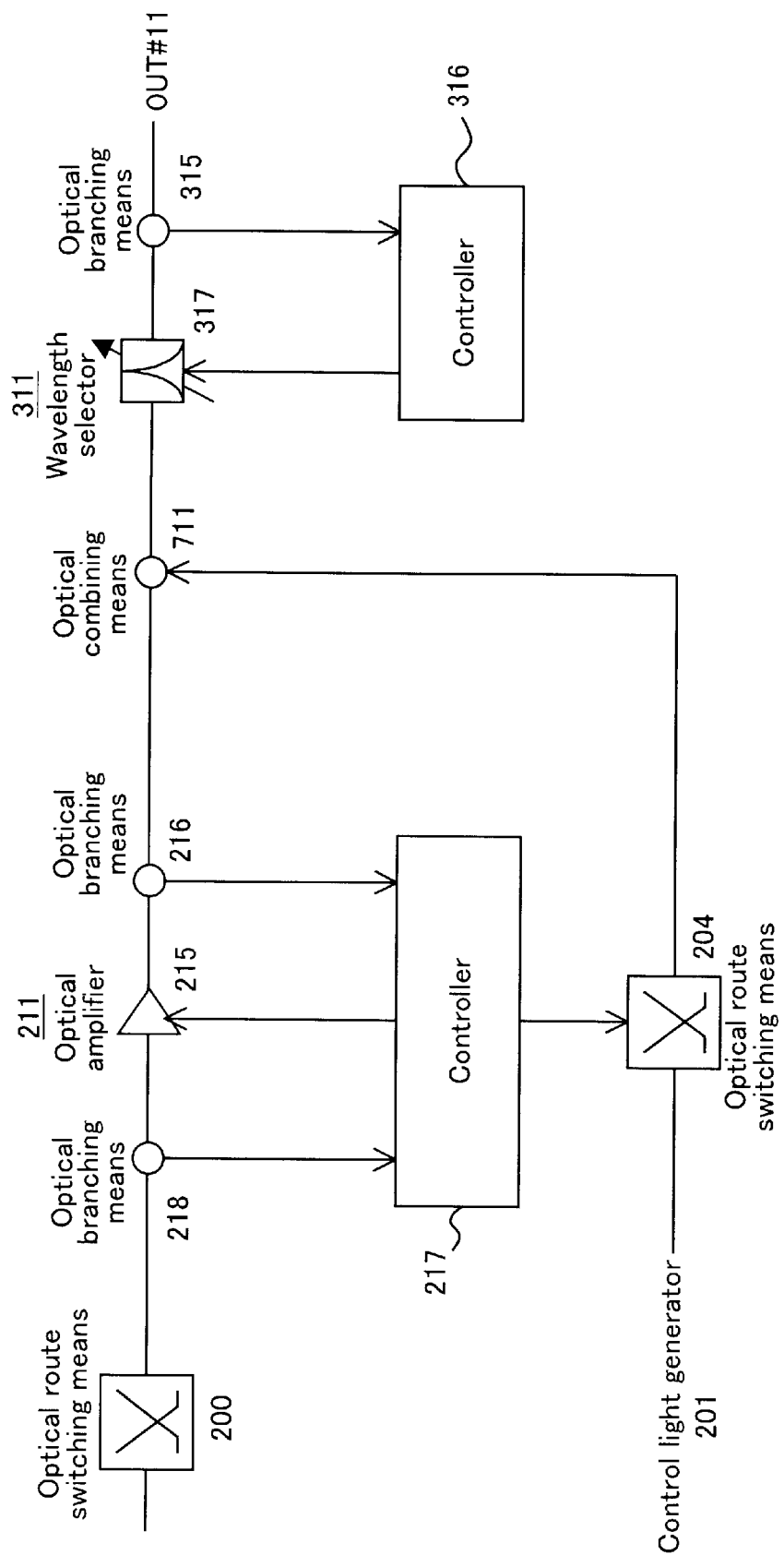
FIG. 30 is a detailed configuration of a single port in the overall configuration of the fifth embodiment of routing portion 2.

In FIGS. 29 and 30, an overall configuration of the fifth embodiment for routing portion 2 and a detailed configuration of a single port thereof are shown.

Figure 31:
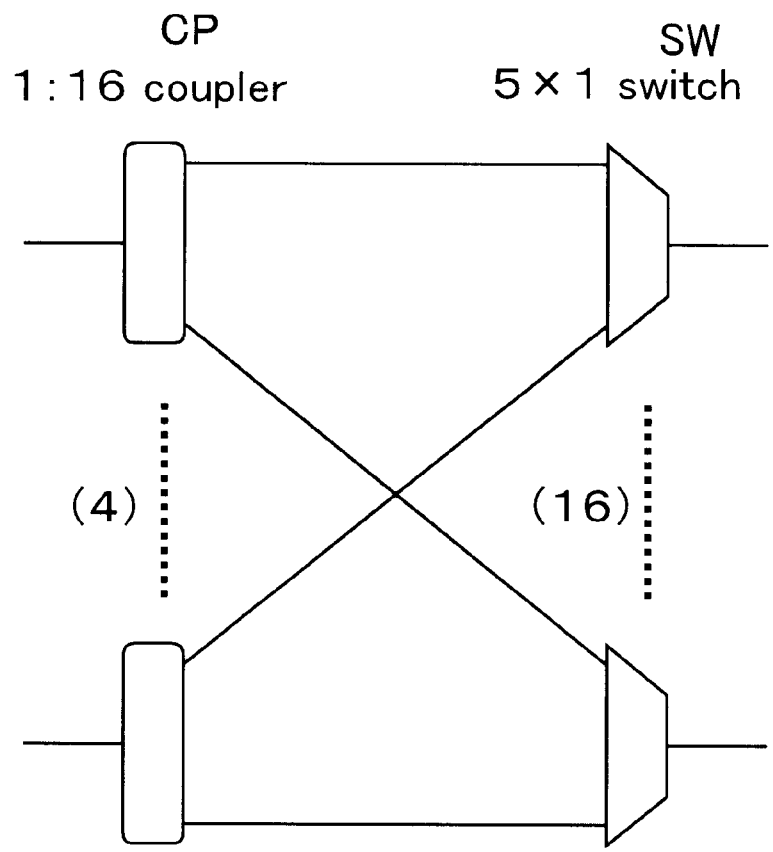
FIG. 31 is a configuration example of optical switching means 204 in the embodiment shown in FIG. 29.

As shown in FIG. 29, control light generator 201 includes four fixed-wavelength lasers 611–614 and optical route switching means 204. Optical route switching means 204 further includes four 1:16 couplers CP and sixteen 5×1 switches SW, as shown in FIG. 31. Each input to 5×1 switch SW has $\lambda 1$, $\lambda 2$, $\lambda 3$ and $\lambda 4$ for respective four ports, and the remainder one port is not assigned.

Each control light is routed to a desired port by optical route switching means 204, to supply for wavelength selection means 311–314 to 341–344 through optical combining means 711–714 to 741–744.

Each laser in control light sources 611–614 is normally ON to continue emitting light. In FIG. 30 where a detailed configuration of a port of OUT#11 is shown, when a break is detected in a light input to optical amplifier 215 by optical branching means 218, $\lambda 2$ is selected by optical route selection means 204.

This control light having $\lambda 2$ is supplied to wavelength selection means 317 through optical combining means 711. Then, when an output of optical amplifier 215 is restored, optical route switching means 204 selects an idle (i.e. not currently in use) port. The control light output is thus suspended and optical signal $\lambda 2$ from optical switching means 200 is forwarded to wavelength selector 317 through optical combining means 711.

In this configuration shown in FIG. 29, optical switching means 204 is commonly used to each output port for selecting a control light, which enables to simplify the configuration.

Figure 32:
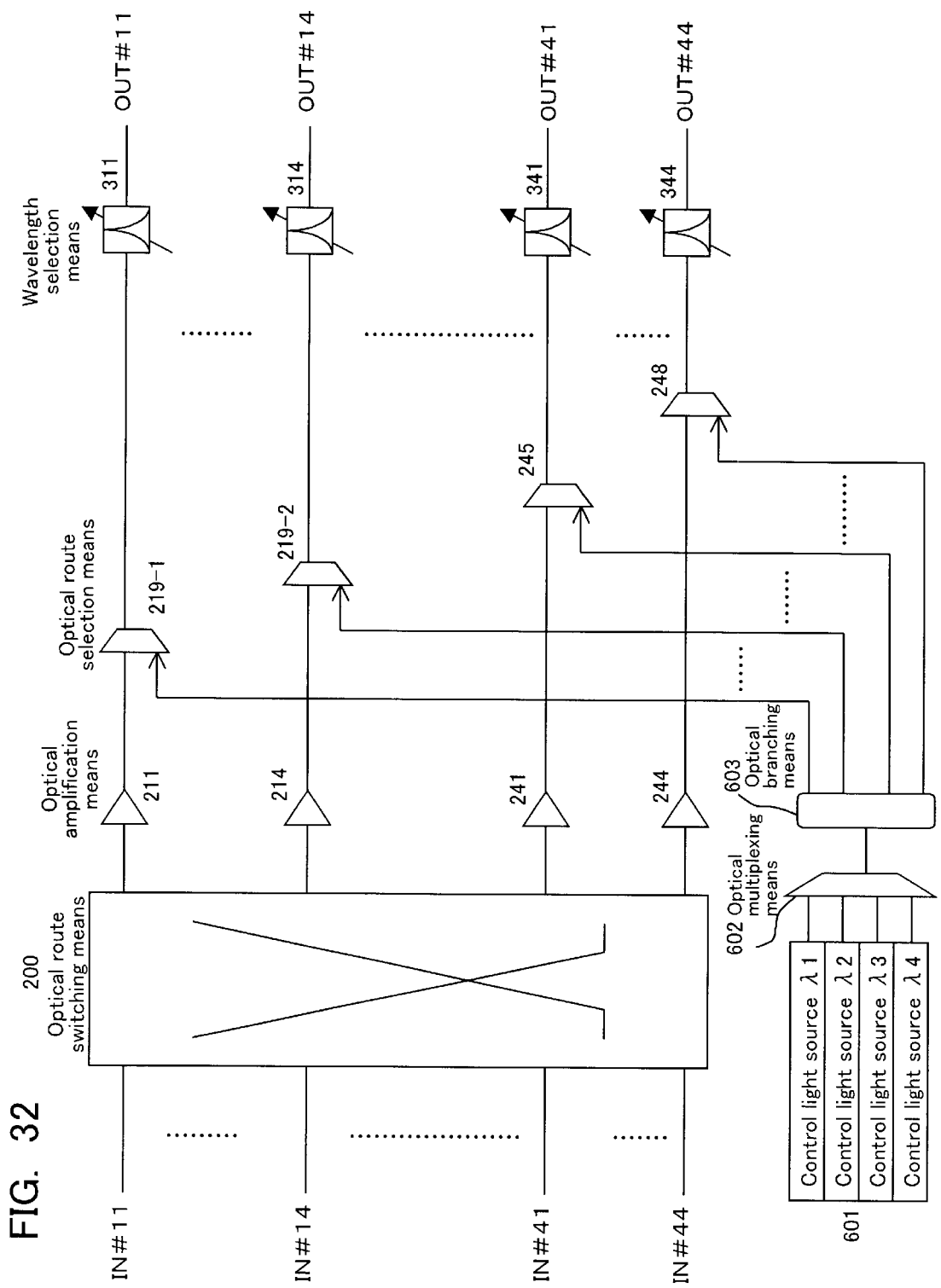
FIG. 32 is an overall configuration of the sixth embodiment of routing portion 2.

In FIG. 32, there is shown an overall configuration of the sixth embodiment for routing portion 2.

In this embodiment, features in those embodiments as shown in FIGS. 25 and 27 are introduced. Namely, there are provided optical route selection means 219-1, 219-2 and 245–248 in the configuration as shown in FIG. 25, and optical multiplexing means 602 and optical branching means 603 as shown in FIG. 27.

A detailed configuration for a single port is omitted here, which is substantially the same as the configuration shown in FIG. 26. Control light generator 201 includes four (4) fixed-wavelength lasers 601, optical multiplexing means 602 for multiplexing $\lambda 1$ to $\lambda 4$, and optical branching means 603 for dispatching multiplexed control light to each port.

Control lights having multiplexed wavelengths $\lambda 1$ to $\lambda 4$ are supplied to wavelength selection means 311–314 to 341–344 through optical route selection means 219-1, 219-2 to 245–248. Further detailed operation is similar to the operation shown in FIG. 26, the description is therefore omitted to avoid duplication.

Figure 33:
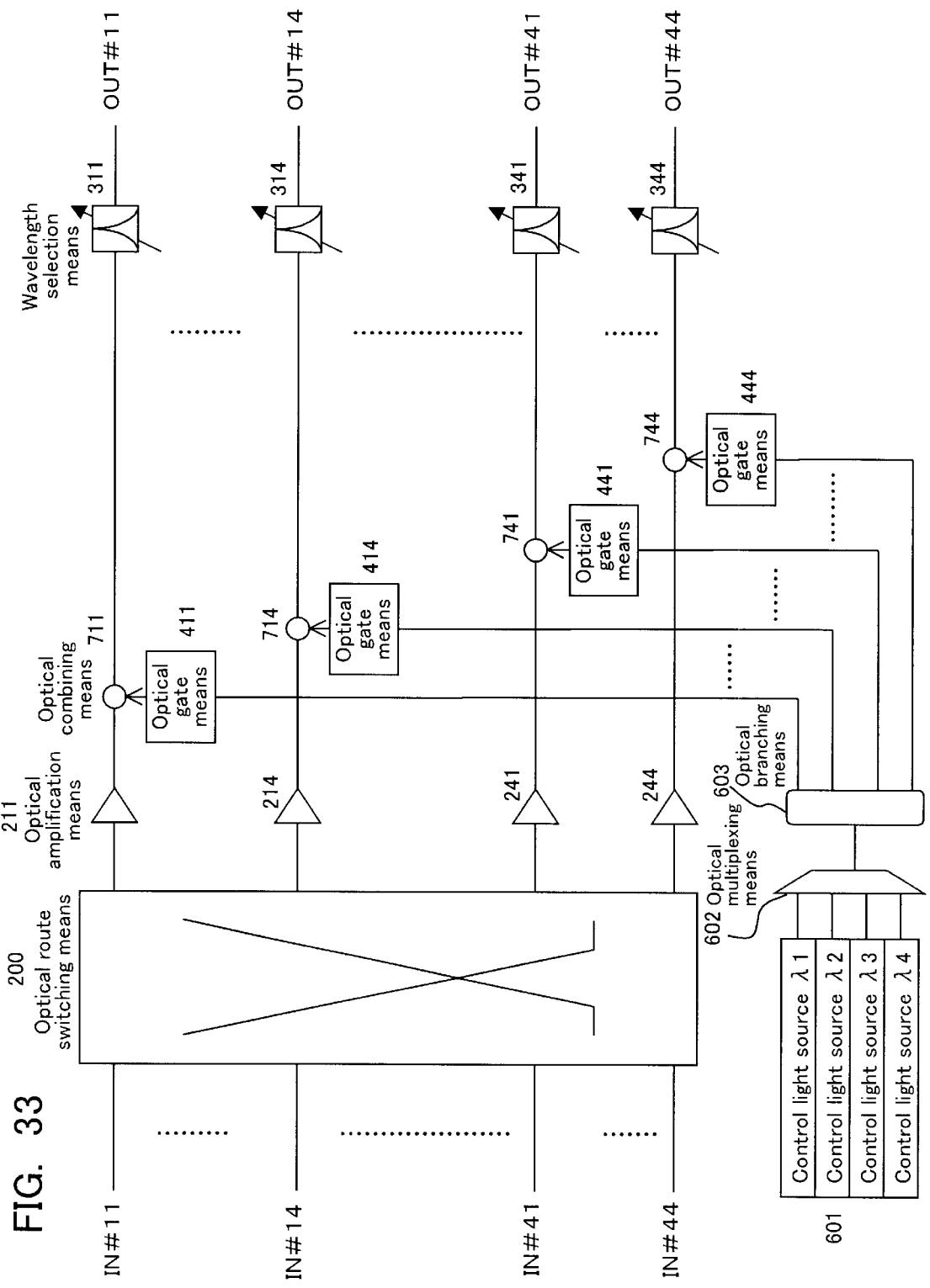
FIG. 33 is an overall configuration of the seventh embodiment of routing portion 2.

In FIG. 33, an overall configuration of the seventh embodiment for routing portion 2 is shown.

The embodiment has a configuration in which the features in both the embodiments shown in FIGS. 23 and 27 are introduced. Namely, the configuration of the embodiment comprises optical combining means 711–714 to 741–744 in the embodiment shown in FIG. 23, optical multiplexing means 602 and optical branching means 603. A detailed configuration for a single port is substantially the same as the configuration shown in FIG. 24, and is therefore omitted here.

Control light generator 210 includes four (4) fixed-wavelength lasers, multiplexing means 602 to multiplex $\lambda 1$ to $\lambda 4$, and optical branching means 603 to dispatch multiplexed control light to each port.

Control lights having multiplexed wavelengths $\lambda 1$ to $\lambda 4$ are supplied to wavelength selection means 311–314 to 341–344 through optical gate means 411–414 to 441–444 and optical combining means 711–714 to 741–744. Further detailed operation is similar to that shown in FIG. 24 and is therefore omitted here.

Figure 34:
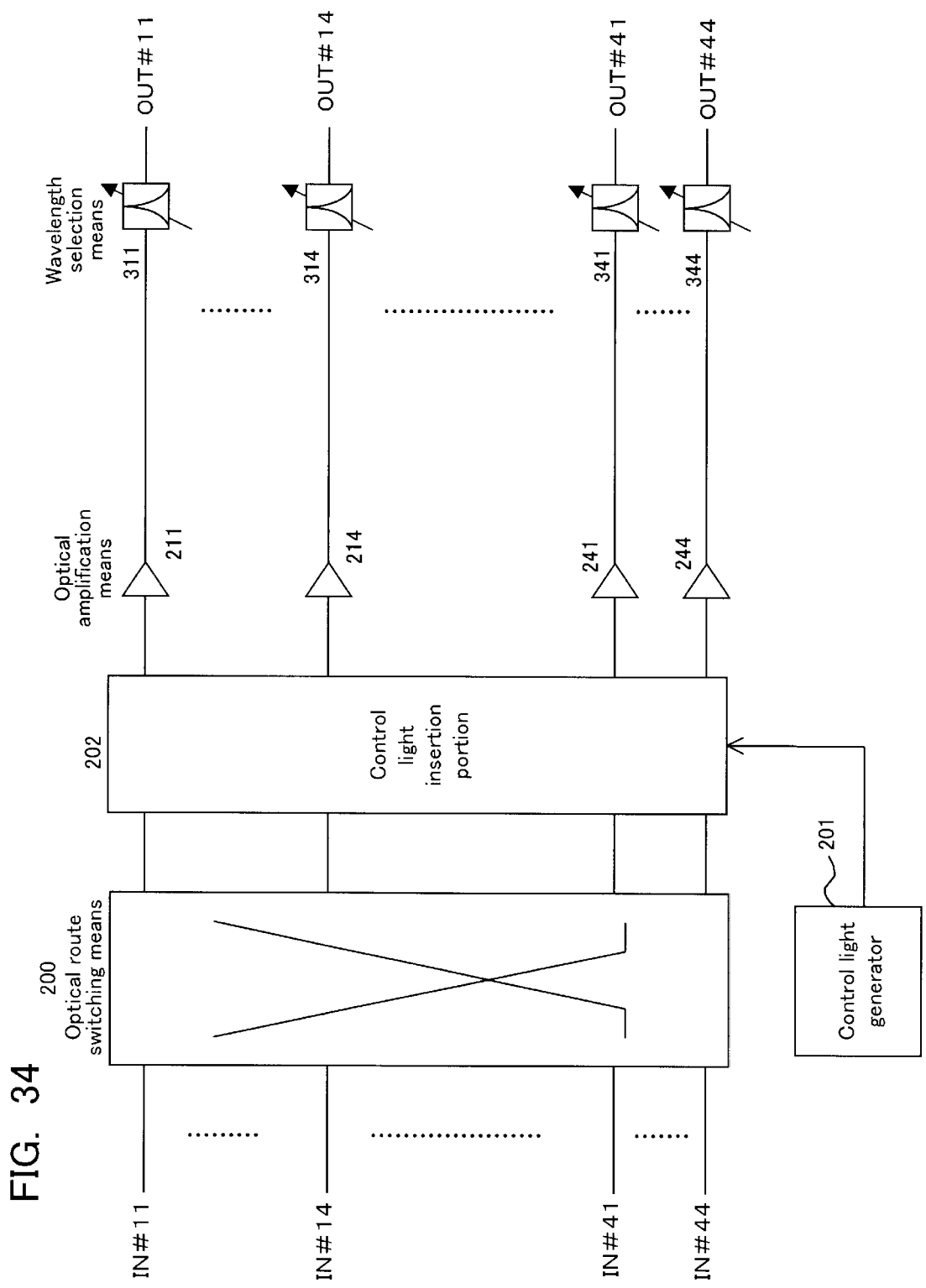
FIG. 34 is an overall configuration of another embodiment of routing portion 2.

In FIG. 34, an overall configuration of another embodiment for routing portion 2. Compared with the configuration shown in FIG. 19, the configuration in the embodiment shown in FIG. 34 includes control light insertion portion 202 connected at the preceding stage of optical amplification means 211–214 to 241–244.

In the configuration shown in FIG. 34, in the case a signal light having $\lambda 2$ is output to OUT#11, for example, a control light having $\lambda 2$ is generated in control light generator 201 to supply for optical amplification means 211–214 to 241–244 through control light insertion portion 202 prior to a path switchover.

Figure 35:
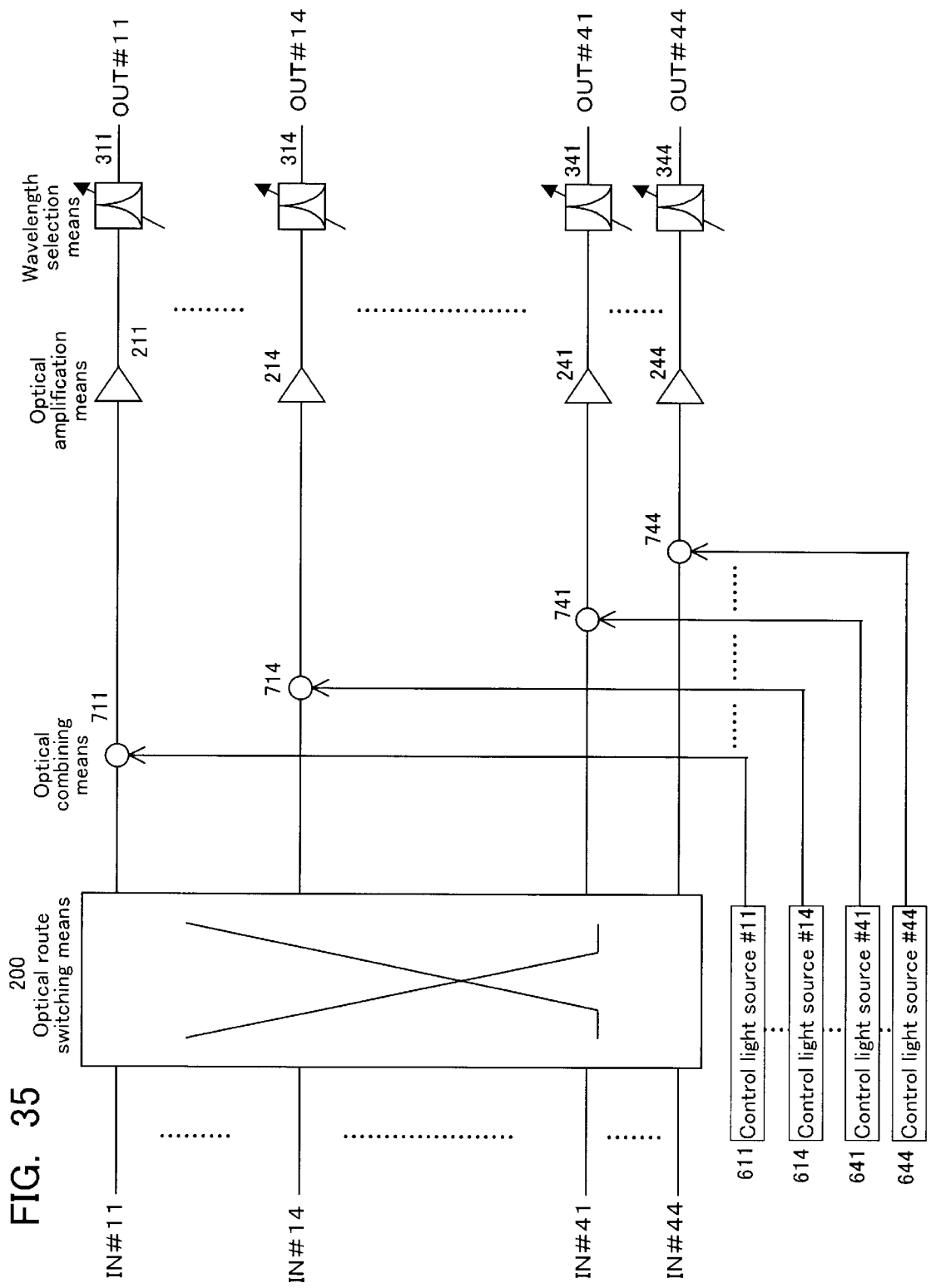
FIG. 35 is a concrete configuration example using the configuration shown in FIG. 32.

In FIG. 35, a concrete example is shown, to which the configuration shown in FIG. 34 is applied. Control light generator 201 includes variable-wavelength light sources 611–614 to 641–644 corresponding to each output port, to supply to the preceding stage of optical amplification means 211–214 to 241–244 through optical combining means 711–714 to 741–744. Control lights are supplied for preventing any shutdown in optical amplification means 211–214 to 241–244 at the time of switchover.

Figure 36A:
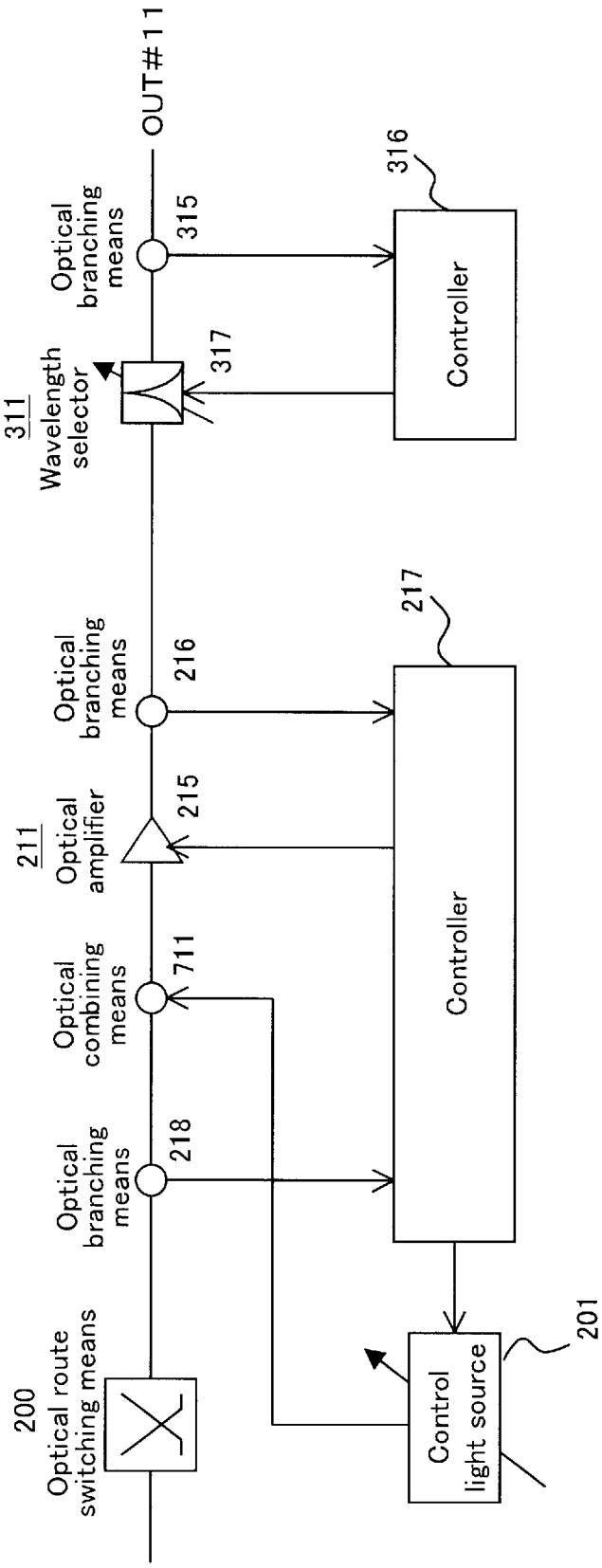
FIGS. 36A to 36C are detailed configuration of a single port in the embodiment shown in FIG. 33.

In FIG. 36, there is shown a detailed configuration for a single port in the embodiment shown in FIG. 35. In the configuration shown in FIG. 36A, each laser of control light sources 201 is normally OFF at the time of path setting. When a break is detected in a light input to optical amplifier 215 by optical branching means 218, LD2 in light source (#11) 611 of control light sources 201 is driven by controller 217 to output light $\lambda 2$. The light is supplied to optical amplifier 215 through optical combining means 711 to prevent shutdown. Thus the light $\lambda 2$ is also supplied to wavelength selection means 311. When the restoration of the signal light is detected by optical branching means 216, LD2 in control light source (#11) 611 is stopped to drive.

Figure 36C:
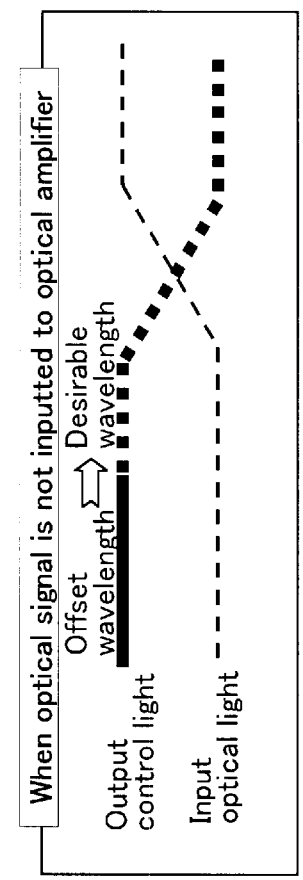
Figure 36B:
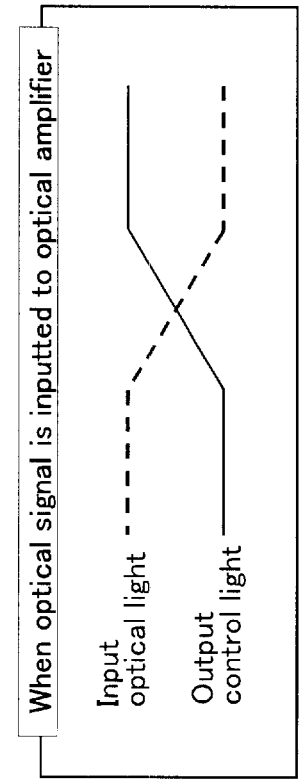

Accordingly, as shown in FIG. 36B, a switchover from signal light to control light is carried out in optical amplification means 211 without producing a shutdown during a transition state from the time while signal is being input to optical amplification means 211 to the time of the input stoppage.

Furthermore, as shown in FIG. 36C, the optical amplification means is in a shutdown state while a path is not established (i.e. while a light is not supplied to the optical amplification means). Therefore, any wavelength (offset wavelength) is supplied to optical amplification means 211 before a path is established.

The light $\lambda 2$ is started to supply at the time a path is established. When a signal light is detected in optical branching means 216, LD2 in control light source (#11) 611 is stopped to drive. Thus, shutdown in optical amplification means 211 can be removed before a signal light arrives at routing portion 2. This enables to supply for wavelength selection means 311 a wavelength to be used after completion of switchover.

Figure 37:
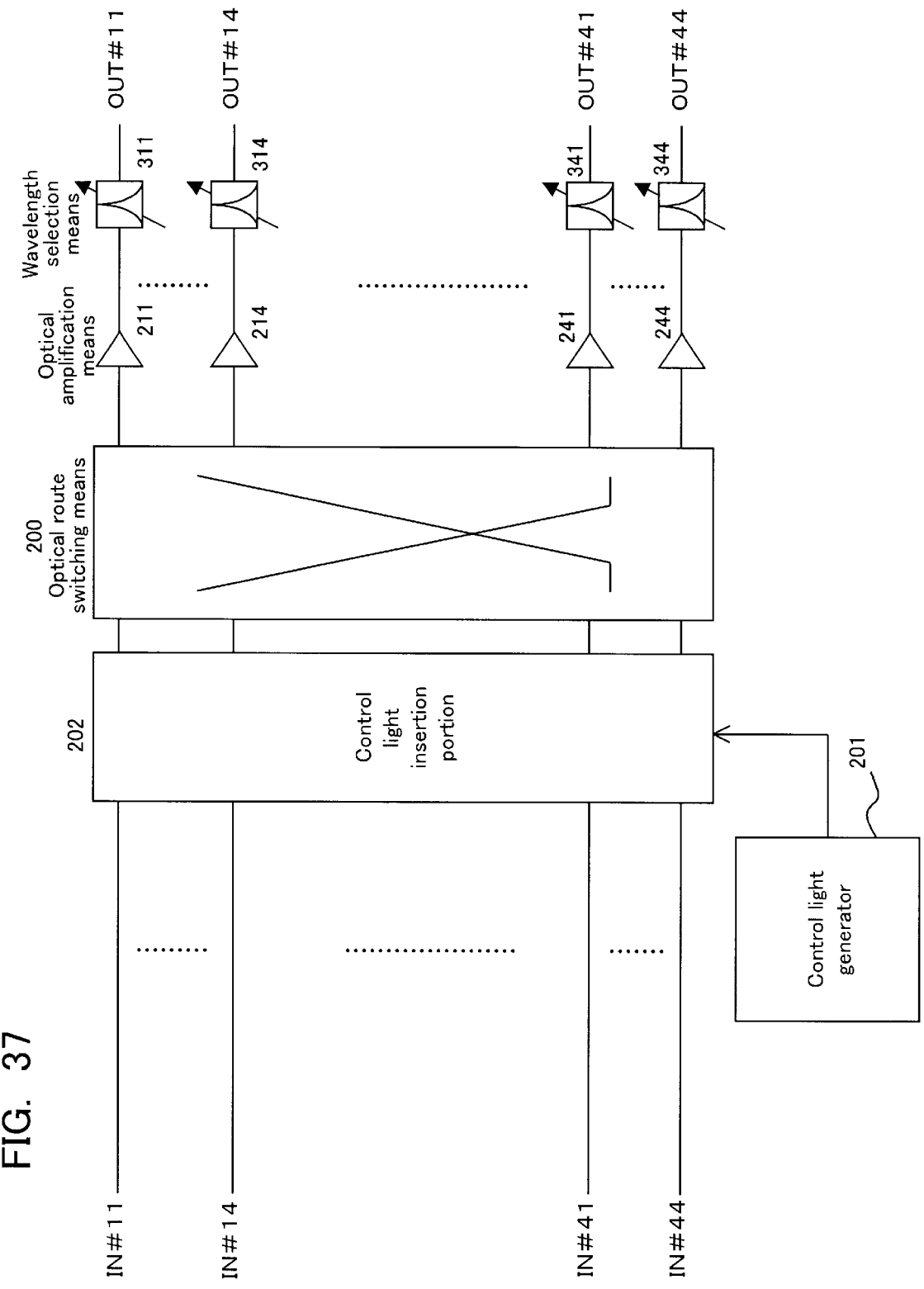
FIG. 37 is a configuration of another embodiment of routing portion 2.

In FIG. 37, another embodiment of routing portion 2 is shown. There are provided control light generator 201 for generating a control light normally to supply light to optical amplification means 211–214 to 241–244 through optical route switching means 200; and control light insertion portion 202 for supplying control lights to optical route switching means 200.

Compared with the configuration of the embodiment shown in FIG. 34, control light insertion portion 202 is connected at the preceding stage of optical route switching means 200. In this configuration, in the case when a signal light having $\lambda 2$ is output to, for example, OUT#11, a control light $\lambda 2$ is generated in control light generator 201 to supply to optical route switching means 200 through control light insertion portion 202 prior to the path switchover.

Figure 38:
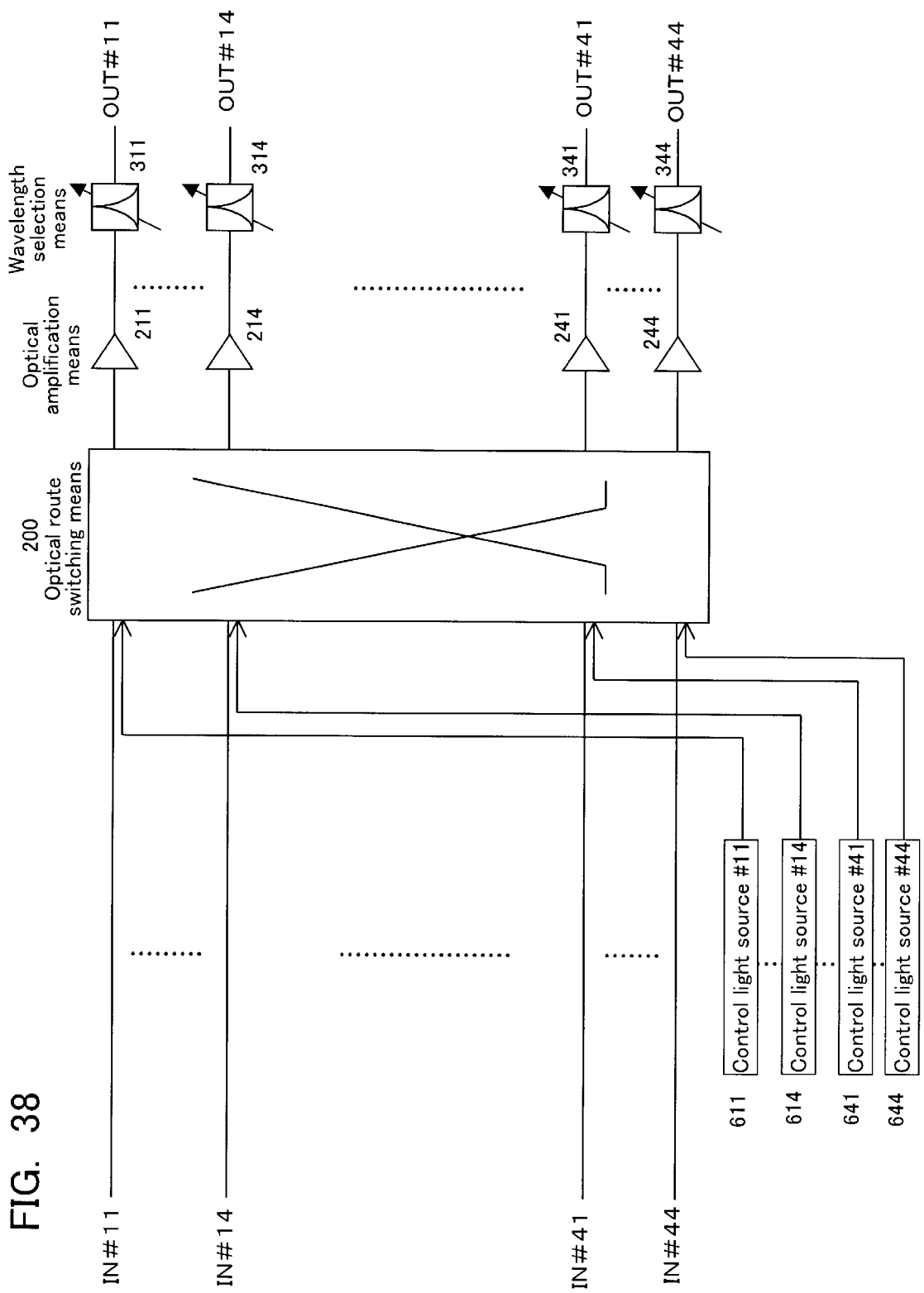
FIG. 38 is a configuration example of another embodiment in which a function of control light insertion portion 202 is provided in optical route switching means 200, in comparison with the configuration shown in FIG. 37.

In FIG. 38, as compared with the configuration shown in FIG. 37, a function provided in control light insertion portion 202 is newly provided in optical route switching means 200. Control light generator 201 includes variable wavelength light sources 611–614 to 641–644, to supply control lights to optical amplification means 211–214 to 241–244 through control route switching means 200.

In order not to produce shutdown at the time of switchover, control lights are being supplied to optical amplification means 211–214 to 241–244 in advance.

Figure 39:
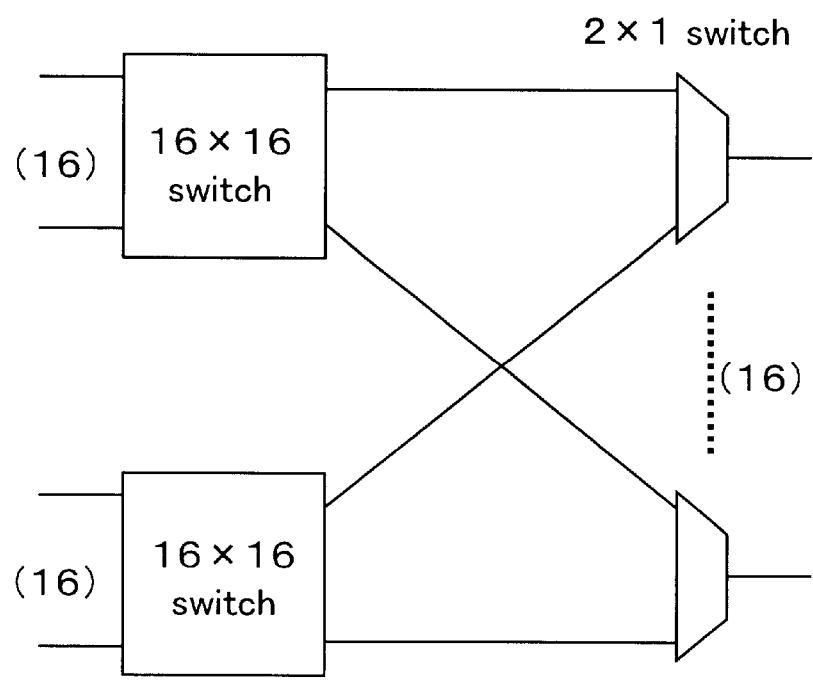
FIG. 39 is a configuration example of optical route switching means 200 having a function of control light insertion portion 202.

In FIG. 39, a configuration example of optical route switching means 200 is shown, in which a function of control light insertion portion 202 is provided. By adopting a switch configuration having 32×16 switch elements, it is possible for each port to select either control light or signal light. For this purpose, the switch is configured with two (2) sets of 16×16 switches and sixteen (16) sets of 2×1 switches which are connected as shown in FIG. 39. Thus a switch having 32×16 components is configured.

Either one of the two 16×16 switches is connected to input nodes IN#11–#14 to #41–#44, while the other 16×16 switch is connected to variable-wavelength control light sources 611–614 to 641–644.

Figure 40:
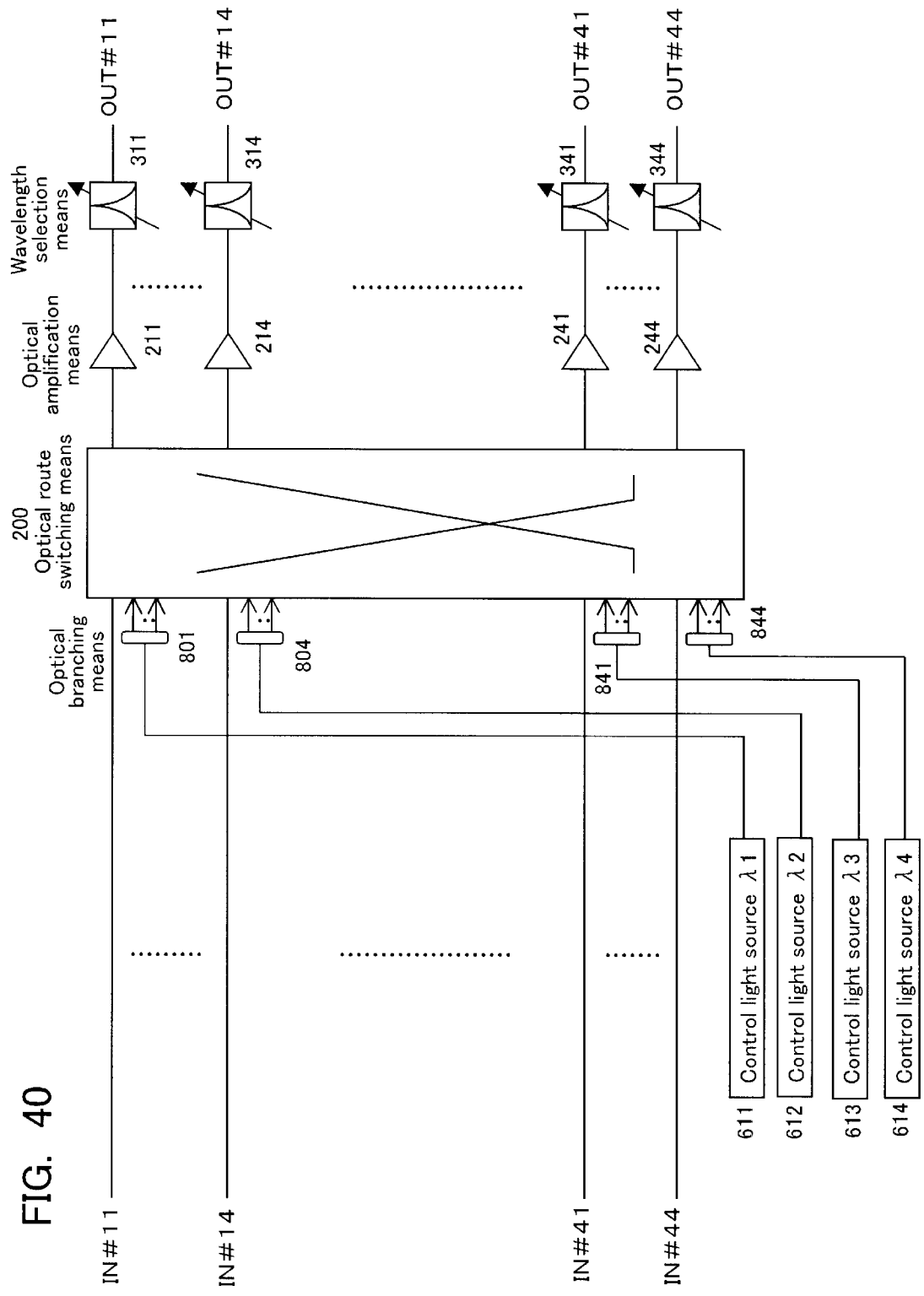
FIG. 40 is a configuration example of routing portion 2 using another embodiment of optical route switching means 200 having a function of control light insertion portion 202.

In FIG. 40, there is shown another configuration of routing portion 2, in which optical route switching means 200 having a function of control light insertion portion 202 is adopted.

Control light generator 201 includes four (4) fixed-wavelength light sources 611–614 and optical branching means 801–804 to 841–844 for branching generated lights to each link, in which the number of branch equals to the number of links.

Using optical route switching means 200, control lights input through optical branching means 801–804 to 841–844 are supplied to optical amplification means 211–214 to 241–244, so that optical amplification means 211–214 to 241–244 are not shut down at the time of path switchover. Accordingly, it becomes possible to supply control lights to wavelength selection means 311–314 to 341–344.

Figure 41:
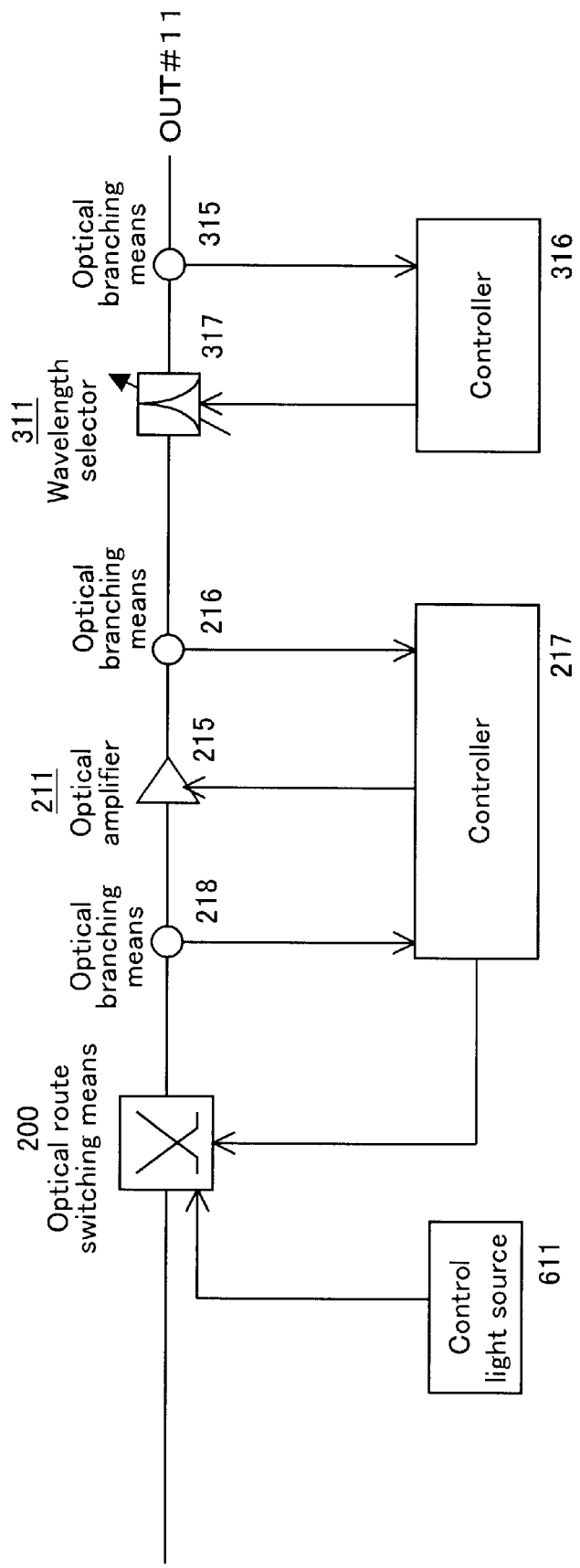
FIG. 41 is a detailed configuration example corresponding to a single output port in routing portion 2 shown in FIG. 40.

In FIG. 41, there is shown a detailed configuration example which corresponds to a single output port in the configuration of routing portion shown in FIG. 40. Each laser in control light source 201 is normally ON. When a break is detected in an input light to optical amplifier 215 by optical branching means 218, controller 217 controls optical route switching means 200 to select λ2 which is input through optical branching means 801 corresponding to control light source 612.

Accordingly, a control light λ2 is supplied to optical amplification means 211 through optical route switching means 200. Thus λ2 is also supplied to wavelength selection means 311. When the restoration of a signal light is detected by optical branching means 216, the signal light is selected by optical route switching means 200.

As having been described, the present invention enables to maintain optical signal intensity constant, on occurrence of a transmission link failure, against possible change of optical signal intensity produced when standby wavelength is set or changed for a diversion transmission link, using dummy light sources to compensate optical signals.

By maintaining the optical signal intensity constant, it is possible to prevent reduction in transmission quality caused by a generated optical surge in optical amplifiers, deteriorated S/N (signal to noise ratio) and increased error rate etc.

Furthermore, according to the present invention, it is possible to reduce required time of path switchover for obtaining stable optical signals by use of a control light having a wavelength identical to a wavelength of a new path, by setting variable-wavelength selection means in advance.

Although the present invention has been described in detail, it will be apparent that other modifications and variations thereof are possible without departing from the scope of the invention. The foregoing description of the embodiments is not intended to limit the invention to the particular details of the examples. All features and advantages which fall within the scope of the invention are covered by the appended claims.

What is claimed is:

1. Optical cross-connect equipment comprising:
    an optical pre-amplifier;
    a routing portion routing a signal light input through said pre-amplifier to a desired output port;
    a control light generator generating a control light corresponding to said input signal light;
    a selector selecting either said input signal light received from the routing portion or said control light to output;
    and a post-amplifier amplifying either said selected signal light or control light received from the selector to output.

2. The optical cross-connect equipment according to claim 1 wherein said signal light input through the pre-amplifier is a multi-wavelength signal light,
    said optical cross-connect equipment further comprises:
        a demultiplexer splitting said multi-wavelength signal light to be routed by the routing portion, wherein said signal light input to the selector is said wavelength-split signal light,
    said control light input to the selector has a wavelength identical to said each wavelength-split signal light.

3. The optical cross-connect equipment according to claim 2, wherein said control light input to the selector is selected to output by the selector when the wavelength-split signal light having a wavelength identical to the control light is not output from the routing portion.

4. Optical cross-connect equipment comprising:
    an optical pre-amplifier;
    a demultiplexer which receives a multi-wavelength signal light for splitting into signal lights each having each plurality of wavelengths;
    a routing portion for routing said signal light having each plurality of wavelengths split by the demultiplexer to a desired output port;
    a control light generator for generating control lights each having each plurality of wavelengths, respectively corresponding to said signal light having each plurality of wavelengths;
    a coupler provided corresponding to said each signal light having each plurality of wavelengths output from the routing portion;
    an optical post-amplifier for amplifying an optical output from said coupler to output; and
    a wavelength filter for selecting a control light having a wavelength identical to said signal light input to said coupler out of the control lights having a plurality of wavelengths output from the control light generator, to input to said coupler.

5. Optical cross-connect equipment comprising:
    an optical pre-amplifier;
    a demultiplexer which receives a multi-wavelength signal light to split into wavelength-split signal lights each having each plurality of wavelengths; and
    a routing portion routing said each wavelength-split signal light having each plurality of wavelengths split by said demultiplexer to a desired output port, wherein said routing portion comprises:
        a control light generator for generating a control light corresponding to said signal light;
        a route switcher switching said wavelength-split signal light having each plurality of wavelengths split by said demultiplexer to output;
        an optical amplifier amplifying each signal light having each plurality of wavelengths output from said route switcher;
        a control light insertion portion inserting said control light generated by the control light generator into an output of said optical amplifier; and
        a wavelength selector selecting an output of said control light insertion portion having a wavelength assigned to said wavelength selector to output.

6. The optical cross-connect equipment according to claim 5, wherein a control light having a wavelength to be used after a switchover is supplied to said wavelength selector through said control light insertion portion, prior to the time of optical path switching executed by said route switcher.

7. The optical cross-connect equipment according to claim 5, wherein said control light insertion portion comprises an optical combiner connected between the optical amplifier and the wavelength selector to insert said control light.

8. The optical cross-connect equipment according to claim 7, further comprising:
    a gate unit connected to said optical combiner, wherein said gate unit is controlled to insert said control light at time of optical path switching executed by said route switcher.

9. The optical cross-connect equipment according to claim 5, wherein said control light insertion portion comprises an optical route selector connected between the optical amplifier and the wavelength selector inserting the control light.

10. The optical cross-connect equipment according to claim 5, wherein said control light generator comprises:
    an optical multiplexer multiplexing outputs of fixed-wavelength light sources of which number is identical to the number of wavelengths included in said signal light; and an optical brancher branching an output of said optical multiplexer into signals of which number is identical to a number of wavelengths included in said signal light,
said control light insertion portion comprises:
an optical combiner connected between said optical amplifier and said wavelength selector; and
a gate unit connected to said optical combiner, whereby said control light through the optical combiner is inserted at time of optical path switching executed by said route switcher.

11. The optical cross-connect equipment according to claim 5, wherein said control light generator comprises:
an optical multiplexer multiplexing outputs of fixed-wavelength light sources of which number is identical to number of wavelengths included in said signal light; and
an optical brancher branching said optical signal into signals of which number is identical to the number of wavelengths included in said signal light, said control light insertion portion comprises:
an optical route selector connected between said optical amplifier and said wavelength selector selecting said control light to insert.

12. Optical cross-connect equipment comprising:
an optical pre-amplifier;
a demultiplexer which receives a multi-wavelength signal light for splitting into signal lights each having each plurality of wavelengths; and
a routing portion for routing each wavelength-split signal light having each plurality of wavelengths split by the demultiplexer to a desired output port,
wherein said routing portion further comprises:
a control light generator generating a control light corresponding to said signal light;
a route switcher switching a route of said wavelength-split signal light having each plurality of wavelengths split by the demultiplexer to output;
a control light insertion portion inserting said control light generated by said control light generator into said signal light having each plurality of wavelengths output from said route switcher;
an optical amplifier amplifying an output of said control light insertion portion; and
a wavelength selector selecting an output of said optical amplifier having a wavelength assigned to said wavelength selector to output.

13. The optical cross-connect equipment according to claim 12, wherein said control light insertion portion includes an optical combiner located at the preceding stage of said optical amplifier inserting said control light.

14. Optical cross-connect equipment comprising:
an optical pre-amplifier;
a demultiplexer which receives a multi-wavelength signal light for splitting into signal lights each having each plurality of wavelengths; and
a routing portion routing each wavelength-split signal light having each plurality of wavelengths split by said demultiplexer to each desired output port,
said routing portion comprising:
a control light generator generating a control light corresponding to said each signal light;
a route switcher switching a route of said wavelength-split signal light having each plurality of wavelengths split by said demultiplexer;
a control light insertion portion connected at a preceding stage of said route switcher inserting said control light generated by the control light generator into said each signal light having each plurality of wavelengths;
an optical amplifier amplifying an output of said route switcher; and
a wavelength selector selecting an output of said optical amplifier having a wavelength assigned to said wavelength selector to output.

15. The optical cross-connect equipment according to claim 14, wherein said control light insertion portion comprises an optical combiner located at the preceding stage of said route switcher inserting said control light.

16. The optical cross-connect equipment according to claim 14, wherein said control light generator comprises:
a plurality of fixed-wavelength light sources of which number is identical to number of wavelengths in said signal light,
said control light insertion portion comprises:
an optical brancher located at the preceding stage of said route switcher branching each output of said fixed-wavelength light sources to input to said route switcher.

17. An apparatus, comprising:
a router routing split multi wavelength lights created by splitting a multi wavelength signal light, to a selector;
a control light generator generating and outputting a control light to the selector, the control light corresponding to the multi wavelength signal light, the control light having wavelengths identical to each split multi wavelength signal light; and
the selector selecting either the split multi wavelength signal lights received from the routing portion or said control light to output.

18. An apparatus, comprising:
a router routing wavelength split signal lights created by splitting a multi wavelength signal light having each plurality of wavelengths to an optical amplifier;
the optical amplifier amplifying each wavelength split signal light routed from said router;
a control light inserter inserting a control light corresponding to said multi wavelength signal light into an output of said optical amplifier; and
a wavelength selector selecting an output of said control light inserter having an assigned wavelength to output.

19. A method, comprising:
splitting a multi wavelength signal light having each plurality of wavelengths into wavelength split signal lights;
generating a control light corresponding to the multi wavelength signal light, the control light having wavelengths identical to each split multi wavelength signal light; and
selecting and outputting either the split multi wavelength signal lights or said control light.

20. A method, comprising:
splitting a multi wavelength signal light having plurality of wavelengths into wavelength split signal lights;
amplifying each wavelength split signal light;
inserting a control light corresponding to said multi wavelength signal light into an output of said amplifying; and
selecting and outputting an output of said inserting having an assigned wavelength.

* * * * *

UNITED STATES PATENT AND TRADEMARK OFFICE
CERTIFICATE OF CORRECTION

PATENT NO.      : 6,522,803 B1                                          Page 1 of 1
DATED           : February 18, 2003
INVENTOR(S)     : Ichiro Nakajima et al.

It is certified that error appears in the above-identified patent and that said Letters Patent is hereby corrected as shown below:

Column 22,
Line 25, begin a new paragraph with "wherein".

Signed and Sealed this

Eighth Day of April, 2003

JAMES E. ROGAN
*Director of the United States Patent and Trademark Office*